US008832954B2

(12) United States Patent
Atwell et al.

(10) Patent No.: US 8,832,954 B2
(45) Date of Patent: Sep. 16, 2014

(54) COORDINATE MEASUREMENT MACHINES WITH REMOVABLE ACCESSORIES

(75) Inventors: Paul C. Atwell, Lake Mary, FL (US); Clark H. Briggs, Deland, FL (US); Burnham Stokes, Lake Mary, FL (US)

(73) Assignee: Faro Technologies, Inc., Lake Mary, FL (US)

(*) Notice: Subject to any disclaimer, the term of this patent is extended or adjusted under 35 U.S.C. 154(b) by 278 days.

(21) Appl. No.: 13/491,176

(22) Filed: Jun. 7, 2012

(65) Prior Publication Data

US 2013/0125408 A1 May 23, 2013

Related U.S. Application Data

(63) Continuation-in-part of application No. 13/006,507, filed on Jan. 14, 2011, now Pat. No. 8,533,967.

(60) Provisional application No. 61/296,555, filed on Jan. 20, 2010, provisional application No. 61/351,347, filed on Jun. 4, 2010, provisional application No. 61/355,279, filed on Jun. 16, 2010.

(51) Int. Cl.
*G01B 11/03* (2006.01)
*G01B 11/00* (2006.01)
*G01B 21/04* (2006.01)
*G01B 5/008* (2006.01)
*G01B 5/012* (2006.01)
*G05B 19/401* (2006.01)
*G01B 11/25* (2006.01)

(52) U.S. Cl.
CPC ............ *G01B 11/005* (2013.01); *G01B 11/007* (2013.01); *G01B 21/047* (2013.01); *G01B 5/008* (2013.01); *G01B 5/012* (2013.01); *G05B 19/401* (2013.01); *G01B 2210/58* (2013.01); *G05B 2219/33162* (2013.01); *G05B 2219/37193* (2013.01); *G05B 2219/40233* (2013.01); *G05B 2219/45061* (2013.01); *G01B 11/2509* (2013.01); *G01B 11/2513* (2013.01)
USPC .......................................................... 33/503

(58) Field of Classification Search
CPC ............ G01B 11/007; G01B 11/2509; G01B 11/2513
USPC .......................................................... 33/503
See application file for complete search history.

(56) References Cited

U.S. PATENT DOCUMENTS 1,535,312 A 4/1925 Hosking
1,918,813 A 7/1933 J. Kinzy
(Continued)

FOREIGN PATENT DOCUMENTS

CN 2236119 9/1996
CN 2508896 9/2002
(Continued)

OTHER PUBLICATIONS

Examination Report for German Application No. 11 2011 100 193.2 Report dated Dec. 20, 2012; based on PCT/US2011/021249.
(Continued)

*Primary Examiner* — Christopher Fulton
(74) *Attorney, Agent, or Firm* — Cantor Colburn LLP

(57) ABSTRACT

A portable articulated arm coordinate measuring machine is provided. The coordinate measuring machine includes a base with an arm portion. A probe end is coupled to an end of the arm portion distal from the base. A device configured to emit a coded structured light onto an object to determine the three dimensional coordinates of a point on the object.

46 Claims, 35 Drawing Sheets

(56) References Cited

U.S. PATENT DOCUMENTS

| | | | |
|---|---|---|---|
| 2,316,573 A | 4/1943 | Egy | |
| 2,333,243 A | 11/1943 | Glab | |
| 2,702,683 A | 2/1955 | Green et al. | |
| 2,748,926 A | 6/1956 | Leahy | |
| 2,924,495 A | 2/1960 | Haines | |
| 2,966,257 A | 12/1960 | Littlejohn | |
| 2,983,367 A | 5/1961 | Paramater et al. | |
| 3,066,790 A | 12/1962 | Armbruster | |
| 3,458,167 A | 7/1969 | Cooley, Jr. | |
| 4,138,045 A | 2/1979 | Baker | |
| 4,340,008 A | 7/1982 | Mendelson | |
| 4,379,461 A | 4/1983 | Nilsson et al. | |
| 4,424,899 A | 1/1984 | Rosenberg | |
| 4,430,796 A | 2/1984 | Nakagawa | |
| 4,457,625 A | 7/1984 | Greenleaf et al. | |
| 4,506,448 A | 3/1985 | Topping et al. | |
| 4,537,233 A | 8/1985 | Vroonland et al. | |
| 4,606,696 A | 8/1986 | Slocum | |
| 4,659,280 A | 4/1987 | Akeel | |
| 4,663,852 A | 5/1987 | Guarini | |
| 4,664,588 A | 5/1987 | Newell et al. | |
| 4,676,002 A | 6/1987 | Slocum | |
| 4,714,339 A | 12/1987 | Lau et al. | |
| 4,751,950 A | 6/1988 | Bock | |
| 4,767,257 A | 8/1988 | Kato | |
| 4,790,651 A | 12/1988 | Brown et al. | |
| 4,816,822 A | 3/1989 | Vache et al. | |
| 4,882,806 A | 11/1989 | Davis | |
| 4,954,952 A | 9/1990 | Ubhayakar et al. | |
| 4,982,841 A | 1/1991 | Goedecke | |
| 4,996,909 A | 3/1991 | Vache et al. | |
| 5,025,966 A | 6/1991 | Potter | |
| 5,027,951 A | 7/1991 | Johnson | |
| 5,069,524 A | 12/1991 | Watanabe et al. | |
| 5,189,797 A | 3/1993 | Granger | |
| 5,205,111 A | 4/1993 | Johnson | |
| 5,211,476 A | 5/1993 | Coudroy | |
| 5,213,240 A | 5/1993 | Dietz et al. | |
| 5,219,423 A | 6/1993 | Kamaya | |
| 5,239,855 A | 8/1993 | Schleifer et al. | |
| 5,289,264 A | 2/1994 | Steinbichler | |
| 5,319,445 A | 6/1994 | Fitts | |
| 5,332,315 A | 7/1994 | Baker et al. | |
| 5,372,250 A | 12/1994 | Johnson | |
| 5,373,346 A | 12/1994 | Hocker | |
| 5,402,582 A | 4/1995 | Raab | |
| 5,412,880 A | 5/1995 | Raab | |
| 5,430,384 A | 7/1995 | Hocker | |
| 5,455,670 A | 10/1995 | Payne et al. | |
| 5,455,993 A | 10/1995 | Link et al. | |
| 5,510,977 A | 4/1996 | Raab | |
| 5,528,505 A | 6/1996 | Granger et al. | |
| 5,535,524 A | 7/1996 | Carrier et al. | |
| 5,611,147 A | 3/1997 | Raab | |
| 5,623,416 A | 4/1997 | Hocker, III | |
| 5,682,508 A | 10/1997 | Hocker, III | |
| 5,724,264 A | 3/1998 | Rosenberg et al. | |
| 5,752,112 A | 5/1998 | Paddock et al. | |
| 5,754,449 A | 5/1998 | Hoshal et al. | |
| 5,768,792 A | 6/1998 | Raab | |
| 5,829,148 A | 11/1998 | Eaton | |
| 5,832,416 A | 11/1998 | Anderson | |
| 5,887,122 A | 3/1999 | Terawaki et al. | |
| 5,926,782 A | 7/1999 | Raab | |
| 5,956,857 A | 9/1999 | Raab | |
| 5,973,788 A | 10/1999 | Pettersen et al. | |
| 5,978,748 A | 11/1999 | Raab | |
| 5,983,936 A | 11/1999 | Schwieterman et al. | |
| 5,996,790 A | 12/1999 | Yamada et al. | |
| 5,997,779 A | 12/1999 | Potter | |
| D423,534 S | 4/2000 | Raab et al. | |
| 6,050,615 A | 4/2000 | Weinhold | |
| 6,060,889 A | 5/2000 | Hocker | |
| 6,067,116 A | 5/2000 | Yamano et al. | |
| 6,125,337 A | 9/2000 | Rosenberg et al. | |
| 6,131,299 A | 10/2000 | Raab et al. | |
| 6,134,507 A * | 10/2000 | Markey et al. | 702/95 |
| 6,151,789 A | 11/2000 | Raab et al. | |
| 6,163,294 A | 12/2000 | Talbot | |
| 6,166,504 A | 12/2000 | Iida et al. | |
| 6,166,809 A | 12/2000 | Pettersen et al. | |
| 6,166,811 A | 12/2000 | Long et al. | |
| 6,219,928 B1 | 4/2001 | Raab et al. | |
| D441,632 S | 5/2001 | Raab et al. | |
| 6,240,651 B1 | 6/2001 | Schroeder et al. | |
| 6,253,458 B1 | 7/2001 | Raab et al. | |
| 6,282,195 B1 | 8/2001 | Miller et al. | |
| 6,298,569 B1 | 10/2001 | Raab et al. | |
| 6,366,831 B1 | 4/2002 | Raab | |
| 6,418,774 B1 | 7/2002 | Brogaardh et al. | |
| 6,438,856 B1 | 8/2002 | Kaczynski | |
| 6,442,419 B1 | 8/2002 | Chu et al. | |
| 6,460,004 B2 * | 10/2002 | Greer et al. | 702/104 |
| 6,470,584 B1 | 10/2002 | Stoodley | |
| 6,477,784 B2 | 11/2002 | Schroeder et al. | |
| 6,519,860 B1 | 2/2003 | Bieg et al. | |
| D472,824 S | 4/2003 | Raab et al. | |
| 6,547,397 B1 | 4/2003 | Kaufman et al. | |
| 6,598,306 B2 | 7/2003 | Eaton | |
| 6,611,346 B2 | 8/2003 | Granger | |
| 6,611,617 B1 | 8/2003 | Crampton | |
| 6,612,044 B2 | 9/2003 | Raab et al. | |
| 6,621,065 B1 | 9/2003 | Fukumoto et al. | |
| 6,626,339 B2 | 9/2003 | Gates et al. | |
| 6,633,051 B1 | 10/2003 | Holloway et al. | |
| 6,668,466 B1 | 12/2003 | Bieg et al. | |
| D491,210 S | 6/2004 | Raab et al. | |
| 6,764,185 B1 | 7/2004 | Beardsley et al. | |
| 6,789,327 B2 | 9/2004 | Roth et al. | |
| 6,820,346 B2 | 11/2004 | Raab et al. | |
| 6,822,749 B1 | 11/2004 | Christoph | |
| 6,826,664 B2 | 11/2004 | Hocker, III et al. | |
| 6,868,359 B2 | 3/2005 | Raab | |
| 6,879,933 B2 | 4/2005 | Steffey et al. | |
| 6,892,465 B2 | 5/2005 | Raab et al. | |
| 6,895,347 B2 | 5/2005 | Dorny et al. | |
| 6,901,673 B1 | 6/2005 | Cobb et al. | |
| 6,904,691 B2 | 6/2005 | Raab et al. | |
| 6,920,697 B2 | 7/2005 | Raab et al. | |
| 6,925,722 B2 | 8/2005 | Raab et al. | |
| 6,931,745 B2 | 8/2005 | Granger | |
| 6,935,748 B2 | 8/2005 | Kaufman et al. | |
| 6,948,255 B2 | 9/2005 | Russell | |
| 6,965,843 B2 | 11/2005 | Raab et al. | |
| 7,003,892 B2 | 2/2006 | Eaton et al. | |
| 7,006,084 B1 | 2/2006 | Buss et al. | |
| 7,024,032 B2 | 4/2006 | Kidd et al. | |
| 7,032,321 B2 | 4/2006 | Raab et al. | |
| 7,040,136 B2 | 5/2006 | Forss et al. | |
| 7,051,447 B2 | 5/2006 | Kikuchi et al. | |
| 7,106,421 B2 | 9/2006 | Matsuura et al. | |
| 7,117,107 B2 | 10/2006 | Dorny et al. | |
| 7,120,092 B2 | 10/2006 | del Prado Pavon et al. | |
| 7,152,456 B2 | 12/2006 | Eaton | |
| 7,174,651 B2 | 2/2007 | Raab et al. | |
| 7,184,047 B1 | 2/2007 | Crampton | |
| 7,191,541 B1 | 3/2007 | Weekers et al. | |
| 7,193,690 B2 | 3/2007 | Ossig et al. | |
| 7,196,509 B2 | 3/2007 | Teng | |
| 7,199,872 B2 | 4/2007 | Van Cranenbroeck | |
| 7,230,689 B2 | 6/2007 | Lau | |
| 7,242,590 B2 | 7/2007 | Yeap et al. | |
| 7,249,421 B2 | 7/2007 | MacManus et al. | |
| 7,269,910 B2 | 9/2007 | Raab et al. | |
| 7,285,793 B2 | 10/2007 | Husted | |
| 7,296,979 B2 | 11/2007 | Raab et al. | |
| 7,306,339 B2 | 12/2007 | Kaufman et al. | |
| 7,312,862 B2 | 12/2007 | Zumbrunn et al. | |
| 7,313,264 B2 | 12/2007 | Crampton | |
| 7,319,512 B2 | 1/2008 | Ohtomo et al. | |
| 7,337,344 B2 | 2/2008 | Barman et al. | |
| 7,348,822 B2 | 3/2008 | Baer | |
| 7,352,446 B2 | 4/2008 | Bridges et al. | |
| 7,360,648 B1 | 4/2008 | Blaschke | |

(56) References Cited

U.S. PATENT DOCUMENTS

| | | |
|---|---|---|
| 7,372,558 B2 | 5/2008 | Kaufman et al. |
| 7,372,581 B2 | 5/2008 | Raab et al. |
| 7,383,638 B2 | 6/2008 | Granger |
| 7,388,654 B2 | 6/2008 | Raab et al. |
| 7,395,606 B2 | 7/2008 | Crampton |
| 7,430,068 B2 | 9/2008 | Becker et al. |
| 7,441,341 B2 | 10/2008 | Eaton |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,508,971 B2 | 3/2009 | Vaccaro et al. |
| 7,525,276 B2 | 4/2009 | Eaton |
| 7,545,517 B2 | 6/2009 | Rueb et al. |
| 7,546,689 B2 | 6/2009 | Ferrari et al. |
| 7,552,644 B2 | 6/2009 | Haase et al. |
| 7,561,598 B2 | 7/2009 | Stratton et al. |
| 7,564,250 B2 | 7/2009 | Hocker |
| 7,578,069 B2 | 8/2009 | Eaton |
| D599,226 S | 9/2009 | Gerent et al. |
| 7,589,595 B2 | 9/2009 | Cutler |
| 7,591,077 B2 | 9/2009 | Pettersson |
| 7,591,078 B2 | 9/2009 | Crampton |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| 7,625,335 B2 | 12/2009 | Deichmann et al. |
| D607,350 S | 1/2010 | Cooduvalli et al. |
| 7,656,751 B2 | 2/2010 | Rischar et al. |
| 7,693,325 B2 | 4/2010 | Pulla et al. |
| 7,701,592 B2 | 4/2010 | Saint Clair et al. |
| 7,712,224 B2 | 5/2010 | Hicks |
| 7,721,396 B2 | 5/2010 | Fleischman |
| 7,735,234 B2 | 6/2010 | Briggs et al. |
| 7,743,524 B2 | 6/2010 | Eaton et al. |
| 7,752,003 B2 | 7/2010 | MacManus |
| 7,765,707 B2 | 8/2010 | Tomelleri |
| 7,769,559 B2 | 8/2010 | Reichert |
| 7,774,949 B2 | 8/2010 | Ferrari |
| 7,779,548 B2 | 8/2010 | Ferrari |
| 7,779,553 B2 | 8/2010 | Jordil et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| RE42,055 E | 1/2011 | Raab et al. |
| RE42,082 E | 2/2011 | Raab et al. |
| 7,881,896 B2 | 2/2011 | Atwell et al. |
| 7,903,261 B2 | 3/2011 | Saint Clair et al. |
| 7,908,757 B2 | 3/2011 | Ferrari |
| 8,052,857 B2 | 11/2011 | Townsend |
| 8,065,861 B2 | 11/2011 | Caputo |
| 8,082,673 B2 | 12/2011 | Desforges et al. |
| 8,099,877 B2 | 1/2012 | Champ |
| 8,123,350 B2 | 2/2012 | Cannell et al. |
| 8,352,212 B2 | 1/2013 | Fetter et al. |
| 8,533,967 B2 * | 9/2013 | Bailey et al. .................. 33/503 |
| 8,537,374 B2 * | 9/2013 | Briggs et al. ................ 356/614 |
| 8,619,265 B2 * | 12/2013 | Steffey et al. .............. 356/614 |
| 8,677,643 B2 * | 3/2014 | Bridges et al. ............... 33/503 |
| 8,683,709 B2 * | 4/2014 | York .............................. 33/503 |
| 2001/0004269 A1 | 6/2001 | Shibata et al. |
| 2002/0032541 A1 | 3/2002 | Raab et al. |
| 2002/0087233 A1 | 7/2002 | Raab |
| 2002/0128790 A1 | 9/2002 | Woodmansee |
| 2002/0170192 A1 | 11/2002 | Steffey et al. |
| 2003/0033104 A1 | 2/2003 | Gooche |
| 2003/0053037 A1 | 3/2003 | Blaesing-Bangert et al. |
| 2003/0125901 A1 | 7/2003 | Steffey et al. |
| 2003/0142631 A1 | 7/2003 | Silvester |
| 2003/0167647 A1 | 9/2003 | Raab et al. |
| 2003/0172536 A1 | 9/2003 | Raab et al. |
| 2003/0172537 A1 | 9/2003 | Raab et al. |
| 2003/0208919 A1 | 11/2003 | Raab et al. |
| 2003/0221326 A1 | 12/2003 | Raab et al. |
| 2004/0022416 A1 | 2/2004 | Lemelson et al. |
| 2004/0040166 A1 | 3/2004 | Raab et al. |
| 2004/0103547 A1 | 6/2004 | Raab et al. |
| 2004/0111908 A1 | 6/2004 | Raab et al. |
| 2004/0139265 A1 | 7/2004 | Hocker et al. |
| 2004/0162700 A1 | 8/2004 | Rosenberg et al. |
| 2004/0259533 A1 | 12/2004 | Nixon et al. |
| 2005/0016008 A1 | 1/2005 | Raab et al. |
| 2005/0028393 A1 | 2/2005 | Raab et al. |
| 2005/0085940 A1 | 4/2005 | Griggs et al. |
| 2005/0144799 A1 | 7/2005 | Raab et al. |
| 2005/0151963 A1 | 7/2005 | Pulla et al. |
| 2005/0166413 A1 | 8/2005 | Crampton |
| 2005/0188557 A1 | 9/2005 | Raab et al. |
| 2005/0259271 A1 | 11/2005 | Christoph |
| 2005/0276466 A1 | 12/2005 | Vaccaro et al. |
| 2005/0283989 A1 | 12/2005 | Pettersson |
| 2006/0016086 A1 | 1/2006 | Raab et al. |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056459 A1 | 3/2006 | Stratton et al. |
| 2006/0056559 A1 | 3/2006 | Pleasant et al. |
| 2006/0059270 A1 | 3/2006 | Pleasant et al. |
| 2006/0096108 A1 | 5/2006 | Raab et al. |
| 2006/0123649 A1 | 6/2006 | Muller |
| 2006/0129349 A1 | 6/2006 | Raab et al. |
| 2006/0169050 A1 | 8/2006 | Kobayashi et al. |
| 2006/0169608 A1 | 8/2006 | Carnevali |
| 2006/0287769 A1 | 12/2006 | Yanagita et al. |
| 2006/0291970 A1 | 12/2006 | Granger |
| 2007/0030841 A1 | 2/2007 | Lee et al. |
| 2007/0043526 A1 | 2/2007 | De Jonge et al. |
| 2007/0050774 A1 | 3/2007 | Eldson et al. |
| 2007/0055806 A1 | 3/2007 | Stratton et al. |
| 2007/0058162 A1 | 3/2007 | Granger |
| 2007/0097382 A1 | 5/2007 | Granger |
| 2007/0105238 A1 | 5/2007 | Mandl et al. |
| 2007/0142970 A1 | 6/2007 | Burbank et al. |
| 2007/0147265 A1 | 6/2007 | Eidson |
| 2007/0147435 A1 | 6/2007 | Hamilton et al. |
| 2007/0147562 A1 | 6/2007 | Eidson |
| 2007/0153297 A1 | 7/2007 | Lau |
| 2007/0163134 A1 | 7/2007 | Eaton |
| 2007/0163136 A1 | 7/2007 | Eaton |
| 2007/0176648 A1 | 8/2007 | Baer |
| 2007/0177016 A1 | 8/2007 | Wu |
| 2007/0183459 A1 | 8/2007 | Eidson |
| 2007/0185682 A1 | 8/2007 | Eidson |
| 2007/0217169 A1 | 9/2007 | Yeap et al. |
| 2007/0217170 A1 | 9/2007 | Yeap et al. |
| 2007/0221522 A1 | 9/2007 | Yamada et al. |
| 2007/0223477 A1 | 9/2007 | Eidson |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2007/0294045 A1 | 12/2007 | Atwell et al. |
| 2008/0046221 A1 | 2/2008 | Stathis |
| 2008/0052936 A1 | 3/2008 | Briggs et al. |
| 2008/0066583 A1 | 3/2008 | Lott |
| 2008/0068103 A1 | 3/2008 | Cutler |
| 2008/0080562 A1 | 4/2008 | Burch et al. |
| 2008/0096108 A1 | 4/2008 | Sumiyama et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0179206 A1 | 7/2008 | Feinstein et al. |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0228331 A1 | 9/2008 | McNerney et al. |
| 2008/0232269 A1 | 9/2008 | Tatman et al. |

(56) References Cited

U.S. PATENT DOCUMENTS

| | | |
|---|---|---|
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0245452 A1 | 10/2008 | Law et al. |
| 2008/0246943 A1 | 10/2008 | Kaufman et al. |
| 2008/0252671 A1 | 10/2008 | Cannell et al. |
| 2008/0256814 A1 | 10/2008 | Pettersson |
| 2008/0257023 A1 | 10/2008 | Jordil et al. |
| 2008/0263411 A1 | 10/2008 | Baney et al. |
| 2008/0271332 A1 | 11/2008 | Jordil et al. |
| 2008/0282564 A1 | 11/2008 | Pettersson |
| 2008/0295349 A1 | 12/2008 | Uhl et al. |
| 2008/0298254 A1 | 12/2008 | Eidson |
| 2008/0302200 A1 | 12/2008 | Tobey |
| 2008/0309460 A1 | 12/2008 | Jefferson et al. |
| 2009/0000136 A1 | 1/2009 | Crampton |
| 2009/0016475 A1 | 1/2009 | Rischar et al. |
| 2009/0031575 A1 | 2/2009 | Tomelleri |
| 2009/0046140 A1 | 2/2009 | Lashmet et al. |
| 2009/0046895 A1 | 2/2009 | Pettersson et al. |
| 2009/0049704 A1 | 2/2009 | Styles et al. |
| 2009/0083985 A1 | 4/2009 | Ferrari |
| 2009/0089004 A1 | 4/2009 | Vook et al. |
| 2009/0089078 A1 | 4/2009 | Bursey |
| 2009/0089233 A1 | 4/2009 | Gach et al. |
| 2009/0089623 A1 | 4/2009 | Neering et al. |
| 2009/0109797 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0139105 A1 | 6/2009 | Granger |
| 2009/0157419 A1 | 6/2009 | Bursey |
| 2009/0165317 A1 | 7/2009 | Little |
| 2009/0177435 A1 | 7/2009 | Heininen |
| 2009/0177438 A1 | 7/2009 | Raab |
| 2009/0187373 A1 | 7/2009 | Atwell et al. |
| 2009/0241360 A1 | 10/2009 | Tait et al. |
| 2009/0249634 A1 | 10/2009 | Pettersson |
| 2009/0265946 A1 | 10/2009 | Jordil et al. |
| 2010/0040742 A1 | 2/2010 | Dijkhuis et al. |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0123892 A1 | 5/2010 | Miller et al. |
| 2010/0128259 A1 | 5/2010 | Bridges et al. |
| 2010/0134596 A1 | 6/2010 | Becker |
| 2010/0148013 A1 | 6/2010 | Bhotika et al. |
| 2010/0208062 A1 | 8/2010 | Pettersson |
| 2010/0277747 A1 | 11/2010 | Rueb et al. |
| 2010/0281705 A1 | 11/2010 | Verdi et al. |
| 2010/0286941 A1 | 11/2010 | Merlot |
| 2010/0312524 A1 | 12/2010 | Siercks et al. |
| 2010/0318319 A1 | 12/2010 | Maierhofer |
| 2010/0325907 A1 | 12/2010 | Tait |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0019155 A1 | 1/2011 | Daniel et al. |
| 2011/0023578 A1 | 2/2011 | Grasser |
| 2011/0043515 A1 | 2/2011 | Stathis |
| 2011/0094908 A1 | 4/2011 | Trieu |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0111849 A1 | 5/2011 | Sprague et al. |
| 2011/0112786 A1 | 5/2011 | Desforges et al. |
| 2011/0119025 A1 | 5/2011 | Fetter et al. |
| 2011/0164114 A1 | 7/2011 | Kobayashi et al. |
| 2011/0166824 A1 | 7/2011 | Haisty et al. |
| 2011/0169924 A1 | 7/2011 | Haisty et al. |
| 2011/0173827 A1 | 7/2011 | Bailey et al. |
| 2011/0173828 A1 | 7/2011 | York |
| 2011/0178755 A1 | 7/2011 | York |
| 2011/0178758 A1* | 7/2011 | Atwell et al. .................. 702/134 |
| 2011/0178762 A1 | 7/2011 | York |
| 2011/0178764 A1 | 7/2011 | York |
| 2011/0178765 A1 | 7/2011 | Atwell et al. |
| 2011/0192043 A1 | 8/2011 | Ferrari |
| 2011/0273568 A1 | 11/2011 | Lagassey |
| 2012/0181194 A1 | 7/2012 | McEwan et al. |
| 2012/0210678 A1 | 8/2012 | Alcouloumre et al. |
| 2012/0260512 A1 | 10/2012 | Kretschmer et al. |
| 2012/0260611 A1 | 10/2012 | Jones |
| 2013/0025143 A1 | 1/2013 | Bailey et al. |
| 2013/0025144 A1 | 1/2013 | Briggs et al. |
| 2013/0027515 A1 | 1/2013 | Vinther et al. |
| 2013/0062243 A1 | 3/2013 | Chang et al. |
| 2013/0205606 A1 | 8/2013 | Briggs et al. |
| 2013/0212889 A9 | 8/2013 | Bridges et al. |
| 2013/0222816 A1* | 8/2013 | Briggs et al. .................. 356/614 |
| 2014/0002608 A1* | 1/2014 | Atwell et al. .................... 348/46 |

FOREIGN PATENT DOCUMENTS

| | | |
|---|---|---|
| CN | 2665668 | 12/2004 |
| CN | 1818537 | 8/2006 |
| CN | 201266071 | 7/2009 |
| DE | 3245060 A1 | 7/1983 |
| DE | 4410775 A1 | 10/1995 |
| DE | 29622033 | 2/1997 |
| DE | 19543763 A1 | 5/1997 |
| DE | 19820307 A1 | 11/1999 |
| DE | 10026357 | 1/2002 |
| DE | 202005000983 U1 | 4/2005 |
| DE | 102004015668 B3 | 9/2005 |
| DE | 19720049 B4 | 1/2006 |
| DE | 10114126 B4 | 8/2006 |
| DE | 102004010083 B4 | 11/2006 |
| DE | 102005060967 A1 | 6/2007 |
| DE | 102006023902 | 11/2007 |
| DE | 102006035292 | 1/2008 |
| DE | 102008039838 | 3/2010 |
| DE | 102005036929 B4 | 6/2010 |
| DE | 102008062763 B3 | 7/2010 |
| DE | 102009001894 | 9/2010 |
| EP | 0546784 A2 | 6/1993 |
| EP | 0730210 A1 | 9/1996 |
| EP | 0614517 | 3/1997 |
| EP | 1160539 | 12/2001 |
| EP | 1189124 | 3/2002 |
| EP | 0767357 B1 | 5/2002 |
| EP | 1361414 A1 | 11/2003 |
| EP | 1452279 | 9/2004 |
| EP | 1468791 A1 | 10/2004 |
| EP | 1669713 A1 | 6/2006 |
| EP | 1734425 A2 | 12/2006 |
| EP | 1429109 | 4/2007 |
| EP | 1764579 | 12/2007 |
| EP | 1878543 | 1/2008 |
| EP | 1967930 A2 | 9/2008 |
| EP | 2023077 A1 | 2/2009 |
| EP | 2060530 A1 | 5/2009 |
| EP | 2068067 A1 | 6/2009 |
| EP | 2108917 A1 | 10/2009 |
| EP | 2400261 | 12/2011 |
| FR | 2935043 A1 | 2/2010 |
| GB | 894320 | 4/1962 |
| GB | 2255648 A | 11/1992 |
| GB | 2341203 A | 3/2000 |
| GB | 2420241 A | 5/2006 |
| GB | 2452033 A | 2/2009 |
| GB | 2452033 A | 2/2009 |
| JP | 5581525 | 6/1955 |
| JP | S575584 | 1/1982 |
| JP | 5827264 | 2/1983 |
| JP | S59133890 | 8/1984 |
| JP | 6313710 A | 11/1994 |
| JP | 7210586 A | 8/1995 |
| JP | 2003194526 | 7/2003 |
| JP | 2004257927 A | 9/2004 |
| JP | 2005517908 | 6/2005 |

(56) References Cited

FOREIGN PATENT DOCUMENTS

| | | |
|---|---|---|
| JP | 2006241833 | 9/2006 |
| JP | 2006301991 A | 11/2006 |
| JP | 2009524057 | 6/2009 |
| WO | 9208568 A1 | 5/1992 |
| WO | 9808050 | 2/1998 |
| WO | 9910706 A1 | 3/1999 |
| WO | 0014474 | 3/2000 |
| WO | 0033149 | 6/2000 |
| WO | 0034733 | 6/2000 |
| WO | 02101323 A2 | 12/2002 |
| WO | 2004096502 A1 | 11/2004 |
| WO | 2005072917 A1 | 8/2005 |
| WO | 2005075875 | 8/2005 |
| WO | 2005100908 A1 | 10/2005 |
| WO | 2006051264 A1 | 5/2006 |
| WO | 2007002319 A1 | 1/2007 |
| WO | 2007028941 A1 | 3/2007 |
| WO | 2007125081 A1 | 11/2007 |
| WO | 2007144906 A1 | 12/2007 |
| WO | 2008027588 A2 | 3/2008 |
| WO | 2008047171 | 4/2008 |
| WO | 2008064276 A3 | 5/2008 |
| WO | 2008066896 | 6/2008 |
| WO | 2008075170 A1 | 6/2008 |
| WO | 2008157061 A1 | 12/2008 |
| WO | 2009001165 A1 | 12/2008 |
| WO | 2009016185 A1 | 2/2009 |
| WO | 2009083452 A1 | 7/2009 |
| WO | 2009127526 A1 | 10/2009 |
| WO | 2009130169 A1 | 10/2009 |
| WO | 2009149740 A1 | 12/2009 |
| WO | 2010040742 A1 | 4/2010 |
| WO | 2010092131 A1 | 8/2010 |
| WO | 2010108089 A2 | 9/2010 |
| WO | 2010148525 A1 | 12/2010 |
| WO | 2011000435 A1 | 1/2011 |
| WO | 2011000955 A1 | 1/2011 |
| WO | 2011057130 A2 | 5/2011 |
| WO | 2012038446 A1 | 3/2012 |

OTHER PUBLICATIONS

Faro Product Catalog; Faro Arm; 68 pages; Faro Technologies Inc. 2009; printed Aug. 3, 2009.
Romer Measuring Arms; Portable CMMs for the shop floor; 20 pages; Hexagon Metrology, Inc. (2009) http//us.ROMER.com.
German Office Action and English Language summary for DE 112011100292.0 filed Jul. 3, 2012, based on PCT Application US2011/021252 filed Jan. 14, 2011.
German Patent Application No. 11 2011 100 291.2 dated Dec. 20, 2012.
Japanese Office Action and English Language summary for JP2012-550042 filed Jul. 20, 2012; based on International Application No. PCT/US2011/021249 filed Jan. 14, 2011.
Japanese Office Action and English Language summary for JP2012-550044 filed Jul. 20, 2012; based on International Application No. PCT/US2011/021252 filed Jan. 14, 2011.
Japanese Office Action and English Language summary for JP2012-550043 filed Jul. 20, 2012; based on International Application No. PCT/US2011/021250 filed Jan. 14, 2011.
International Search Report of the International Searching Authority for Application No. PCT/US2013/022186; Date of Mailing: May 29, 2013.
Written Opinion of the International Searching Authority for Application No. PCT/US2013/022186; Date of Mailing: May 29, 2013.
A. Hart; "Kinematic Coupling Interchangibility" Precision Engineering; vol. 28, No. 1; Jan. 1, 2004 pp. 1-15.
ABB Flexibile Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (retrieved Aug. 26, 2011).
Anonymous: So wird's gemacht: Mit T-DSL and Windows XP Home Edition gemeinsam ins Internet (Teil 3) Internet Citation, Jul. 2003, XP002364586, Retrieved from Internet: URL:http://support.microsfot.com/kb/814538/DE/ [retrieved on Jan. 26, 2006]eh whole document.
GoMeasure3D—Your source for all things measurement, Baces 3D 100 Series Portable CMM from GoMeasure3D, [online], [retrieved Nov. 29, 2011], http://www.gomeasure3d.com/baces100.html.
Cho, et al., Implementation of a Precision Time Protocol over Low Rate Wireless Personal Area Networks, IEEE, 2008.
Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.
Information on Electro-Optical Information Systems; EOIS 3D Mini-Moire C.M.M. Sensor for Non-Contact Measuring & Surface Mapping; Direct Dimensions, Jun. 1995.
Dylan, Craig R., High Precision Makes the Massive Bay Bridge Project Work. Suspended in MidAir—Cover Story—Point of Beginning, Jan. 1, 2010, [online] http://www.pobonline.com/Articles/Cover_Story/BNP_GUID_9-5-2006_A_10000000000 . . . [Retreived Jan. 25, 2010].
Franklin, Paul F., What IEEE 1588 Means for Your Next T&M System Design, Keithley Instruments, Inc., [on-line] Oct. 19, 2010, http://www.eetimes.com/General/
DisplayPrintViewContent?contentItemId=4209746, [Retreived Oct. 21, 2010].
It is Alive in the Lab, Autodesk University, Fun with the Immersion MicroScribe Laser Scanner, [online], [retrieved Nov. 29 2011], http://labs.blogs.com/its_alive_in_the_lab/2007/11/fun-with-the-im.html.
Ghost 3D Systems, Authorized MicroScribe Solutions, FAQs—MicroScribe 3D Laser, MicroScan Tools, & related info, [online], [retrieved Nov. 29, 2011], http://microscribe.ghost3d.com/gt_microscan-3d_faqs.htm,.
Electro-Optical Information Systems, "The Handy Handheld Digitizer" [online], [retrieved on Nov. 29, 2011], http://vidibotics.com/htm/handy.htm.
HYDROpro Navigation, Hydropgraphic Survey Software, Trimble, www.trimble.com, Copyright 1997-2003.
Written Opinion of the International Searching Authority for International Application No. PCT/US2011/021252 mailed Apr. 27, 2011.
Written Opinion of the International Searching Authority for International Application No. PCT/US2011/021250 mailed Apr. 18, 2011.
International Preliminary Report on Patentability for PCT/US2011/021274; Date of Completion Apr. 12, 2012.
International Preliminary Report on Patentability mailed May 9, 2012 for International Application Serial No. PCT/US2011/021253 International filing date Jan. 14, 2011. Date of Completion May 9, 2012.
International Search Report for International Application No. PCT/2011/020625 mailed Feb. 25, 2011.
International Search Report for International Application No. PCT/US2011/021270 mailed May 2, 2011.
International Search Report for International Application No. PCT/US2011/021274 mailed May 6, 2011.
International Search Report for International Application No. PCT/US2011/021276 mailed May 17, 2011.
International Search Report for International Application No. PCT/US2011/021246 mailed Apr. 12, 2011.
International Search Report for International Application No. PCT/US2011/021248 mailed Sep. 19, 2011.
International Search Report for International Application No. PCT/US2011/021249 mailed Apr. 21, 2011.
Internation Search Report for International Application No. PCT/US2011/021250 mailed Apr. 18, 2011.
International Search Report for International Application No. PCT/US2011/021252 mailed Apr. 27, 2011.
International Search Report for International Application No. PCT/US2011/021253 mailed Sep. 26, 2011.
International Search Report for International Application No. PCT/US2011/021259 mailed May 25, 2011.

(56) References Cited

OTHER PUBLICATIONS

International Search Report for International Application No. PCT/US2011/021262 mailed May 11, 2011.
International Search Report for International Application No. PCT/US2011/021263 mailed May 4, 2011.
International Search Report for International Application No. PCT/US2011/021264 mailed May 31, 2011.
International Search Report for International Application No. PCT/US2011/021272 mailed Apr. 7, 2011.
International Search Report for International Application No. PCT/US2011/021273 mailed Apr. 20, 2011.
International Search Report for International Application No. PCT/US2011/021278 mailed May 25, 2011.
International Search Report for International Application No. PCT/US2011/021794 mailed Sep. 23, 2011.
International Search Report for International Application No. PCT/US2011/050787; Mailing date Mar. 11, 2011.
Jasperneite, et al., Enhancements to the Time Synchronization Standard IEEE-1588 for a System of Cascaded Bridges, IEEE, 2004.
Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.
MicroScan 3D User Guide, RSI GmbH, 3D Systems & Software, Oberursel, Germany, email: info@rsi-gmbh.de, Copyright RSI Roland Seifert Imaging GmbH 2008.
Patrick Willoughby; "Elastically Averaged Precision Alignment"; In: "Doctoral Thesis"; Jun. 1, 2005; Massachusetts Institute of Technology; XP55005620; Abstract 1.1 Motivation; Chapter 3, Chapter 6.
Romer Absolute Arm Maximum Performance Portable Measurement, (2010).
Romer Romer Absolute Arm Product Brochure: (2010); Hexagon Metrology; www.hexagonmetrology.com; Hexagon AB, 2010.
Sauter, et al., Towards New Hybrid Networks for Industrial Automation, IEEE, 2009.
Spada, et al., IEEE 1588 Lowers Integration Costs in Continuous Flow Automated Production Lines, XP-002498255, ARC Insights, Insight # 2003-33MD&H, Aug. 20, 2003.
Trimble—Trimble SPS630, SPS730 and SPS930 Universal Total Stations, [on-line] http://www.trimble.com/sps630_730_930.shtml (1 of 4), [Retreived Jan. 26, 2010 8:50:29AM].
Written Opinion of the International Searching Authority for International Application No. PCT/US2011/021246 mailed Apr. 12, 2011.
Written Opinion of the International Searching Authority for International Application No. PCT/US2011/021248 mailed Sep. 19, 2011.
Written Opinion of the International Searching Authority for International Application No. PCT/US2011/021249 mailed Apr. 21, 2011.
Written Opinion of the International Searching Authority for International Application No. PCT/US2011/021262 mailed May 11, 2011.
Written Opinion of the International Searching Authority for International Application No. PCT/US2011/021263 mailed May 4, 2011.
International Search Report for International Application No. PCT/US2013/040309 mailed Jul. 15, 2013.
Written Opinion for International Application No. PCT/US2013/040309 mailed Jul. 15, 2013.
MG Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.
P. Ben-Tzvi, et al "Extraction of 3D Images Using Pitch-Actuated 2D Laser Range Finder for Robotic Vision" (6 pages) BNSDOCID <XP 31840390A_1_>, (2010).
International Search Report for International Application No. PCT/US2013/040321 mailed Jul. 15, 2013.
YK Cho, et al. "Light-weight 3D LADAR System for Construction Robotic Operations" (pp. 237-244); 26th International Symposium on Automation and Robotics in Construction (ISARC 2009).
Written Opinion for International Application No. PCT/US2013/040321 mailed Jul. 15, 2013.
International Preliminary Report on Patentability for International Application Serial No. PCT/US2011/021246 International filing date Jan. 14, 2011. Date of Issuance Jul. 24, 2012.
International Preliminary Report on Patentability for International Application Serial No. PCT/US2011/021249 International filing date Jan. 14, 2011. Date of Issuance Jul. 24, 2012.
International Preliminary Report on Patentability for International Application Serial No. PCT/US2011/021250 International filing date Jan. 14, 2011. Date of Issuance Jul. 24, 2012.
International Preliminary Report on Patentability for International Application Serial No. PCT/US2011/021252 International filing date Jan. 14, 2011. Date of Issuance Jul. 24, 2012.
International Preliminary Report on Patentability for International Application Serial No. PCT/US2011/021247 International filing date Jan. 14, 2011. Date of Issuance Jul. 24, 2012.
International Preliminary Report on Patentability for International Application Serial No. PCT/US2011/021259. International filing date Jan. 14, 2011. Date of Issuance Jul. 24, 2012.
International Preliminary Report on Patentability for International Application Serial No. PCT/US2011/021262. International filing date Jan. 14, 2011. Date of Issuance Jul. 24, 2012.
International Preliminary Report on Patentability for International Application Serial No. PCT/US2011/021263. International filing date Jan. 14, 2011. Date of Issuance Jul. 24, 2012.
International Preliminary Report on Patentability for International Application Serial No. PCT/US2011/021264. International filing date Jan. 14, 2011. Date of Issuance Jul. 24, 2012.
International Preliminary Report on Patentability for International Application Serial No. PCT/US2011/021270. International filing date Jan. 14, 2011. Date of Issuance Jul. 24, 2012.
International Preliminary Report on Patentability for International Application Serial No. PCT/US2011/021272. International filing date Jan. 14, 2011. Date of Issuance Jul. 24, 2012.
International Preliminary Report on Patentability for International Application Serial No. PCT/US2011/021273. International filing date Jan. 14, 2011. Date of Issuance Jul. 24, 2012.
International Preliminary Report on Patentability for International Application Serial No. PCT/US2011/021276. International filing date Jan. 14, 2011. Date of Issuance Jul. 24, 2012.
International Preliminary Report on Patentability for International Application Serial No. PCT/US2011/021278. International filing date Jan. 14, 2011. Date of Issuance Jul. 24, 2012.
International Preliminary Report on Patentability for International Application Serial No. PCT/US2011/021794. International filing date Jan. 20, 2011. Date of Issuance Jul. 24, 2012.
International Preliminary Report on Patentability for PCT/US2011/020625; Date of Issuance Jul. 17, 2012.
International Search Report for International Application No. PCT/US2011/021247 mailed Aug. 26, 2011.
J.Geng "Structured-Light 3D Surface Imaging: A Tutorial" (pub. Mar. 31, 2011) Advances in Optics and Photonics 3, pp. 128-160; IEEE Intelligent Transportation System Society; 2011 Optical Society of America.
Written Opinion of the International Searching Authority for International Application No. PCT/US2011/021247 mailed Aug. 26, 2011.
MOOG Components Group; "Fiber Optic Rotary Joints; Product Guide" (4 pages) Dec. 2010; MOOG, Inc. 2010.
MOOG Components Group "Technical Brief; Fiber Optic Rotary Joints" Document No. 303 (6 pages) Mar. 2008; MOOG, Inc. 2008 Canada; Focal Technologies.
International Search Report dated Nov. 28, 2013 for International Application No. PCT/13/049562 filed Jul. 8, 2013 (7 pages).
Written Opinion of the International Search Authority dated Nov. 28, 2013 for International Application No. PCT/13/049562 filed Jul. 8, 2013 (10 pages).
Examination Report under Section 18(3); Report dated Oct. 31, 2012; Application No. GB1210309.5.
Examination Report under Section 18(3); Report dated Oct. 31, 2012; Application No. GB1210309.9.
GB Office Action dated Jan. 15, 2014 for SJB/PX210785GB; UK Patent Application No. 1214426.7.

(56) References Cited

OTHER PUBLICATIONS

Romer "Romer Measuring Arms Portable CMMs for R&D and shop floor" (Mar. 2009) Hexagon Metrology (16 pages).
Examination Report for German Application No. 11 2011 100 290.4 Report dated Jul. 16, 2013; based on PCT/US2011/021247.
Jgeng "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (2011) SPIE.
International Search Report for International Application No. PCT/US/2013/041826 filed May 20, 2013; mailed Jul. 29, 2013.
Written Opinion for International Application No. PCT/US/2013/041826 filed May 20, 2013; mailed Jul. 29, 2013.
Examination Report under Section 18(3); Report dated Nov. 1, 2012; Application No. GB1210311.5.
Examination Report under Section 18(3); Report dated Nov. 6, 2012; Application No. GB1210306.5.
Written Opinion of the International Searching Authority for International Application No. PCT/US2011/021253 mailed Sep. 26, 2011.
Written Opinion of the International Searching Authority for International Application No. PCT/US2011/021259 mailed May 25, 2011.
Written Opinion of the International Searching Authority for International Application No. PCT/US2011/021264 mailed May 31, 2011.
Written Opinion of the International Searching Authority for International Application No. PCT/US2011/021272 mailed Apr. 7, 2011.
Written Opinion of the International Searching Authority for International Application No. PCT/US2011/021273 mailed Apr. 20, 2011.
Written Opinion of the International Searching Authority for International Application No. PCT/US2011/021278 mailed May 25, 2011.
Written Opinion of the International Searching Authority for International Application No. PCT/US2011/021794 mailed Sep. 23, 2011.
Written Opinion of the International Searching Authority for International Application No. PCT/US2011/050787 mailed Mar. 11, 2011.
Written Opinion of the International Searching Authority for International Application No. PCT/US2011/021253 mailed Mar. 22, 2012.
Written Opinion of the International Searching Authority for International Application No. PCT/US2011/020625 mailed Feb. 25, 2011.
Written Opinion of the International Searching Authority for International Application No. PCT/US2011/021270 mailed May 2, 2011.
Written Opinion of the International Searching Authority for International Application No. PCT/US2011/021274 mailed May 6, 2011.
Written Opinion of the International Searching Authority for International Application No. PCT/US2011/021276 mailed May 17, 2011.
Laser Reverse Engineering with Microscribe, [online], [retrieved Nov. 29, 2011], http://www.youtube.com/watch?v=8VRz_2aEJ4E&feature=PlayList&p=F63ABF74F30DC81B&playnext=1&playnext_from=PL&index=1.

\* cited by examiner

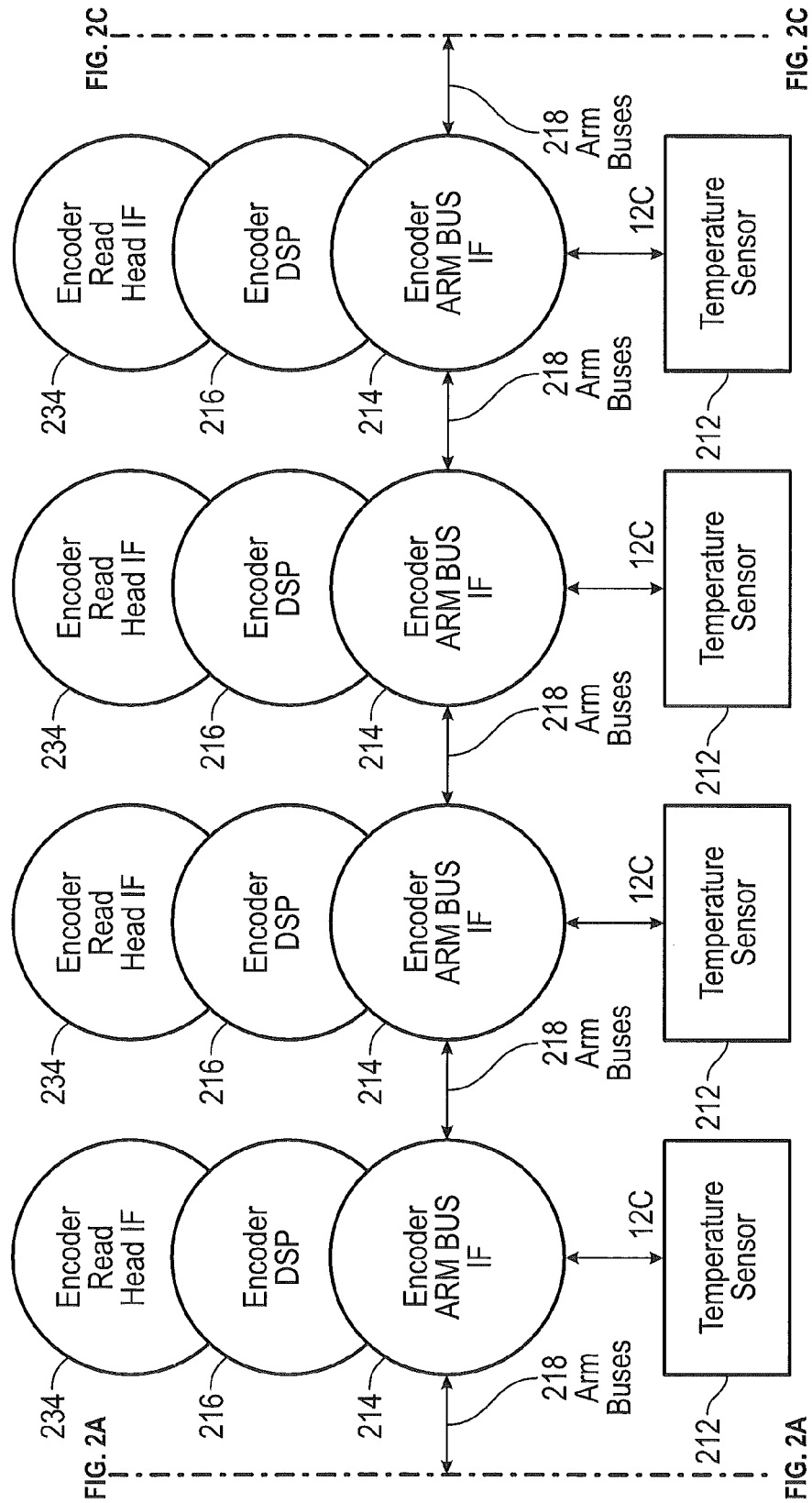

572

574

Lines of Red, Green, Violet

Blocks of Green, Violet, Red

Sinusoidal Pattern 1 (Standard Density)

Square Pattern

COORDINATE MEASUREMENT MACHINES WITH REMOVABLE ACCESSORIES

CROSS-REFERENCE TO RELATED APPLICATIONS

The present application is a continuation-in-part of U.S. patent application Ser. No. 13/006,507 filed Jan. 14, 2011, and claims the benefit of provisional application No. 61/296,555 filed Jan. 20, 2010, provisional application No. 61/355,279 filed Jun. 16, 2010, and provisional application No. 61/351,347 filed on Jun. 4, 2010, the contents of which are hereby incorporated by reference in their entirety.

BACKGROUND

The present disclosure relates to a coordinate measuring machine, and more particularly to a portable articulated arm coordinate measuring machine having a connector on a probe end of the coordinate measuring machine that allows accessory devices which use structured light for non-contact three dimensional measurement to be removably connected to the coordinate measuring machine.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

Three-dimensional surfaces may be measured using non-contact techniques as well. One type of non-contact device, sometimes referred to as a laser line probe or laser line scanner, emits a laser light either on a spot, or along a line. An imaging device, such as a charge-coupled device (CCD) for example, is positioned adjacent the laser. The laser is arranged to emit a line of light which is reflected off of the surface. The surface of the object being measured causes a diffuse reflection which is captured by the imaging device. The image of the reflected line on the sensor will change as the distance between the sensor and the surface changes. By knowing the relationship between the imaging sensor and the laser and the position of the laser image on the sensor, triangulation methods may be used to measure three-dimensional coordinates of points on the surface. One issue that arises with laser line probes, is that the density of measured points may vary depending on the speed at which the laser line probe is moved across the surface of the object. The faster the laser line probe is moved, the greater the distance between the points and a lower point density. With a structured light scanner, the point spacing is typically uniform in each of the two dimensions, thereby generally providing uniform measurement of workpiece surface points.

While existing CMM's are suitable for their intended purposes, what is needed is a portable AACMM that has certain features of embodiments of the present invention.

SUMMARY OF THE INVENTION

In accordance with one embodiment of the invention, a portable articulated arm coordinate measuring machine (AACMM) for measuring three-dimensional coordinates of an object in space is provided. The AACMM includes a base. A manually positionable arm portion is provided having an opposed first end and second end, the arm portion being rotationally coupled to the base, the arm portion including a plurality of connected arm segments, each arm segment including at least one position transducer for producing a position signal. An electronic circuit is provided that receives the position signal from the at least one position transducer in each arm segment. A probe end is coupled to the first end. A noncontact three-dimensional measuring device is coupled to the probe end, the noncontact three-dimensional measuring device having a projector and an image sensor, the projector having a source plane, the projector configured to emit a structured light onto the object, the structured light located on the source plane and including at least three non-collinear pattern elements, the image sensor arranged to receive the structured light reflected from the object. A processor is electrically coupled to the electronic circuit, the processor configured to determine the three-dimensional coordinates of a point on the object in response to receiving the position signals from the position transducers and in response to receiving the structured light by the image sensor.

In accordance with one embodiment of the invention, a method of operating a portable articulated arm coordinate measuring machine for measuring the coordinates of an object in space is provided. The method includes providing a manually positionable arm portion having an opposed first end and second end, the arm portion including a plurality of connected arm segments, each arm segment including at least one position transducer for producing a position signal. A probe end is provided for measuring the object, the probe end being coupled to the first end. An electronic circuit receives the position signals from the transducers. A three-dimensional noncontact measurement device is provided having a controller, the three-dimensional noncontact measurement device having a sensor and a projector, the projector configured to emit a structured light onto the object, the projector having a source plane, the structured light located on the source plane and including at least three non-collinear pattern elements. A structured light is projected from the three-dimensional measurement device onto the object.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including

DETAILED DESCRIPTION

Figure 1A:
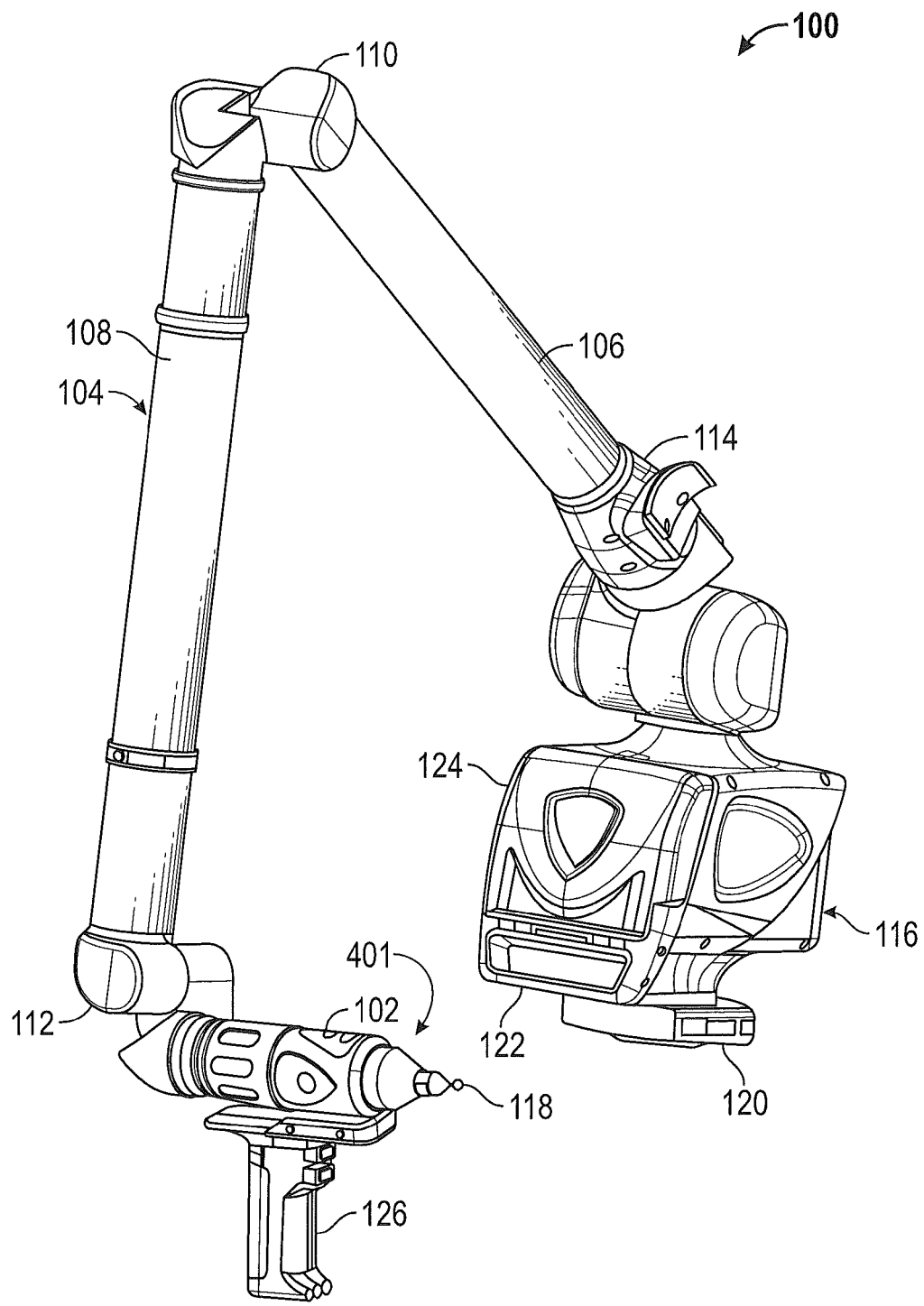
FIGS. 1A and 1B, are perspective views of a portable articulated arm coordinate measuring machine (AACMM) having embodiments of various aspects of the present invention therewithin.

Portable articulated arm coordinate measuring machines ("AACMM") are used in a variety of applications to obtain measurements of objects. Embodiments of the present invention provide advantages in allowing an operator to easily and quickly couple accessory devices to a probe end of the AACMM that use structured light to provide for the non-contact measuring of a three-dimensional object. Embodiments of the present invention provide further advantages in providing for communicating data representing a point cloud measured by the structured light device within the AACMM. Embodiments of the present invention provide advantages in greater uniformity in the distribution of measured points that may provide enhanced accuracy. Embodiments of the present invention provide still further advantages in providing power and data communications to a removable accessory without having external connections or wiring.

As used herein, the term "structured light" refers to a two-dimensional pattern of light projected onto a continuous and enclosed area of an object that conveys information which may be used to determine coordinates of points on the object. A structured light pattern will contain at least three non-collinear pattern elements disposed within the contiguous and enclosed area. Each of the three non-collinear pattern elements conveys information which may be used to determine the point coordinates.

In general, there are two types of structured light, a coded light pattern and an uncoded light pattern. As used herein a coded light pattern is one in which the three dimensional coordinates of an illuminated surface of the object may be ascertained by the acquisition of a single image. In some cases, the projecting device may be moving relative to the object. In other words, for a coded light pattern there will be no significant temporal relationship between the projected pattern and the acquired image. Typically, a coded light pattern will contain a set of elements (e.g. geometric shapes) arranged so that at least three of the elements are non-collinear. In some cases, the set of elements may be arranged into collections of lines. Having at least three of the element be non-collinear ensures that the pattern is not a simple line pattern as would be projected, for example, by a laser line scanner. As a result, the pattern elements are recognizable because of the arrangement of the elements.

In contrast, an uncoded structured light pattern as used herein is a pattern that does not allow measurement through a single pattern when the projector is moving relative to the object. An example of an uncoded light pattern is one which requires a series of sequential patterns and thus the acquisition of a series of sequential images. Due to the temporal nature of the projection pattern and acquisition of the image, there should be no relative movement between the projector and the object.

It should be appreciated that structured light is different from light projected by a laser line probe or laser line scanner type device that generates a line of light. To the extent that laser line probes used with articulated arms today have irregularities or other aspects that may be regarded as features within the generated lines, these features are disposed in a collinear arrangement. Consequently such features within a single generated line are not considered to make the projected light into structured light.

Figure 1B:
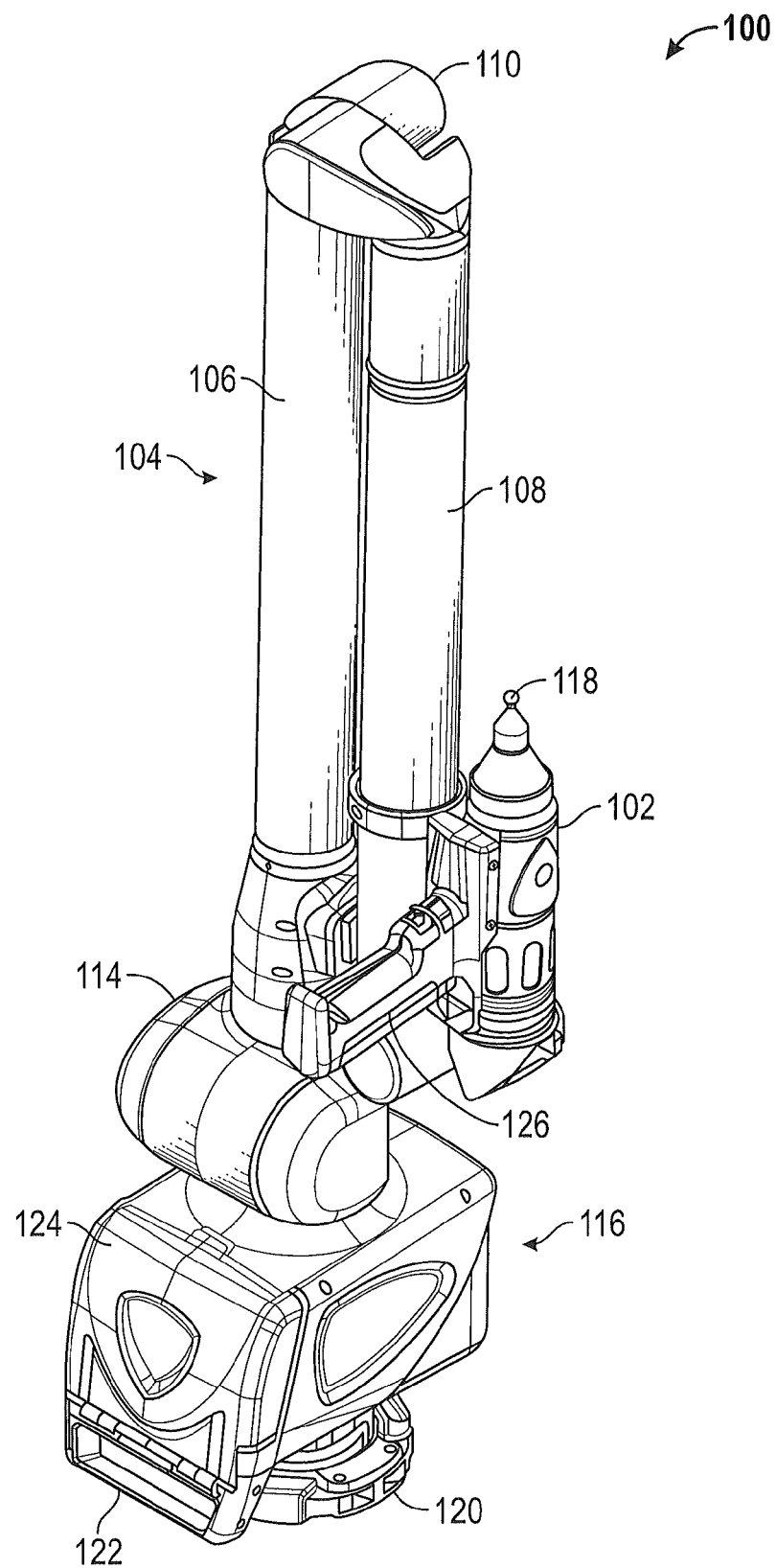

FIGS. 1A and 1B illustrate, in perspective, an AACMM 100 according to various embodiments of the present invention, an articulated arm being one type of coordinate measuring machine. As shown in FIGS. 1A and 1B, the exemplary AACMM 100 may comprise a six or seven axis articulated measurement device having a probe end 401 that includes a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 401 may include a measurement probe housing 102 that comprises the shaft of the seventh axis portion of the AACMM 100 (e.g., a cartridge containing an encoder system that determines movement of the measurement device, for example a probe 118, in the seventh axis of the AACMM 100). In this embodiment, the probe end 401 may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. As will be discussed in more detail below, the handle 126 may be replaced with another device configured to emit a structured light to provide non-contact measurement of three-dimensional objects, thereby providing advantages in allowing the operator to make both contact and non-contact measurements with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a coded structured light scanner device. In an embodiment, the handle 126 is replaced with the coded structured light scanner device using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2D, the removable handle 126 may also include an electrical connector that allows electrical power and data to be exchanged with the handle 126 and the corresponding electronics located in the probe end 401.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic circuit having an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a structured light device that can be mounted to the removable handle 126 on the AACMM 100). The electronics that support these peripheral hardware devices or features may be located in each of the bearing cartridge groupings 110, 112, 114 located within the portable AACMM 100.

Figure 2:
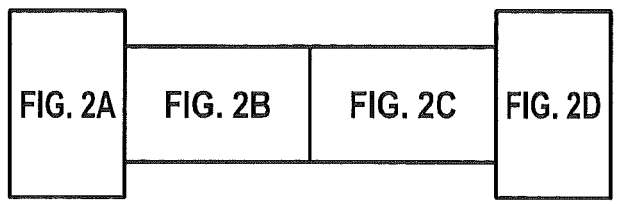
FIG. 2, including FIGS. 2A-2D taken together, is a block diagram of electronics utilized as part of the AACMM of FIG. 1 in accordance with an embodiment.

FIG. 2 is a block diagram of electronics utilized in an AACMM 100 in accordance with an embodiment. The embodiment shown in FIG. 2A includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

Figure 2A:
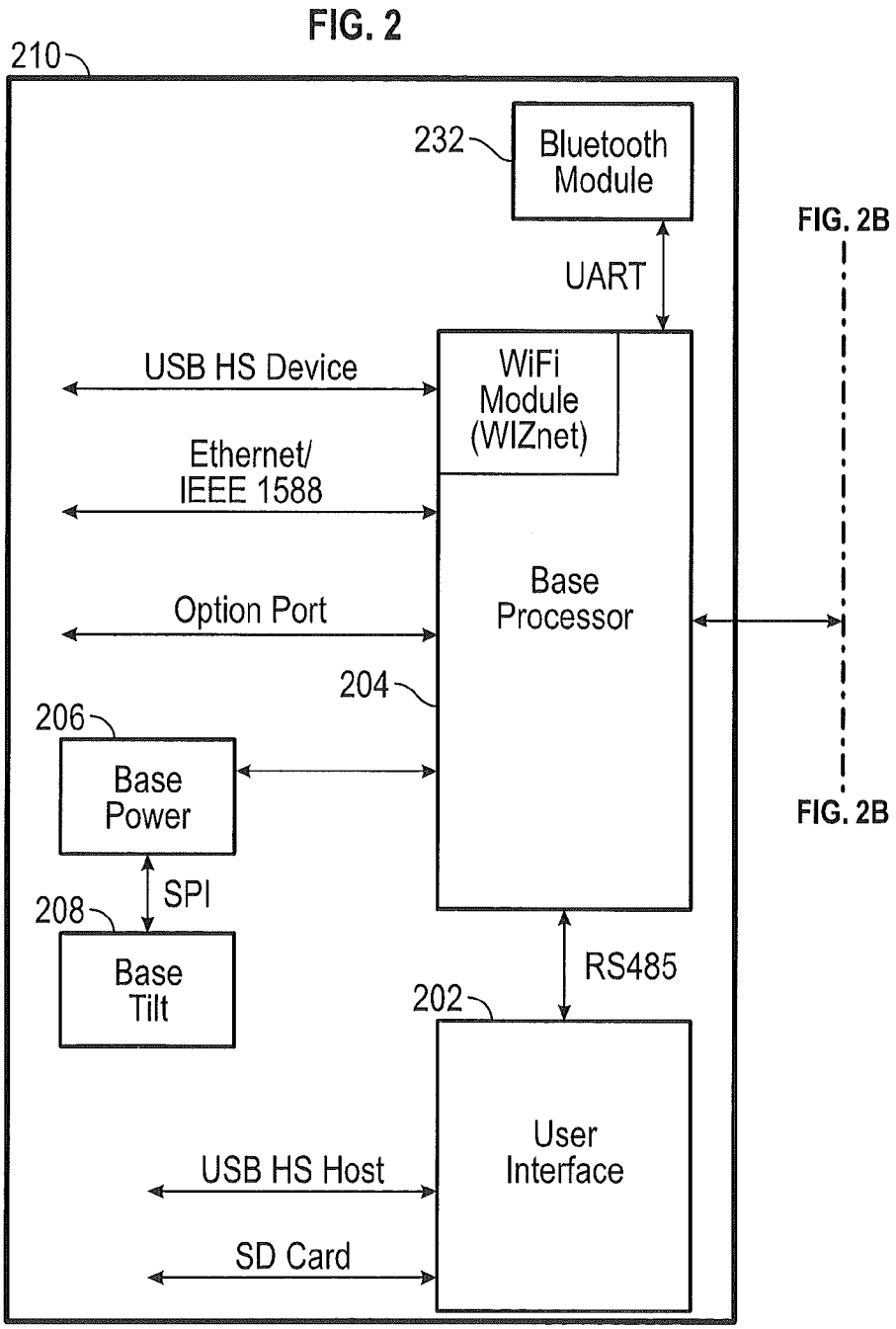
Figure 2C:
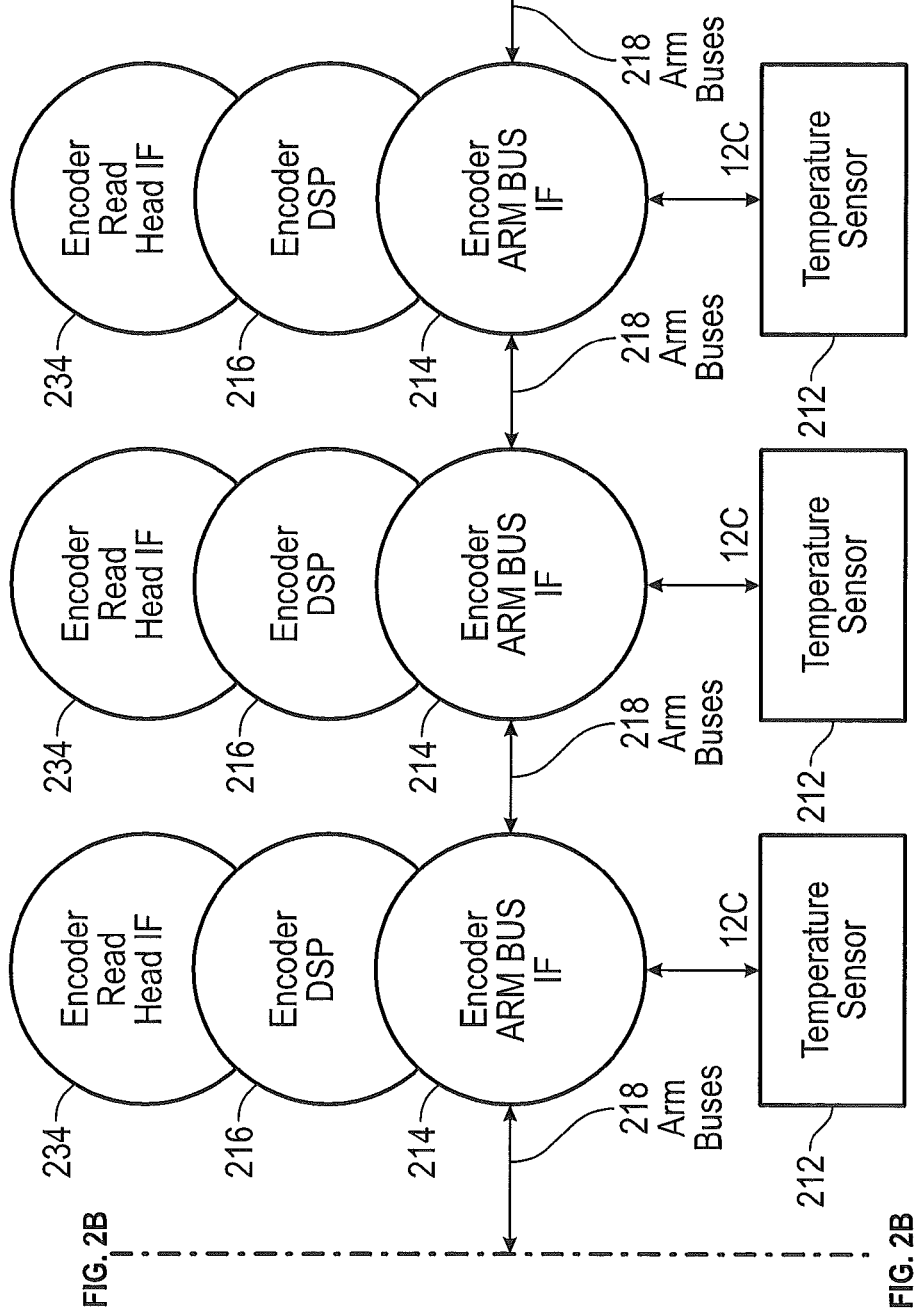

As shown in FIG. 2A and FIG. 2B, the electronic data processing system 210 is in communication with the aforementioned plurality of encoder systems via one or more arm buses 218. In the embodiment depicted in FIG. 2B and FIG. 2C, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Figure 2D:
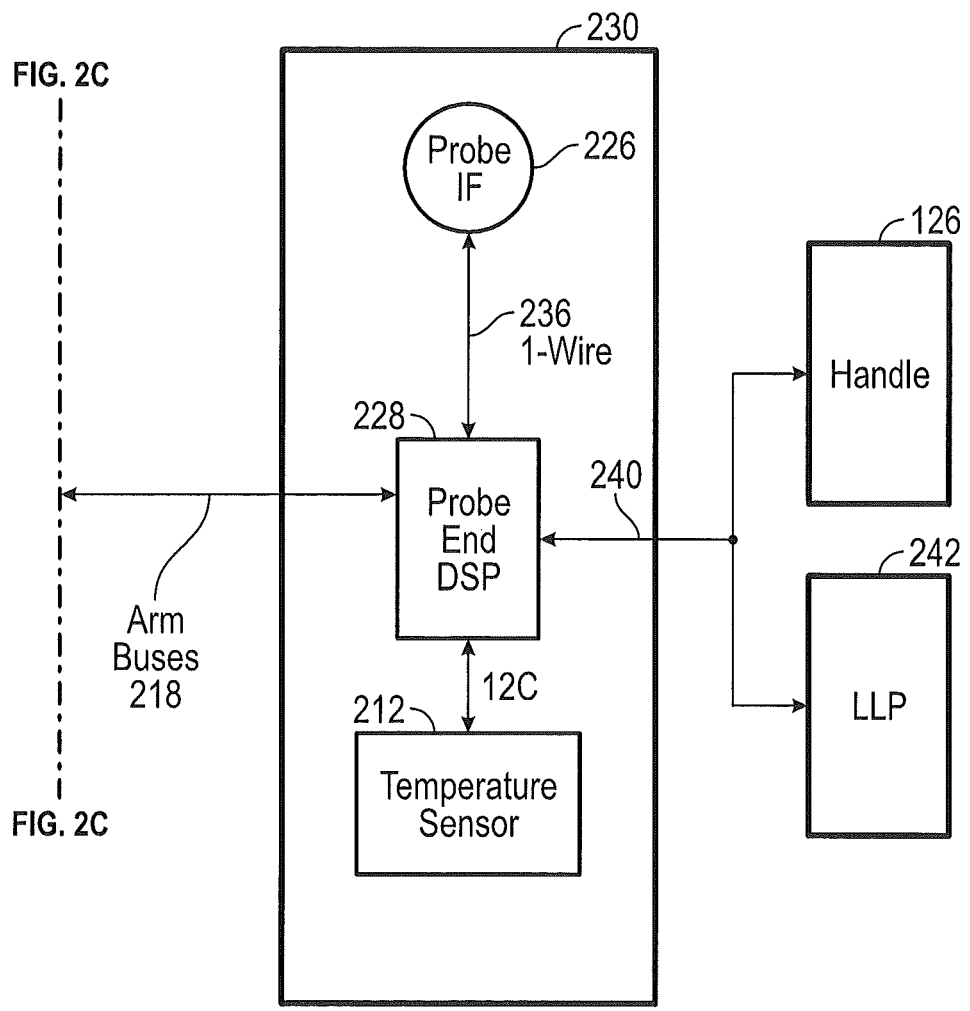

Also shown in FIG. 2D are probe end electronics 230 that are in communication with the arm bus 218. The probe end electronics 230 include a probe end DSP 228, a temperature sensor 212, a handle/device interface bus 240 that connects with the handle 126 or the coded structured light scanner device 242 via the quick-connect interface in an embodiment, and a probe interface 226. The quick-connect interface allows access by the handle 126 to the data bus, control lines, and power bus used by the coded structured light scanner device 242 and other accessories. In an embodiment, the probe end electronics 230 are located in the measurement probe housing 102 on the AACMM 100. In an embodiment, the handle 126 may be removed from the quick-connect interface and measurement may be performed by the structured light device 242 communicating with the probe end electronics 230 of the AACMM 100 via the interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-wire® communications protocol 236.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

Figure 3A:
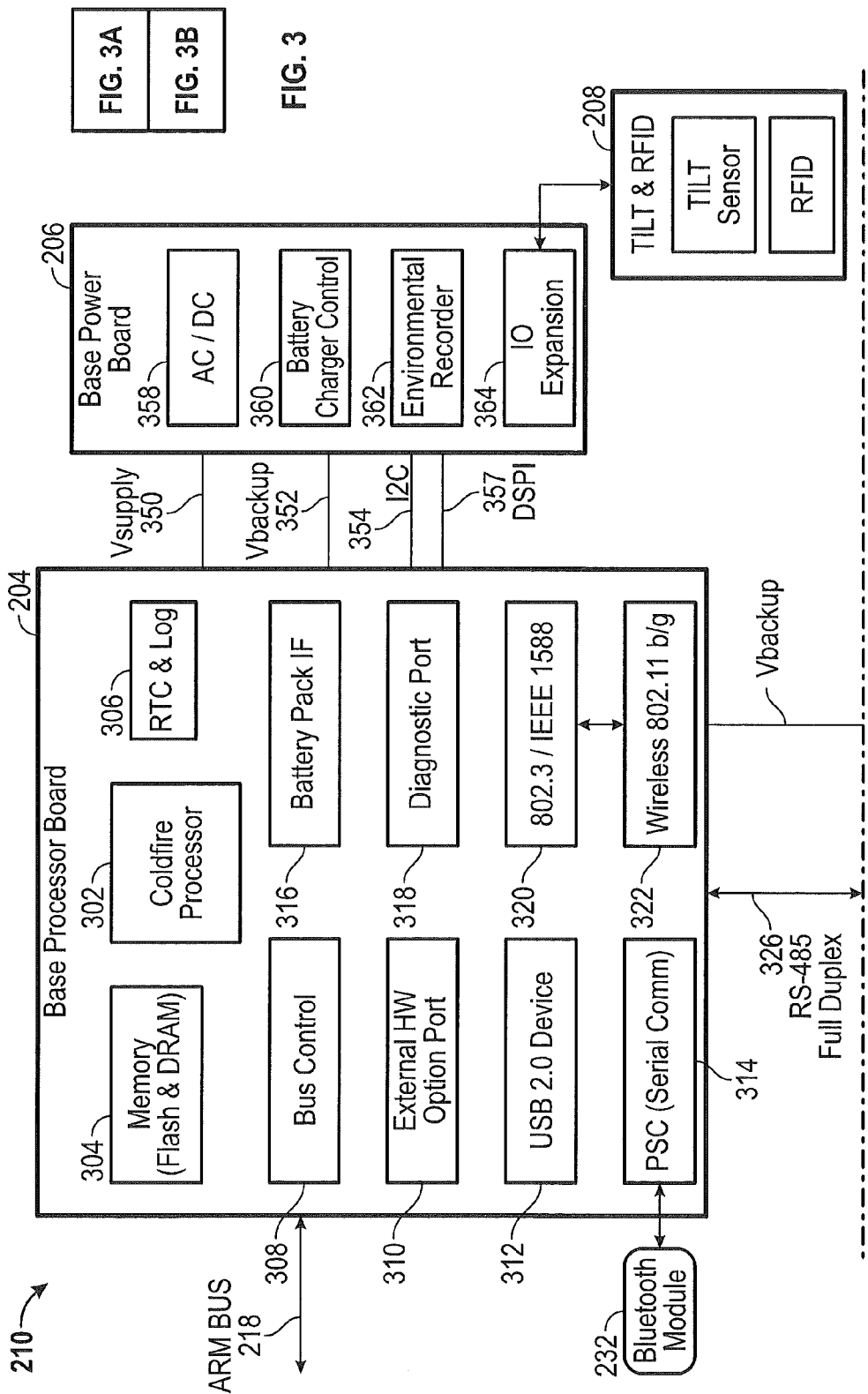
FIG. 3, including FIGS. 3A and 3B taken together, is a block diagram describing detailed features of the electronic data processing system of FIG. 2 in accordance with an embodiment.

In an embodiment shown in FIG. 3A, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as a coded structured light scanner device 242. A real time clock (RTC) and log 306, a battery pack interface (IF) 316, and a diagnostic port 318 are also included in the functionality in an embodiment of the base processor board 204 depicted in FIG. 3A.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Figure 3B:
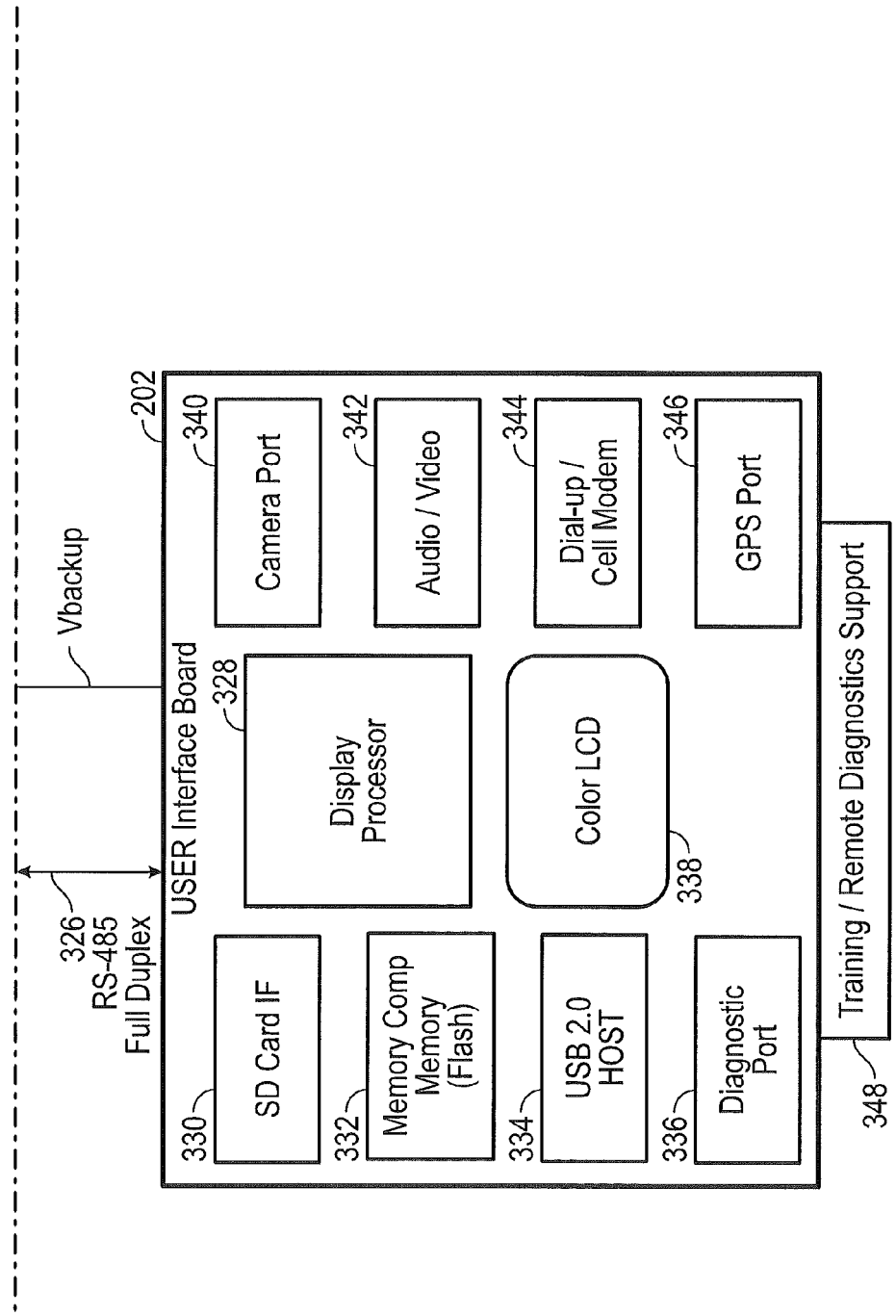
Figure 4:
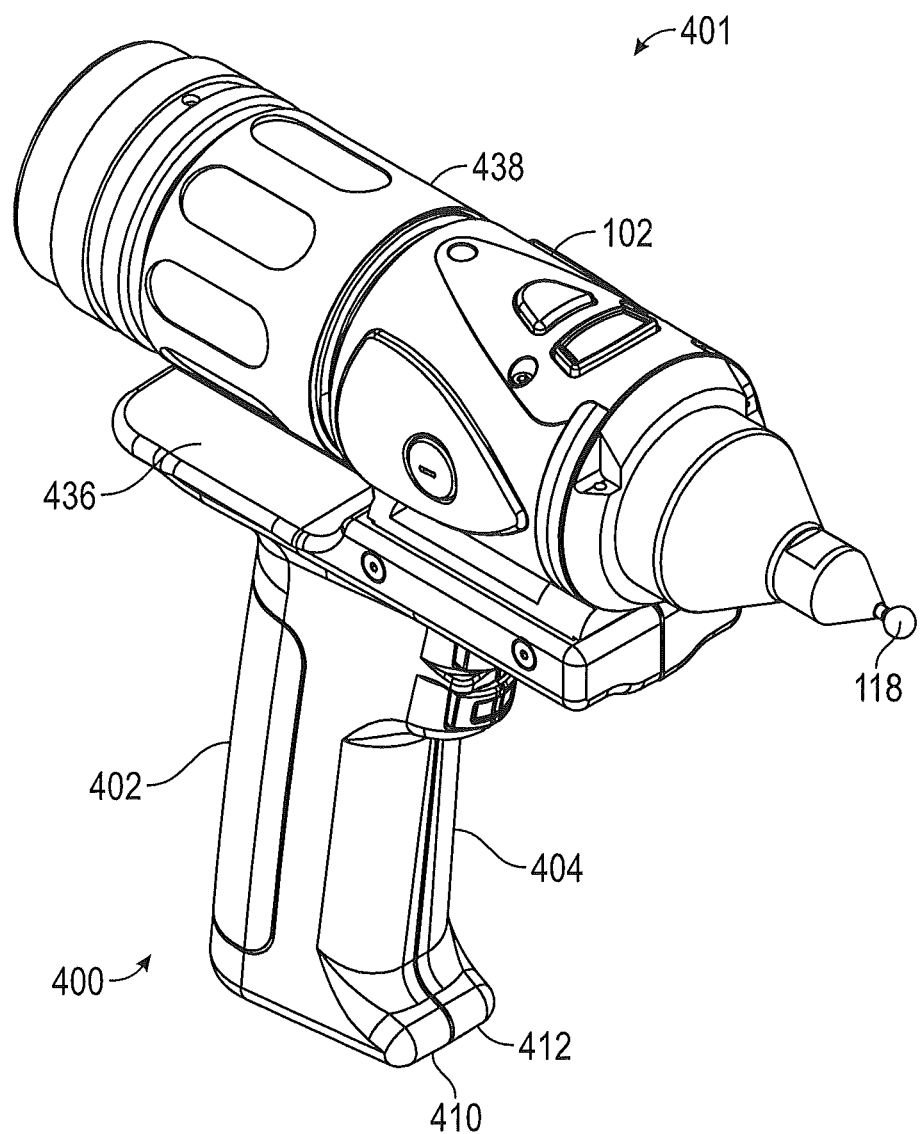
FIG. 4 is an isometric view of the probe end of the AACMM of FIG. 1.

Turning now to the user interface board 202 in FIG. 3B, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3A also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 357. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3A and FIG. 3B. For example, in one embodiment, the base processor board 204 and the user interface board 202 are combined into one physical board.

Figure 7:
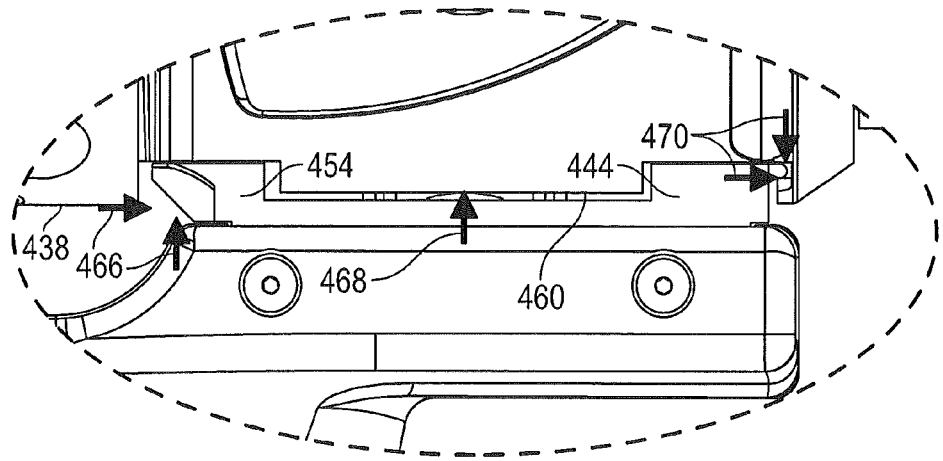
FIG. 7 is an enlarged partial side view of the interface portion of the probe end of FIG. 6.
Figure 8:
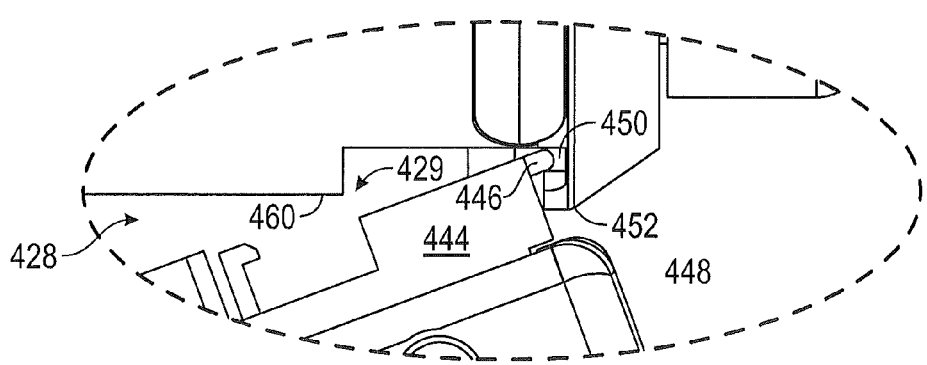
FIG. 8 is another enlarged partial side view of the interface portion of the probe end of FIG. 5.
Figure 9:
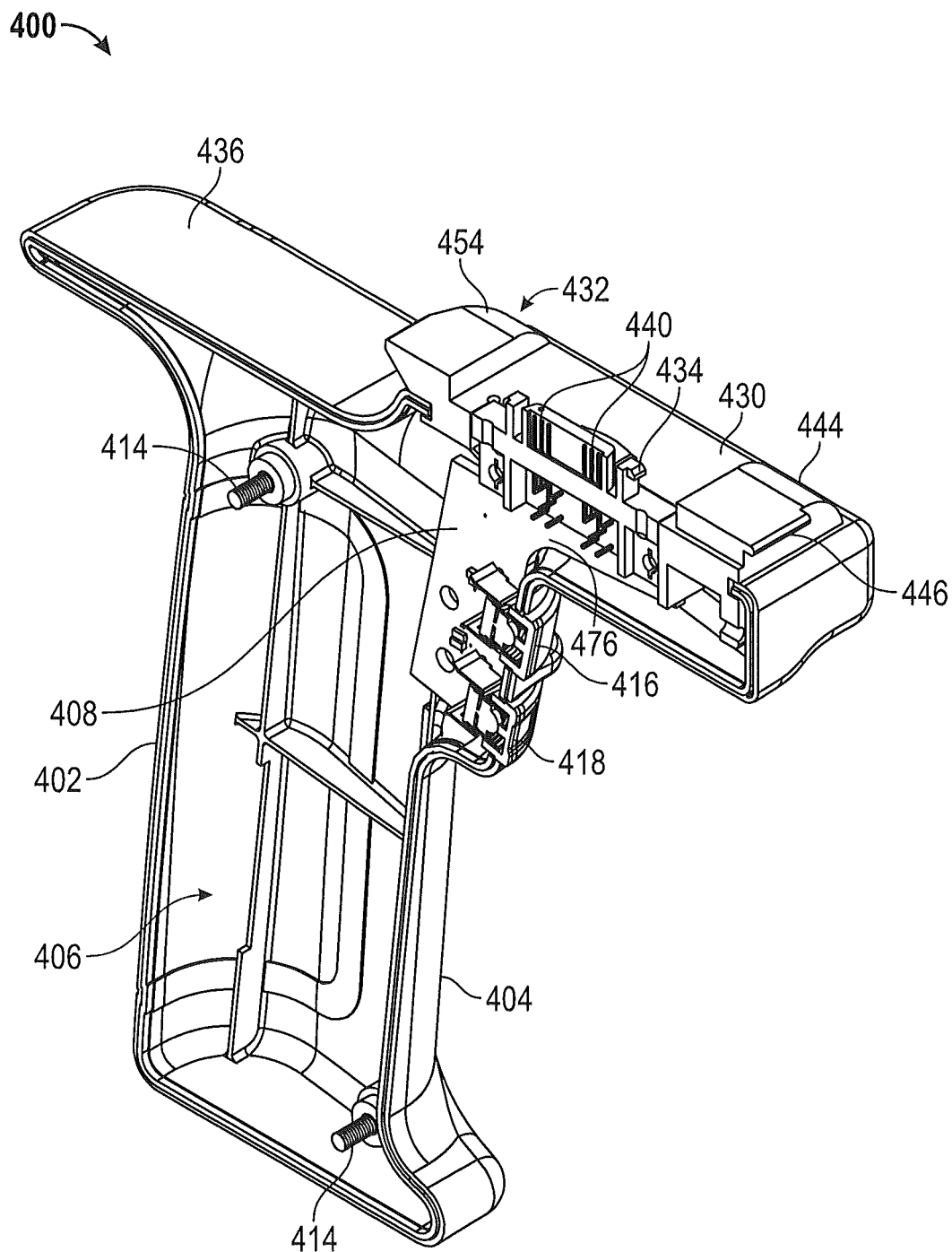
FIG. 9 is an isometric view partially in section of the handle of FIG. 4.
Figure 10:
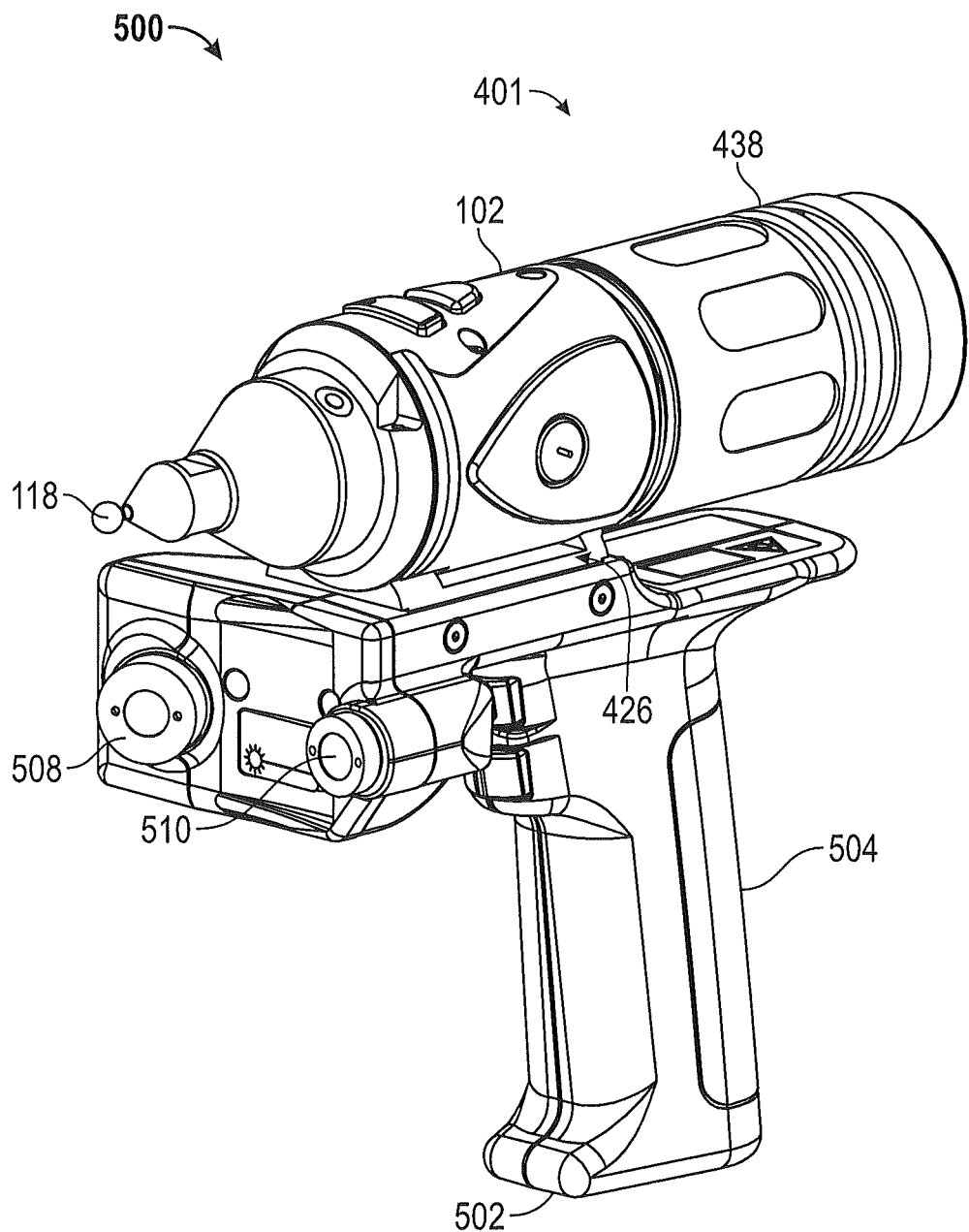
FIG. 10 is an isometric view of the probe end of the AACMM of FIG. 1 with a structured light device having a single camera attached.
Figure 11:
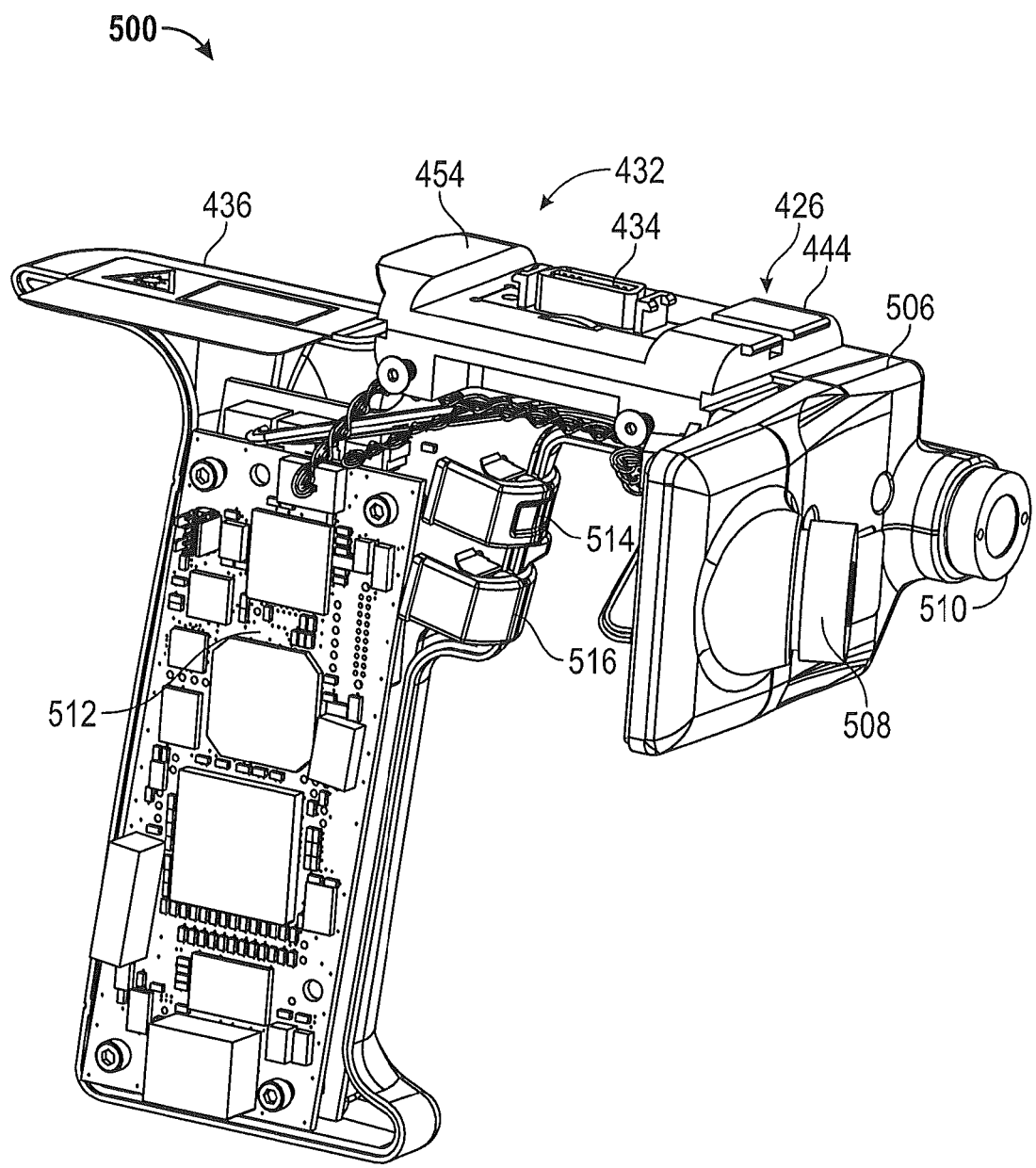
FIG. 11 is an isometric view partially in section of the device of FIG. 10.
Figure 12:
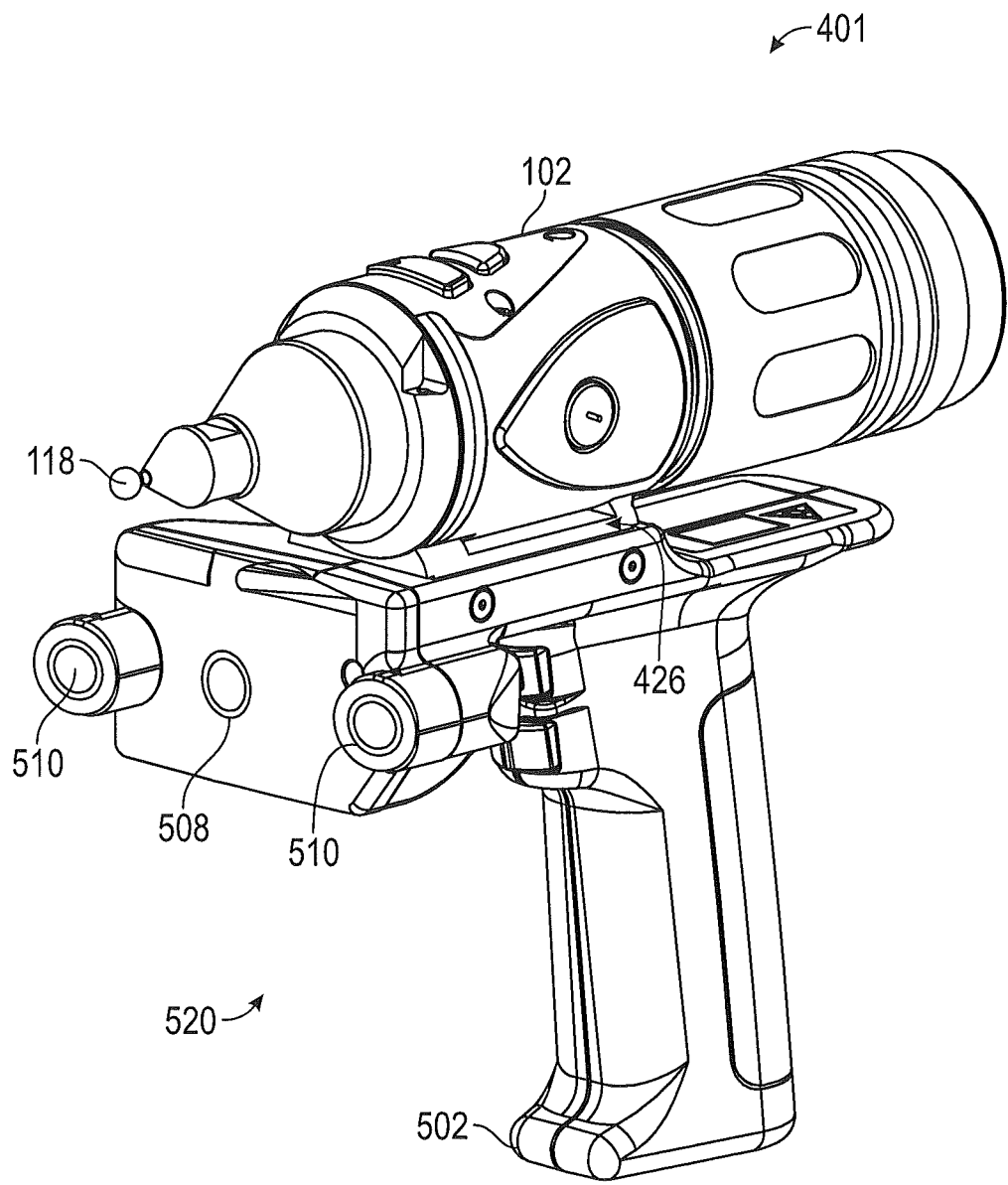
FIG. 12 is an isometric view of the probe end of the AACMM of FIG. 1 with another structured light device having dual cameras attached.

Referring now to FIGS. 4-9, an exemplary embodiment of a probe end 401 is illustrated having a measurement probe housing 102 with a quick-connect mechanical and electrical interface that allows removable and interchangeable device 400 to couple with AACMM 100. In the exemplary embodiment, the device 400 includes an enclosure 402 that includes a handle portion 404 that is sized and shaped to be held in an operator's hand, such as in a pistol grip for example. The enclosure 402 is a thin wall structure having a cavity 406 (FIG. 9). The cavity 406 is sized and configured to receive a controller 408. The controller 408 may be a digital circuit, having a microprocessor for example, or an analog circuit. In one embodiment, the controller 408 is in asynchronous bidirectional communication with the electronic data processing system 210 (FIGS. 2 and 3). The communication connection between the controller 408 and the electronic data processing system 210 may be wired (e.g. via controller 420) or may be a direct or indirect wireless connection (e.g. Bluetooth or IEEE 802.11) or a combination of wired and wireless connections. In the exemplary embodiment, the enclosure 402 is formed in two halves 410, 412, such as from an injection molded plastic material for example. The halves 410, 412 may be secured together by fasteners, such as screws 414 for example. In other embodiments, the enclosure halves 410, 412 may be secured together by adhesives or ultrasonic welding for example.

The handle portion 404 also includes buttons or actuators 416, 418 that may be manually activated by the operator. The actuators 416, 418 are coupled to the controller 408 that transmits a signal to a controller 420 within the probe housing 102. In the exemplary embodiments, the actuators 416, 418 perform the functions of actuators 422, 424 located on the probe housing 102 opposite the device 400. It should be appreciated that the device 400 may have additional switches, buttons or other actuators that may also be used to control the device 400, the AACMM 100 or vice versa. Also, the device 400 may include indicators, such as light emitting diodes (LEDs), sound generators, meters, displays or gauges for example. In one embodiment, the device 400 may include a digital voice recorder that allows for synchronization of verbal comments with a measured point. In yet another embodiment, the device 400 includes a microphone that allows the operator to transmit voice activated commands to the electronic data processing system 210.

In one embodiment, the handle portion 404 may be configured to be used with either operator hand or for a particular hand (e.g. left handed or right handed). The handle portion 404 may also be configured to facilitate operators with disabilities (e.g. operators with missing finders or operators with prosthetic arms). Further, the handle portion 404 may be removed and the probe housing 102 used by itself when clearance space is limited. As discussed above, the probe end 401 may also comprise the shaft of the seventh axis of AACMM 100. In this embodiment the device 400 may be arranged to rotate about the AACMM seventh axis.

The probe end 401 includes a mechanical and electrical interface 426 having a first connector 429 (FIG. 8) on the device 400 that cooperates with a second connector 428 on the probe housing 102. The connectors 428, 429 may include electrical and mechanical features that allow for coupling of the device 400 to the probe housing 102. In one embodiment, the interface 426 includes a first surface 430 having a mechanical coupler 432 and an electrical connector 434 thereon. The enclosure 402 also includes a second surface 436 positioned adjacent to and offset from the first surface 430. In the exemplary embodiment, the second surface 436 is a planar surface offset a distance of approximately 0.5 inches from the first surface 430. This offset provides a clearance for the operator's fingers when tightening or loosening a fastener such as collar 438. The interface 426 provides for a relatively quick and secure electronic connection between the device 400 and the probe housing 102 without the need to align connector pins, and without the need for separate cables or connectors.

The electrical connector 434 extends from the first surface 430 and includes one or more connector pins 440 that are electrically coupled in asynchronous bidirectional communication with the electronic data processing system 210 (FIGS. 2 and 3), such as via one or more arm buses 218 for example. The bidirectional communication connection may be wired (e.g. via arm bus 218), wireless (e.g. Bluetooth or IEEE 802.11), or a combination of wired and wireless connections. In one embodiment, the electrical connector 434 is electrically coupled to the controller 420. The controller 420 may be in asynchronous bidirectional communication with the electronic data processing system 210 such as via one or more arm buses 218 for example. The electrical connector 434 is positioned to provide a relatively quick and secure electronic connection with electrical connector 442 on probe housing 102. The electrical connectors 434, 442 connect with each other when the device 400 is attached to the probe housing 102. The electrical connectors 434, 442 may each comprise a metal encased connector housing that provides shielding from electromagnetic interference as well as protecting the connector pins and assisting with pin alignment during the process of attaching the device 400 to the probe housing 102.

The mechanical coupler 432 provides relatively rigid mechanical coupling between the device 400 and the probe housing 102 to support relatively precise applications in which the location of the device 400 on the end of the arm portion 104 of the AACMM 100 preferably does not shift or move. Any such movement may typically cause an undesirable degradation in the accuracy of the measurement result. These desired results are achieved using various structural features of the mechanical attachment configuration portion of the quick connect mechanical and electronic interface of an embodiment of the present invention.

In one embodiment, the mechanical coupler 432 includes a first projection 444 positioned on one end 448 (the leading edge or "front" of the device 400). The first projection 444 may include a keyed, notched or ramped interface that forms a lip 446 that extends from the first projection 444. The lip 446 is sized to be received in a slot 450 defined by a projection 452 extending from the probe housing 102 (FIG. 8). It should be appreciated that the first projection 444 and the slot 450 along with the collar 438 form a coupler arrangement such that when the lip 446 is positioned within the slot 450, the slot 450 may be used to restrict both the longitudinal and lateral movement of the device 400 when attached to the probe housing 102. As will be discussed in more detail below, the rotation of the collar 438 may be used to secure the lip 446 within the slot 450.

Figure 5:
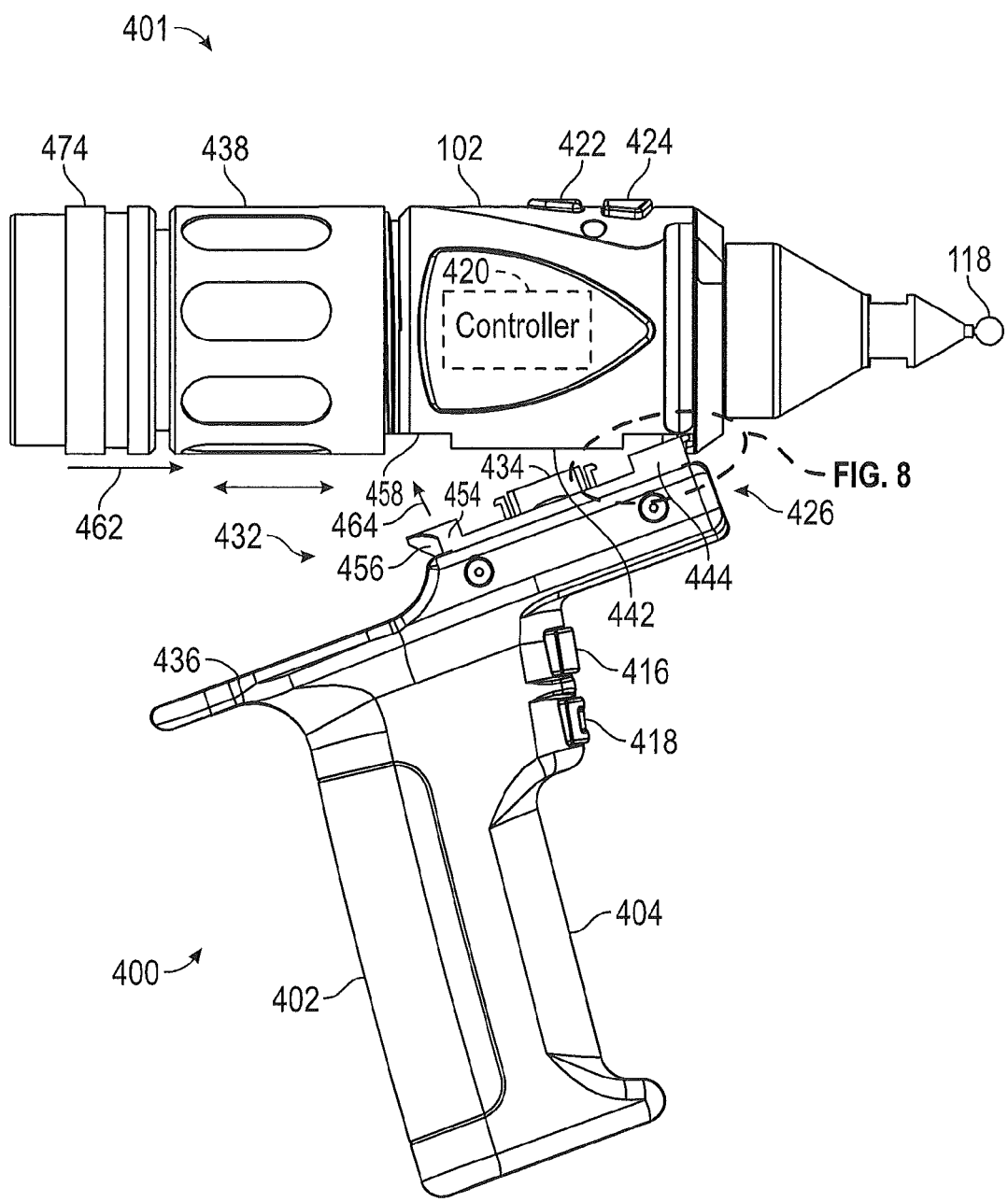
FIG. 5 is a side view of the probe end of FIG. 4 with the handle being coupled thereto.

Opposite the first projection 444, the mechanical coupler 432 may include a second projection 454. The second projection 454 may have a keyed, notched-lip or ramped interface surface 456 (FIG. 5). The second projection 454 is positioned to engage a fastener associated with the probe housing 102, such as collar 438 for example. As will be discussed in more detail below, the mechanical coupler 432 includes a raised surface projecting from surface 430 that adjacent to or disposed about the electrical connector 434 which provides a pivot point for the interface 426 (FIGS. 7 and 8). This serves as the third of three points of mechanical contact between the device 400 and the probe housing 102 when the device 400 is attached thereto.

The probe housing 102 includes a collar 438 arranged co-axially on one end. The collar 438 includes a threaded portion that is movable between a first position (FIG. 5) and a second position (FIG. 7). By rotating the collar 438, the collar 438 may be used to secure or remove the device 400 without the need for external tools. Rotation of the collar 438 moves the collar 438 along a relatively coarse, square-threaded cylinder 474. The use of such relatively large size, square-thread and contoured surfaces allows for significant clamping force with minimal rotational torque. The coarse pitch of the threads of the cylinder 474 further allows the collar 438 to be tightened or loosened with minimal rotation.

Figure 6:
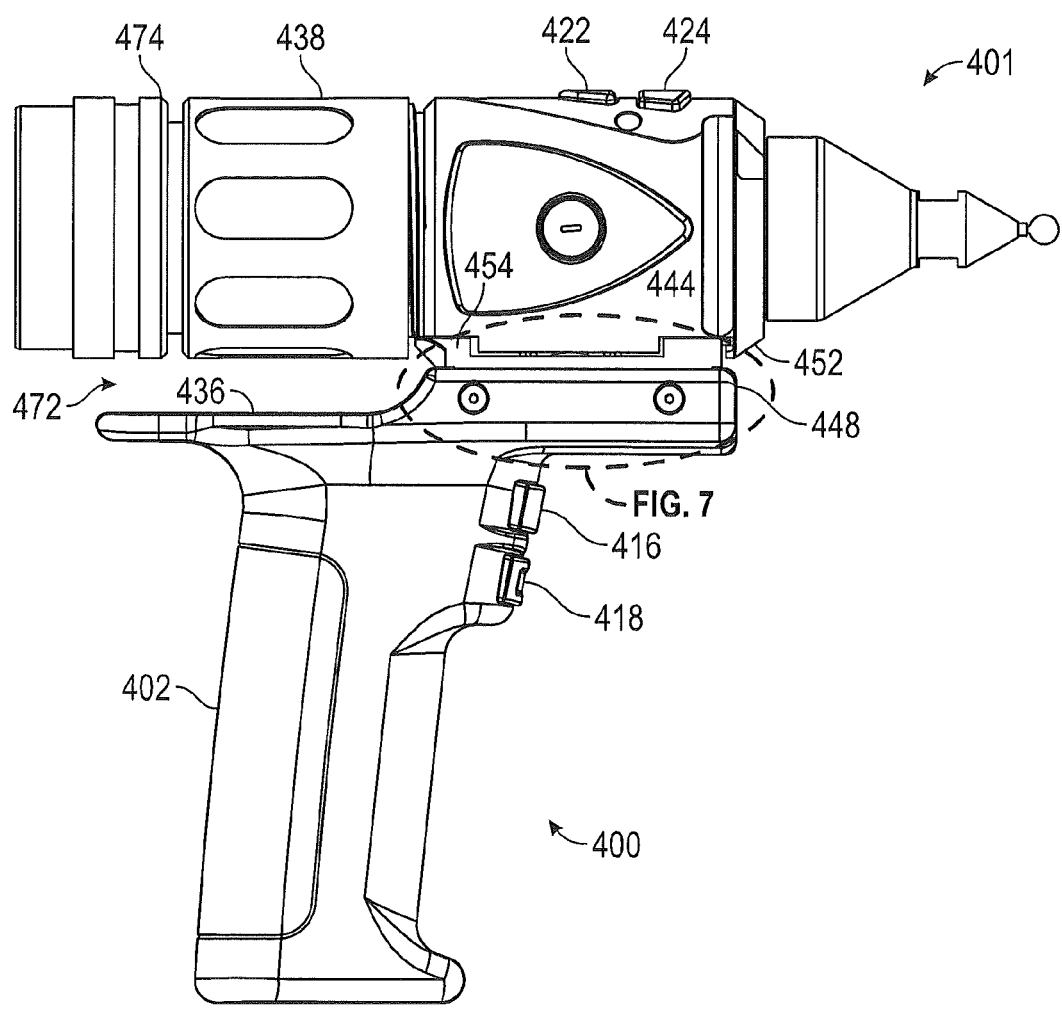
FIG. 6 is a side view of the probe end of FIG. 4 with the handle attached.

To couple the device 400 to the probe housing 102, the lip 446 is inserted into the slot 450 and the device is pivoted to rotate the second projection 454 toward surface 458 as indicated by arrow 464 (FIG. 5). The collar 438 is rotated causing the collar 438 to move or translate in the direction indicated by arrow 462 into engagement with surface 456. The movement of the collar 438 against the angled surface 456 drives the mechanical coupler 432 against the raised surface 460. This assists in overcoming potential issues with distortion of the interface or foreign objects on the surface of the interface that could interfere with the rigid seating of the device 400 to the probe housing 102. The application of force by the collar 438 on the second projection 454 causes the mechanical coupler 432 to move forward pressing the lip 446 into a seat on the probe housing 102. As the collar 438 continues to be tightened, the second projection 454 is pressed upward toward the probe housing 102 applying pressure on a pivot point. This provides a see-saw type arrangement, applying pressure to the second projection 454, the lip 446 and the center pivot point to reduce or eliminate shifting or rocking of the device 400. The pivot point presses directly against the bottom on the probe housing 102 while the lip 446 is applies a downward force on the end of probe housing 102. FIG. 5 includes arrows 462, 464 to show the direction of movement of the device 400 and the collar 438. FIG. 7 includes arrows 466, 468, 470 to show the direction of applied pressure within the interface 426 when the collar 438 is tightened. It should be appreciated that the offset distance of the surface 436 of device 400 provides a gap 472 between the collar 438 and the surface 436 (FIG. 6). The gap 472 allows the operator to obtain a firmer grip on the collar 438 while reducing the risk of pinching fingers as the collar 438 is rotated. In one embodiment, the probe housing 102 is of sufficient stiffness to reduce or prevent the distortion when the collar 438 is tightened.

Embodiments of the interface 426 allow for the proper alignment of the mechanical coupler 432 and electrical connector 434 and also protects the electronics interface from applied stresses that may otherwise arise due to the clamping action of the collar 438, the lip 446 and the surface 456. This provides advantages in reducing or eliminating stress damage to circuit board 476 mounted electrical connectors 434, 442 that may have soldered terminals. Also, embodiments provide advantages over known approaches in that no tools are required for a user to connect or disconnect the device 400 from the probe housing 102. This allows the operator to manually connect and disconnect the device 400 from the probe housing 102 with relative ease.

Due to the relatively large number of shielded electrical connections possible with the interface 426, a relatively large number of functions may be shared between the AACMM 100 and the device 400. For example, switches, buttons or other actuators located on the AACMM 100 may be used to control the device 400 or vice versa. Further, commands and data may be transmitted from electronic data processing system 210 to the device 400. In one embodiment, the device 400 is a video camera that transmits data of a recorded image to be stored in memory on the base processor 204 or displayed on the display 328. In another embodiment the device 400 is an image projector that receives data from the electronic data processing system 210. In addition, temperature sensors located in either the AACMM 100 or the device 400 may be shared by the other. It should be appreciated that embodiments of the present invention provide advantages in providing a flexible interface that allows a wide variety of accessory devices 400 to be quickly, easily and reliably coupled to the AACMM 100. Further, the capability of sharing functions between the AACMM 100 and the device 400 may allow a reduction in size, power consumption and complexity of the AACMM 100 by eliminating duplicity.

In one embodiment, the controller 408 may alter the operation or functionality of the probe end 401 of the AACMM 100. For example, the controller 408 may alter indicator lights on the probe housing 102 to either emit a different color light, a different intensity of light, or turn on/off at different times when the device 400 is attached versus when the probe housing 102 is used by itself. In one embodiment, the device 400 includes a range finding sensor (not shown) that measures the distance to an object. In this embodiment, the controller 408 may change indicator lights on the probe housing 102 in order to provide an indication to the operator how far away the object is from the probe tip 118. In another embodiment, the controller 408 may change the color of the indicator lights based on the quality of the image acquired by the coded structured light scanner device. This provides advantages in simplifying the requirements of controller 420 and allows for upgraded or increased functionality through the addition of accessory devices.

Referring to FIGS. 10-13, embodiments of the present invention provide advantages to projector, camera, signal processing, control and indicator interfaces for a non-contact three-dimensional measurement device 500. The device 500 includes a pair of optical devices, such as a light projector 508 and a camera 510, for example, that project a structured light pattern and receive a two-dimensional pattern that was reflected from an object 501. The device 500 uses triangulation-based methods based on the known emitted pattern and the acquired image to determine a point cloud representing the X, Y, Z coordinate data for the object 501 for each pixel of the received image. In an embodiment, the structured light pattern is coded so that a single image is sufficient to determine the three-dimensional coordinates of object points. Such a coded structured light pattern may also be said to measure three-dimensional coordinates in a single shot.

In the exemplary embodiment, the projector 508 uses a visible light source that illuminates a pattern generator. The visible light source may be a laser, a superluminescent diode, an incandescent light, a light emitting diode (LED), or other light emitting device. In the exemplary embodiment, the pattern generator is a chrome-on-glass slide having a structured light pattern etched thereon. The slide may have a single pattern or multiple patterns that move in and out of position as needed. The slide may be manually or automatically installed in the operating position. In other embodiments, the source pattern may be light reflected off or transmitted by a digital micro-mirror device (DMD) such as a digital light projector (DLP) manufactured by Texas Instruments Corporation, a liquid crystal device (LCD), a liquid crystal on silicon (LCOS) device, or a similar device used in transmission mode rather than reflection mode. The projector 508 may further include a lens system 515 that alters the outgoing light to have the desired focal characteristics.

The device 500 further includes an enclosure 502 with a handle portion 504. In one embodiment, the device 500 may further include an interface 426 on one end that mechanically and electrically couples the device 500 to the probe housing 102 as described herein above. In other embodiments, the device 500 may be integrated into the probe housing 102. The interface 426 provides advantages in allowing the device 500 to be coupled and removed from the AACMM 100 quickly and easily without requiring additional tools.

The camera 510 includes a photosensitive sensor which generates a digital image/representation of the area within the sensor's field of view. The sensor may be charged-coupled device (CCD) type sensor or a complementary metal-oxide-semiconductor (CMOS) type sensor for example having an array of pixels. The camera 510 may further include other components, such as but not limited to lens 503 and other optical devices for example. In the exemplary embodiment, the projector 508 and the camera 510 are arranged at an angle such that the sensor may receive light reflected from the surface of the object 501. In one embodiment, the projector 508 and camera 510 are positioned such that the device 500 may be operated with the probe tip 118 in place. Further, it should be appreciated that the device 500 is substantially fixed relative to the probe tip 118 and forces on the handle portion 504 may not influence the alignment of the device 500 relative to the probe tip 118. In one embodiment, the device 500 may have an additional actuator (not shown) that allows the operator to switch between acquiring data from the device 500 and the probe tip 118.

The projector 508 and camera 510 are electrically coupled to a controller 512 disposed within the enclosure 502. The controller 512 may include one or more microprocessors, digital signal processors, memory and signal conditioning circuits. Due to the digital signal processing and large data volume generated by the device 500, the controller 512 may be arranged within the handle portion 504. The controller 512 is electrically coupled to the arm buses 218 via electrical connector 434. The device 500 may further include actuators 514, 516 which may be manually activated by the operator to initiate operation and data capture by the device 500. In one embodiment, the image processing to determine the X, Y, Z coordinate data of the point cloud representing object 501 is performed by the controller 512 and the coordinate data is transmitted to the electronic data processing system 210 via bus 240. In another embodiment images are transmitted to the electronic data processing system 210 and the calculation of the coordinates is performed by the electronic data processing system 210.

In one embodiment, the controller 512 is configured to communicate with the electronic data processing system 210 to receive structured light pattern images from the electronic data processing system 210. In still another embodiment, the pattern emitted onto the object may be changed by the electronic data processing system 210 either automatically or in response to an input from the operator. This may provide advantages in obtaining higher accuracy measurements with less processing time by allowing the use of patterns that are simpler to decode when the conditions warrant, and use the more complex patterns where it is desired to achieve the desired level of accuracy or resolution.

In other embodiments of the present invention, the device 520 (FIG. 12) includes a pair of cameras 510. The cameras 510 are arranged on an angle relative to the projector 508 to receive reflected light from the object 501. The use of multiple cameras 510 may provide advantages in some applications by providing redundant images to increase the accuracy of the measurement. In still other embodiments, the redundant images may allow for sequential patterns to be quickly acquired by the device 500 by increasing the acquisition speed of images by alternately operating the cameras 510.

Figure 13A:
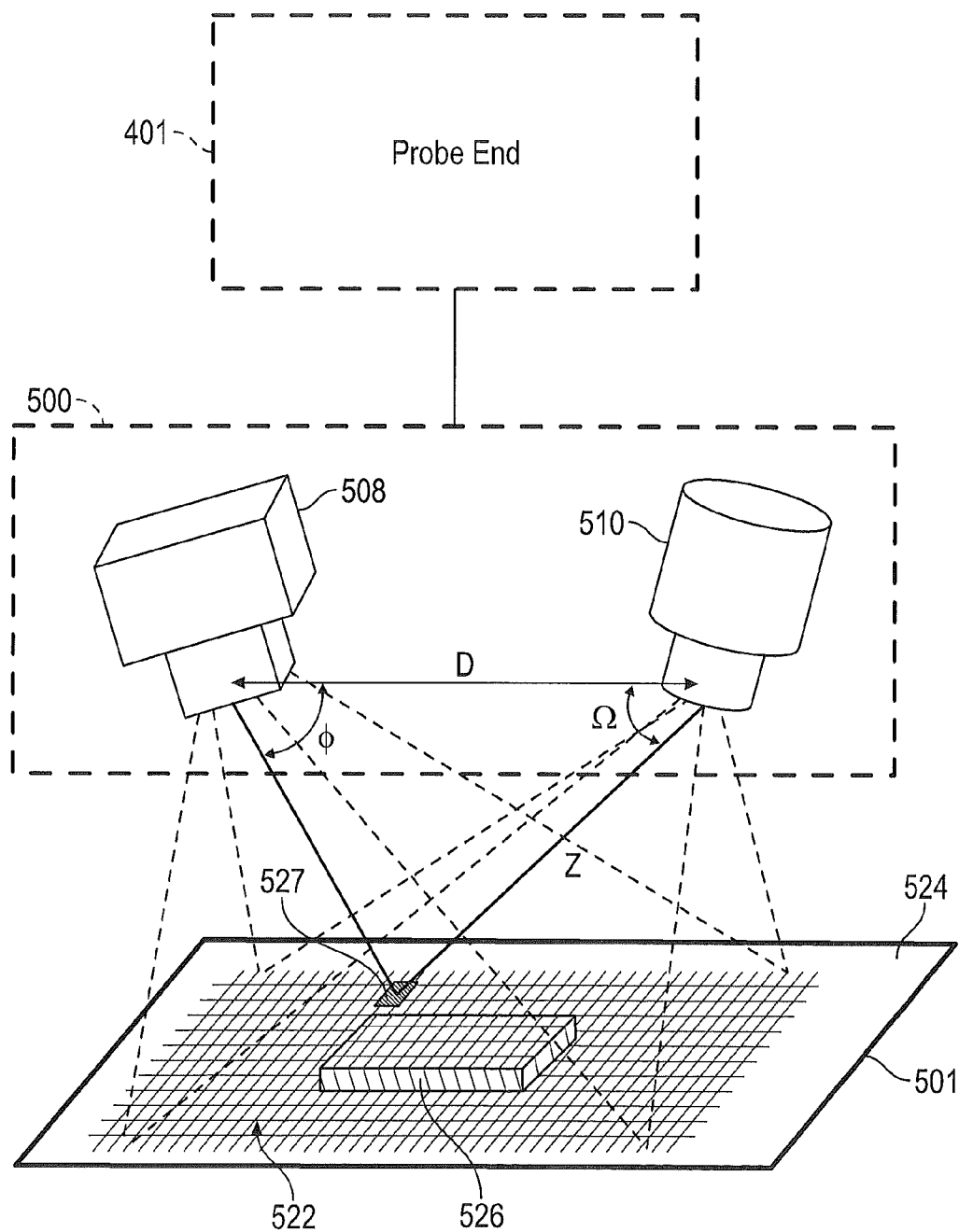
FIG. 13A and FIG. 13B are schematic views illustrating the operation of the device of FIG. 10 when attached to the probe end of the AACMM of FIG. 1.
Figure 13B:
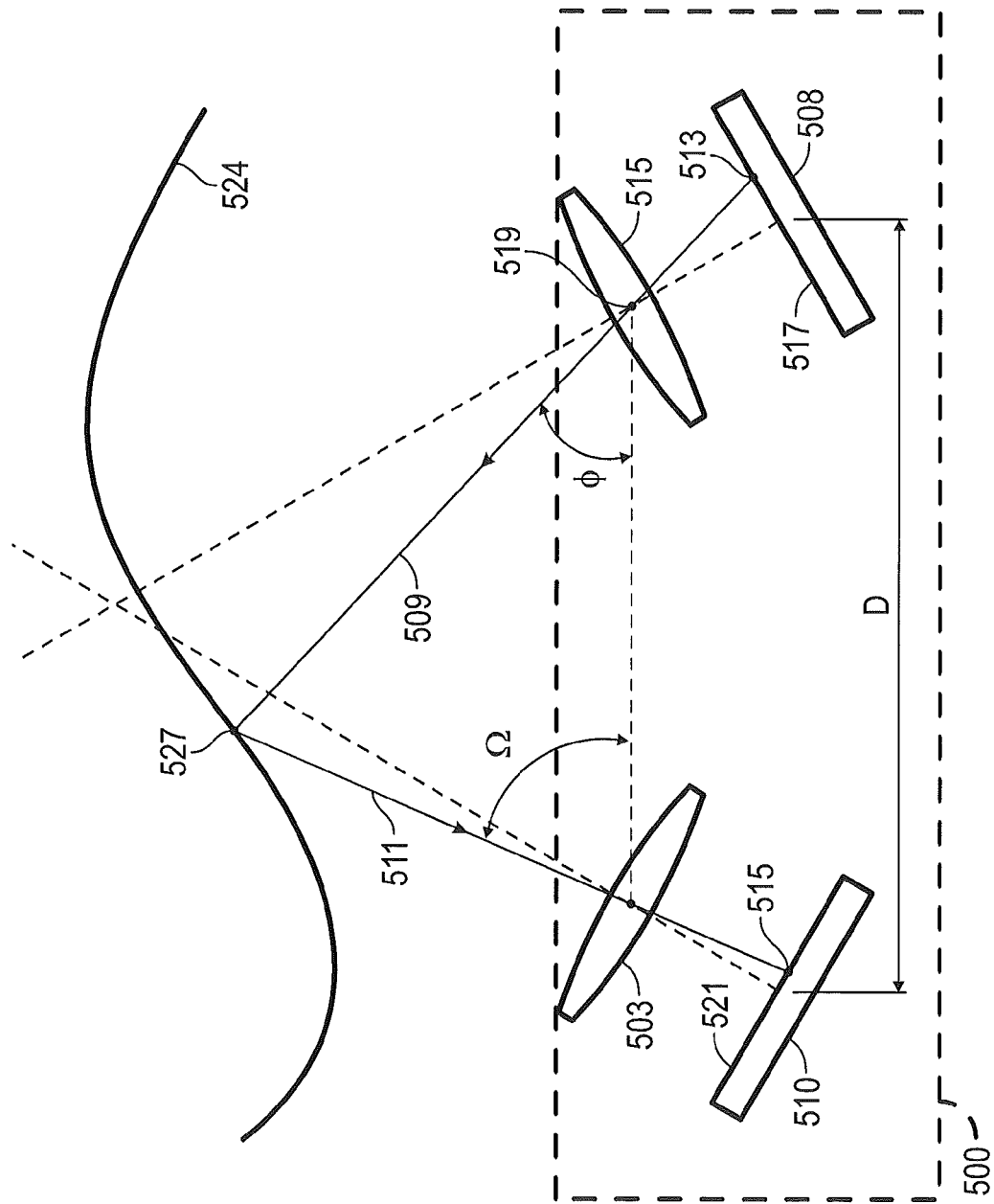
Figure 14A:
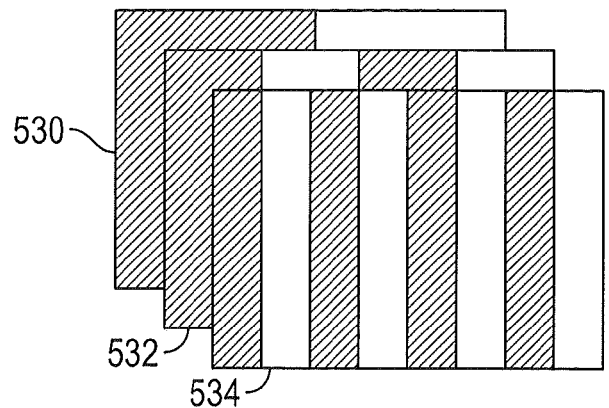
FIGS. 14-17 are sequential projections having an uncoded binary pattern that may be emitted by the structured light device of FIG. 10 or FIG. 12, in accordance with an embodiment of the present invention.
Figure 14B:
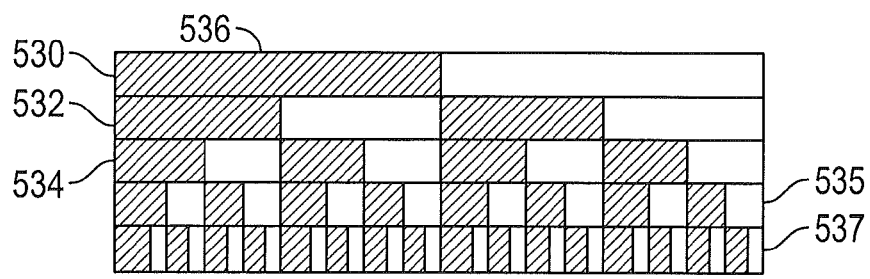
Figure 15:
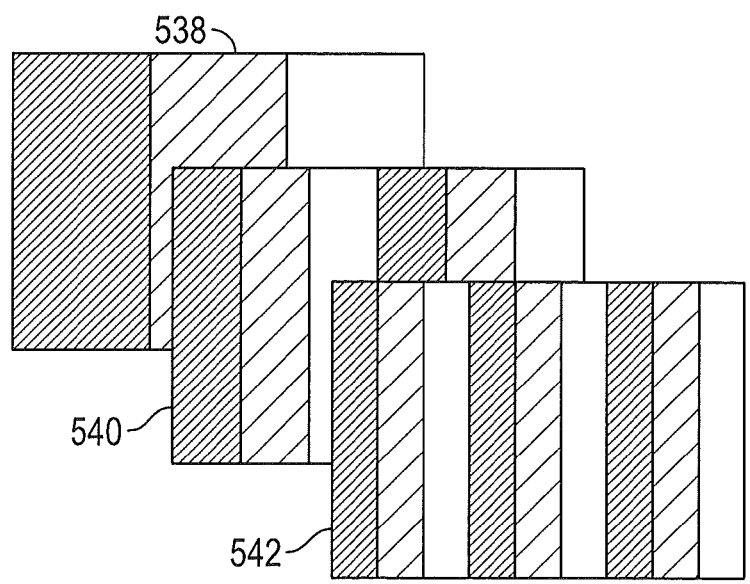

Referring now to FIG. 13A and FIG. 13B, the operation of the structured light device 500 will be described. The device 500 first emits a structured light pattern 522 with projector 508 onto surface 524 of the object 501. The structured light pattern 522 may include the patterns disclosed in the journal article "DLP-Based Structured Light 3D Imaging Technologies and Applications" by Jason Geng published in the Proceedings of SPIE, Vol. 7932, which is incorporated herein by reference. The structured light pattern 522 may further include, but is not limited to one of the patterns shown in FIGS. 14-32. The light 509 from projector 508 is reflected from the surface 524 and the reflected light 511 is received by the camera 510. It should be appreciated that variations in the surface 524, such as protrusion 526 for example, create distortions in the structured pattern when the image of the pattern is captured by the camera 510. Since the pattern is formed by structured light, it is possible in some instances for the controller 512 or the electronic data processing system 210 to determine a one to one correspondence between the pixels in the emitted pattern, such as pixel 513 for example, and the pixels in the imaged pattern, such as pixel 515 for example. This enables triangulation principals to be used to determine the coordinates of each pixel in the imaged pattern. The collection of three-dimensional coordinates of the surface 524 is sometimes referred to as a point cloud. By moving the device 500 over the surface 524, a point cloud may be created of the entire object 501. It should be appreciated that in some embodiments the coupling of the device 500 to the probe end provides advantages in that the position and orientation of the device 500 is known by the electronic data processing system 210, so that the location of the object 501 relative to the AACMM 100 may also be ascertained.

To determine the coordinates of the pixel, the angle of each projected ray of light 509 intersecting the object 522 in a point 527 is known to correspond to a projection angle phi ($\Phi$), so that $\Phi$ information is encoded into the emitted pattern. In an embodiment, the system is configured to enable the $\Phi$ value corresponding to each pixel in the imaged pattern to be ascertained. Further, an angle omega ($\Omega$) for each pixel in the camera is known, as is the baseline distance "D" between the projector 508 and the camera. Therefore, the distance "Z" from the camera 510 to the location that the pixel has imaged using the equation:

$$\frac{Z}{D} = \frac{\sin(\Phi)}{\sin(\Omega + \Phi)} \qquad (1)$$

Thus three-dimensional coordinates may be calculated for each pixel in the acquired image.

In general, there are two categories of structured light, namely coded and uncoded structured light. A common form of uncoded structured light, such as that shown in FIGS. 14-17 and 28-30, relies on a striped pattern varying in a periodic manner along one dimension. These types of patterns are usually applied in a sequence to provide an approximate distance to the object. Some uncoded pattern embodiments, such as the sinusoidal patterns for example, may provide relatively highly accurate measurements. However, for these types of patterns to be effective, it is usually necessary for the scanner device and the object to be held stationary relative to each other. Where the scanner device or the object are in motion (relative to the other), then a coded pattern, such as that shown in FIGS. 18-27 may be preferable. A coded pattern allows the image to be analyzed using a single acquired image. Some coded patterns may be placed in a particular orientation on the projector pattern (for example, perpendicular to epipolar lines on the projector plane), thereby simplifying analysis of the three-dimensional surface coordinates based on a single image.

Epipolar lines are mathematical lines formed by the intersection of epipolar planes and the source plane 517 or the image plane 521 (the plane of the camera sensor) in FIG. 13B. An epipolar plane may be any plane that passes through the projector perspective center 519 and the camera perspective center. The epipolar lines on the source plane 517 and the image plane 521 may be parallel in some cases, but in general are not parallel. An aspect of epipolar lines is that a given epipolar line on the projector plane 517 has a corresponding epipolar line on the image plane 521. Therefore, any particular pattern known on an epipolar line in the projector plane 517 may be immediately observed and evaluated in the image plane 521. For example, if a coded pattern is placed along an epipolar line in the projector plane 517, the spacing between the coded elements in the image plane 521 may be determined using the values read out of the pixels of the camera sensor 510. This information may be used to determine the three-dimensional coordinates of a point 527 on the object 501. It is further possible to tilt coded patterns at a known angle with respect to an epipolar line and efficiently extract object surface coordinates. Examples of coded patterns are shown in FIGS. 20-29.

In embodiments having a periodic pattern, such as a sinusoidally repeating pattern, the sinusoidal period represents a plurality of pattern elements. Since there is a multiplicity of periodic patterns in two-dimensions, the pattern elements are non-collinear. In some cases, a striped pattern having stripes of varying width may represent a coded pattern.

Referring now to FIGS. 14-17, embodiments of uncoded structured light patterns are shown. Some of the patterns use simple on-off (or 1, 0) type pattern and are referred to as binary patterns. In some cases, the binary pattern is one known to have a particular sequence referred to as a gray code sequence. The term gray code as used in the field of three-dimensional metrology based on structured light is somewhat different than the term as used in the field of electrical engineering, where the term Gray code commonly means the sequential changing of a single bit at a time. The present application follows the use of the term gray code as is customary for the field of three-dimensional metrology where the gray code typically represents a sequence of binary black and white values. FIG. 14A shows an example of a binary pattern that includes a plurality of sequential images 530, 532, 534, each having a different stripped pattern thereon. Usually, the stripes alternate between bright (illuminated) and dark (non-illuminated) striped regions. Sometimes, the terms white and black are used to mean illuminated and non-illuminated, respectively. Thus, when the images 530, 532, 534 are projected sequentially onto the surface 524 as shown in FIG. 14B which shows a composite image 536. It should be noted that the bottom two patterns 535, 537 of FIG. 14B are not illustrated in FIG. 14A for clarity. For each point on the object 501 (represented by a camera pixel in the image) the composite pattern 536 has a unique binary value obtained through the sequential projection of patterns 530, 532, 534, 535, 537, which correspond to a relatively small range of possible projection angles Φ. By using these projection angles, together with the known pixel angle Ω for a given pixel and the known baseline distance D, Eq. (1) may be used to find the distance Z from the camera to the object point. A two-dimensional angle is known for each camera pixel. The two-dimensional angle corresponds generally to the one-dimensional angle Omega, which is used in the calculation of the distance Z according to Eq. (1). However, a line drawn from each camera pixel through the camera perspective center and intersecting the object in a point defines a two-dimensional angle in space. When combined with the calculated value Z, the two pixel angles provide three-dimensional coordinates corresponding to a point on the object surface.

Similarly, rather than a binary pattern, a sequential series of grey patterns having stripes with varying grey-scale values may be used. When used in this context, the term grey-scale usually refers to an amount of irradiance at a point on the object from white (maximum light), to various levels of gray (less light), to black (minimum light). This same nomenclature is used even if the light being projected has a color such as red, and the gray-scale values correspond to levels of red illumination. In an embodiment, the pattern (FIG. 15) has a plurality of images 538, 540, 542 with stripes having varying light power levels, such as black, grey and white for example, used to produce an emitted pattern on the object 501. The grey scale values may be used to determine the possible projection angles Φ to within a relatively small range of possible values. As discussed hereinabove, Eq. (1) may then be used to determine the distance Z.

In another embodiment, the distance Z to an object point may be found by measuring a phase shift observed in a plurality of images. For example, in an embodiment shown in FIG. 16, the gray-scale intensities 546, 548, 550 of a projector pattern 552 vary in a sinusoidal manner, but with the phase shifted between projected patterns. For example, in the first projector pattern, the sinusoid gray-scale intensity 546 (representing optical power per unit area) may have a phase of zero degrees at a particular point. In the second projector pattern, the sinusoid intensity 548 has a phase of 120 degrees at the same point. In the third projector pattern, the sinusoid intensity 550 may have a phase of 240 degrees at the same point. This is the same thing as saying that the sinusoidal pattern is shifted to the left (or right) by one-third of a period in each step. A phase shift method is used to determine a phase of the projected light at each camera pixel, which eliminates the need to consider information from adjacent pixels as in the coded-pattern single shot case. Many methods may be used to determine the phase of a camera pixel. One method involves performing a multiply and accumulate procedure and then taking an arctangent of a quotient. This method is well known to those of ordinary skill in the art and is not discussed further. In addition, with the phase shift method, the background light cancels out in the calculation of phase. For these reasons, the value Z calculated for a give pixel is usually more accurate than the value Z calculated using a coded-pattern single shot method. However, with a single collection of sinusoidal patterns such as those shown in FIG. 16, all of the calculated phases vary from 0 to 360 degrees. For a particular structured-light triangulation system, these calculated phases may be adequate if "thickness" of the object under test does not vary by too much because the angle for each projected stripe is known ahead of time. However, if the object is too thick, an ambiguity may arise between in the phase calculated for a particular pixel since that pixel may have been obtained from first projected ray of light striking the object at a first position or a second projected ray of light striking the object at a second position. In other words, if there is a possibility that the phase may vary by more than 2π radians for any pixel in the camera array, then the phases may not be properly decoded and the desired one to one correspondence not achieved.

Figure 17A:
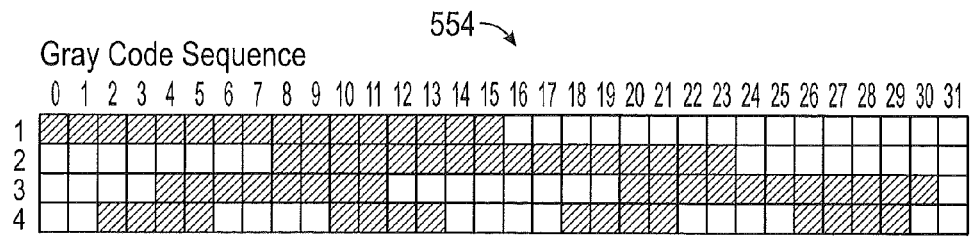
Figure 17B:
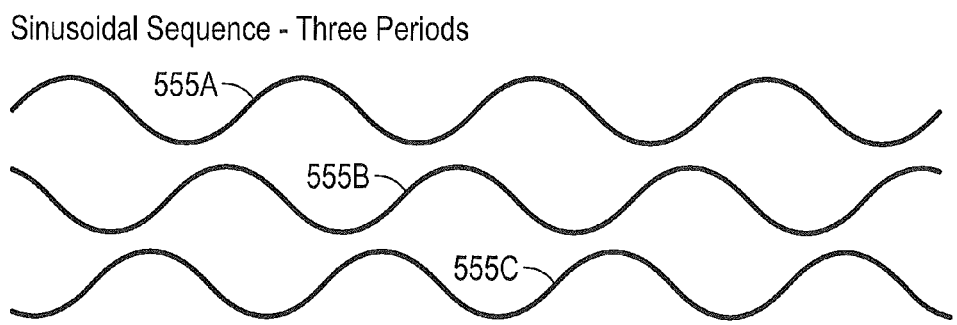

FIG. 17A shows a sequence 1-4 of projected gray-code intensities 554 according to a method by which the ambiguity may be eliminated in the distance Z based on a calculated phase. A collection of gray code patterns are projected sequentially onto the object. In the example shown, there are four sequential patterns indicated by 1, 2, 3, 4 to the left side of 554 in FIG. 17A. The sequential pattern 1 has dark (black) on the left half of the pattern (elements 0-15) and bright (white) on the right half of the pattern (elements 16-31). The sequential pattern 2 has a dark band toward the center (elements 8-23) and bright bands toward the edges (elements 2-7, 24-31). The sequential pattern 3 has two separated bright bands near the center (elements 4-11, 20-27) and three bright bands (elements 0-3, 12-19, 28-31). The sequential pattern 4 has four separated dark bands (elements 2-5, 10-13, 18-21, 26-29) and five separated bright bands (elements 0-1, 6-9, 14-17, 22-25, 30-31). For any given pixel in the camera, this sequence of patterns enables the "object thickness region" of the object to be improved by a factor of 16 compared to an initial object thickness region corresponding to all the elements 0 to 31.

Figure 16:
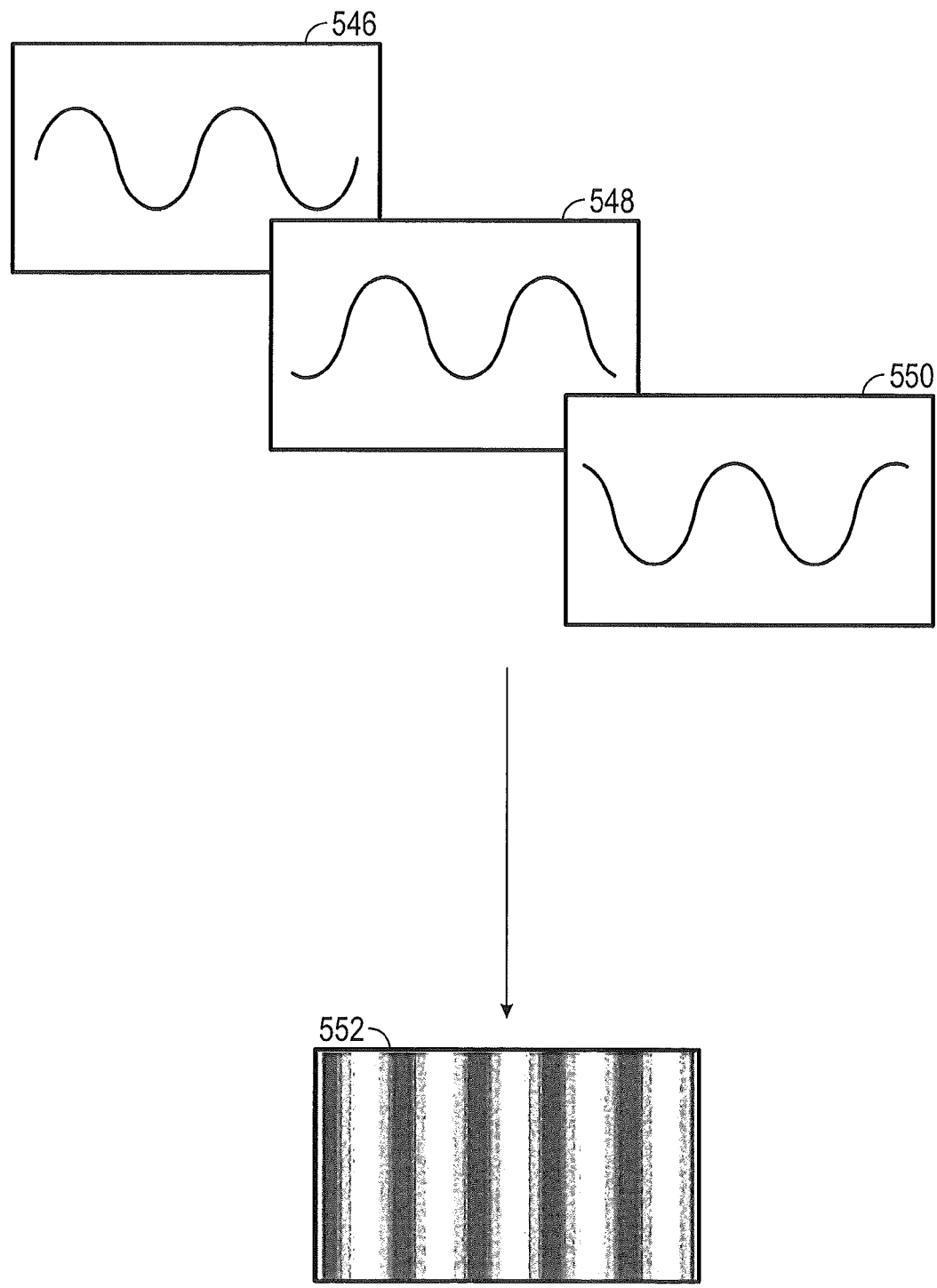
Figure 17C:
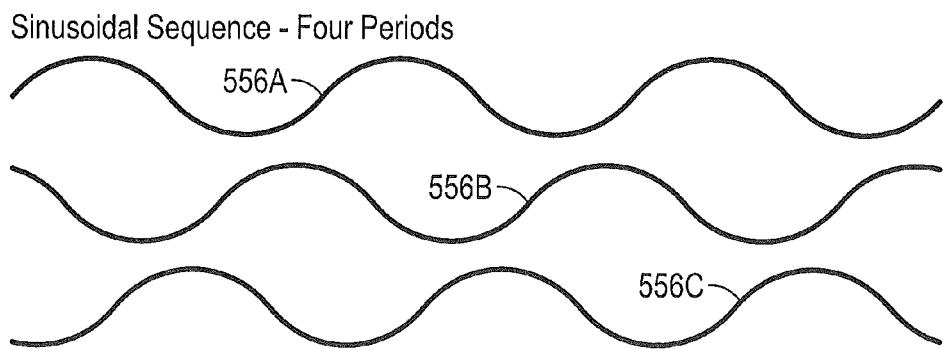

In another method 556 illustrated in FIG. 17C, a phase shift method, similar to the method of FIG. 16, is performed. In the embodiment shown in FIG. 17C, a pattern 556A four sinusoidal periods are projected onto an object. For reasons discussed hereinabove, there may be an ambiguity in a distance Z to an object using the pattern of FIG. 17C. One way to reduce or eliminate the ambiguity is to project one or more additional sinusoidal patterns 556B, 556C, each pattern having a different fringe period (pitch). So, for example, in FIG. 17B, a second sinusoidal pattern 555 having three fringe periods rather than four fringe periods is projected onto an object. In an embodiment, the difference in the phases for the two patterns 555, 556 may be used to help eliminate an ambiguity in the distance Z to the target.

Another method for eliminating ambiguity is to use a different type of method, such as the gray code method of FIG. 17A for example, to eliminate the ambiguity in the distances Z calculated using the sinusoidal phase shift method.

Figure 18:
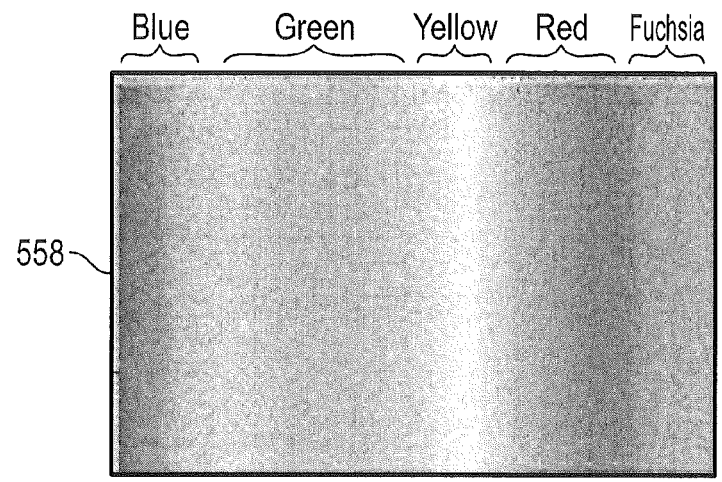
FIGS. 18-19 are spatially varying color coded patterns that may be emitted by the structured light device of FIG. 10 or FIG. 12, in accordance with an embodiment of the invention.
Figure 19:
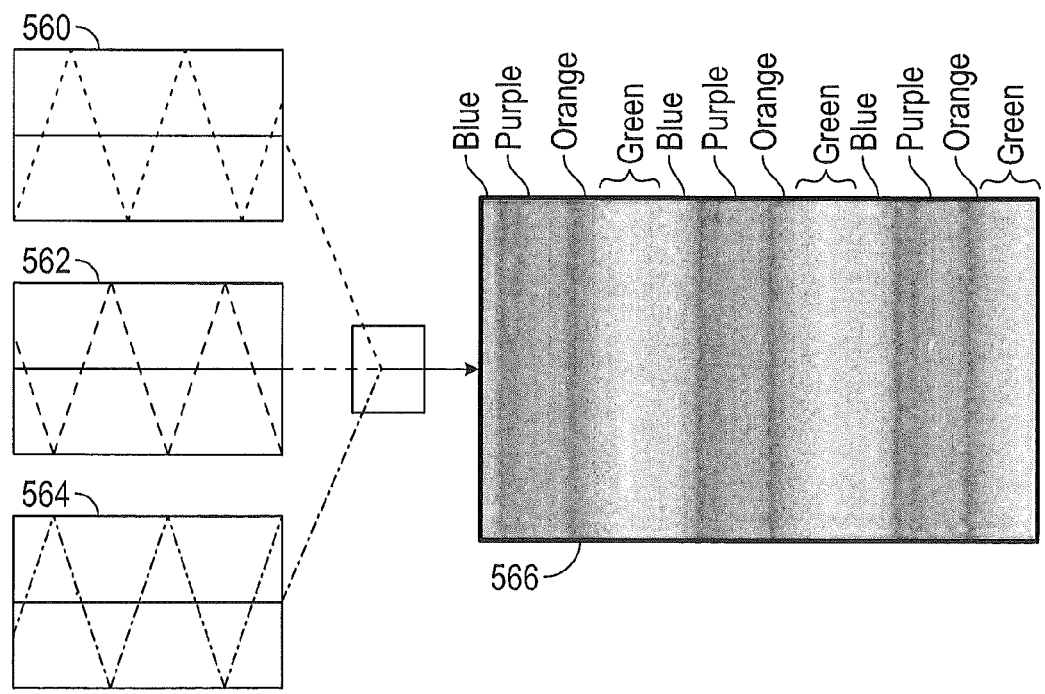

In applications where the object and device 500 are in relative motion, it may be desirable to use a single pattern that allows the camera 510 to capture an image that provides sufficient information to measure the three dimensional characteristics of the object 501 without having to project sequential images. Referring now to FIG. 18 and FIG. 19, patterns 558, 566 have a distribution of colors that may in some cases enable measurement of the object to be based on a single (coded) image. In the embodiment of FIG. 18, the pattern 558 uses lines having a continuously spatially varying wavelength of light to create a pattern where the color changes continuously from blue to green to yellow to red to fuchsia for example. Thus for each particular spectral wavelength, a one-to-one correspondence may be made between the emitted image and the imaged pattern. With the correspondence established, the three-dimensional coordinates of the object 501 may be determined from a single imaged pattern. In one embodiment, the stripes of the pattern 558 are oriented perpendicular to the epipolar lines on the projector plane. Since the epipolar lines on the projector plane map into epipolar lines on the camera image plane, it is possible to obtain an association between projector points and camera points by moving along the direction of epipolar lines in the camera image plane and noting the color of the line in each case. It should be appreciated that each pixel in the camera image plane corresponds to a two-dimensional angle. The color enables determination of the one-to-one correspondence between particular projection angles and particular camera angles. This correspondence information, combined with the distance between the camera and the projector (the baseline distance D) and the angles of the camera and projector relative to the baseline, is sufficient to enable determination of the distance Z from the camera to the object.

Another embodiment using color patterns is shown in FIG. 19. In this embodiment, a plurality of colored patterns having varying intensities 560, 562, 564 are combined to create a color pattern 566. In one embodiment, the plurality of colored patterns intensities 560, 562, 564 are primary colors, such that pattern 560 varies the intensity of the color red, pattern 562 varies the intensity of the color green and pattern 564 varies the intensity of the color blue. Since the ratios of colors are known, the resulting emitted image has a known relationship that may be decoded in the imaged pattern. As with the embodiment of FIG. 18, once the correspondence established, the three-dimensional coordinates of the object 501 may be determined. Unlike the pattern of FIG. 18, in which a single cycle of unique colors are projected, the pattern of FIG. 19 projects three complete cycles of nearly identical colors. With the pattern of FIG. 18, there is little possibility of ambiguity in the measured distance Z (at least for the case in which the projected lines are perpendicular to epipolar lines) since each camera pixel recognizes a particular color that corresponds uniquely to a particular projection direction. Since the camera angle and projection angles are known, triangulation may be used to determine the three-dimensional object coordinates at each pixel position using only a single camera image. Hence the method of FIG. 18 may be considered to be a coded, single-shot method. In contrast, in FIG. 19, there is a chance of ambiguity in the distance Z to an object point. For example, if the camera sees a color purple, the projector may have projected any of three different angles. Based on the triangulation geometry, three different distances Z are possible. If the thickness of the object is known ahead of time to be within a relatively small range of values, then it may be possible to eliminate two of the values, thereby obtaining three-dimensional coordinates in a single shot. In the general case, however, it would be necessary to use additional projected patterns to eliminate the ambiguity. For example, the spatial period of the colored pattern may be changed, and then used to illuminate the object a second time. In this instance, this method of projected structured light is considered to be a sequential method rather than a coded, single-shot method.

Figure 20:
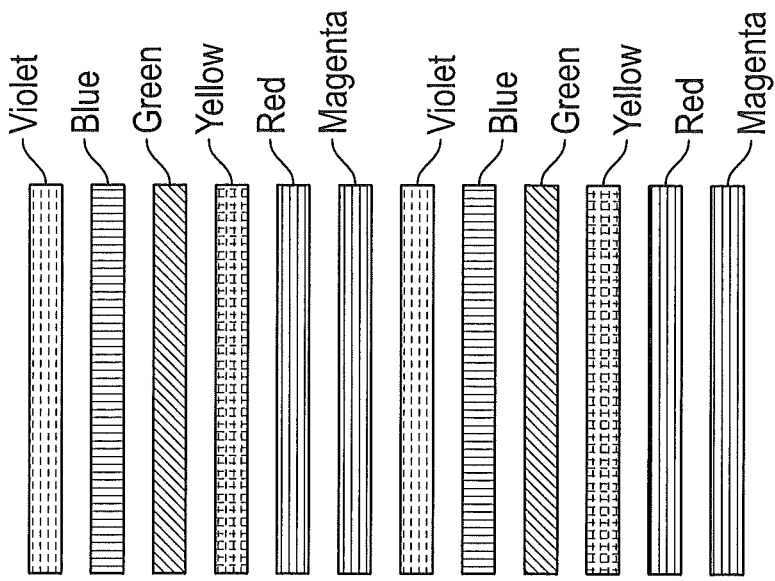
FIGS. 20-23 are strip index coded patterns that may be emitted by the structured light device of FIG. 10 or FIG. 12, in accordance with an embodiment of the invention.
Figure 21:
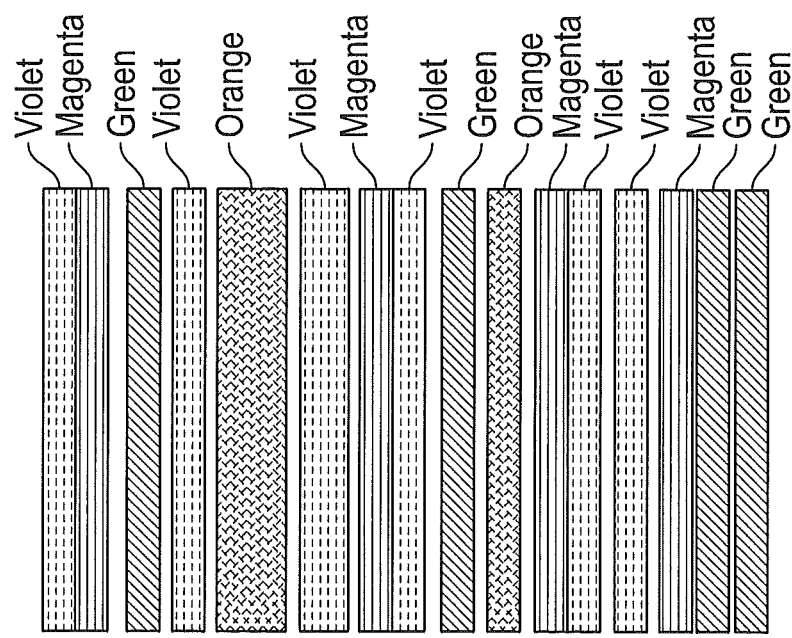

Referring now to FIGS. 20-23, coded structured light patterns for a single image acquisition are shown based on a stripe indexing technique. In the embodiments of FIG. 20 and FIG. 21, patterns having color stripes 568, 570 are emitted by the projector 508. This technique utilizes a characteristic of image sensors wherein the sensor has three independent color channels, such as red, green, blue or cyan, yellow, magenta for example. The combinations of the values generated by these sensor channels may produce a large number of colored patterns. As with the embodiment of FIG. 19, the ratio of the color distribution is known, therefore the relationship between the emitted pattern and the imaged pattern may be determined and the three-dimensional coordinates calculated. Still other types of colored patterns may be used, such as a pattern based on the De Bruijn sequence. The stripe indexing techniques and the De Bruijn sequence are well known to those of ordinary skill in the art and so are not discussed further.

Figure 22:
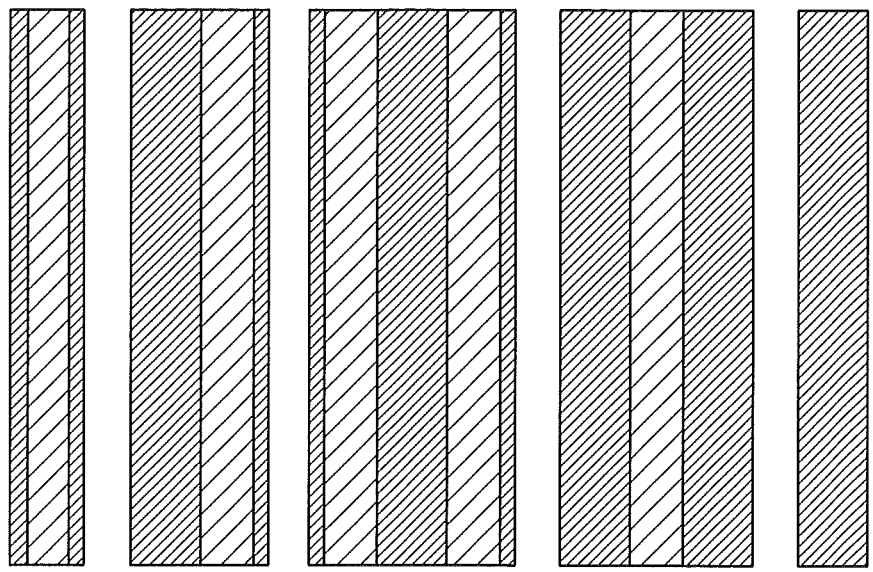
Figure 23:
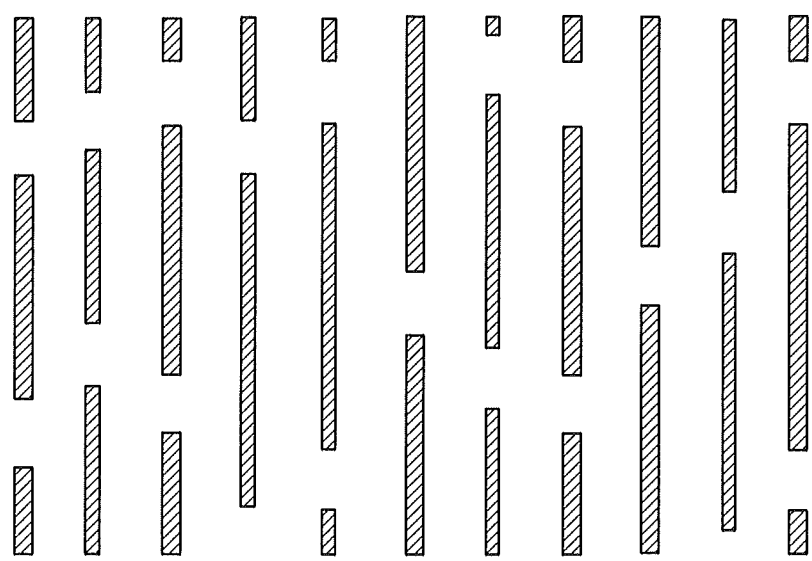

In the embodiments of FIG. 22 and FIG. 23, a non-color stripe indexing technique is used. In the embodiment of FIG. 22, the pattern 572 provides groups of stripes having multiple intensity (gray-scale) levels and different widths. As a result, a particular group of stripes within the overall image has a unique gray-scale pattern. Due to the uniqueness of the groups, a one-to-one correspondence may be determined between the emitted pattern and the imaged pattern to calculate the coordinates of the object 501. In the embodiment of FIG. 23, the pattern 574 provides a series of stripes having a segmented pattern. Since each line has unique segment design, the correspondence may be determined between the emitted pattern and the imaged pattern to calculate the coordinates of the object 501. In FIGS. 20-23, additional advantages may be gained by orienting the projected lines 572, 574 perpendicular to epipolar lines so that in the camera plane since this simplifies determination of a second dimension in finding the one-to-one correspondence between camera and projector patterns.

Figure 24:
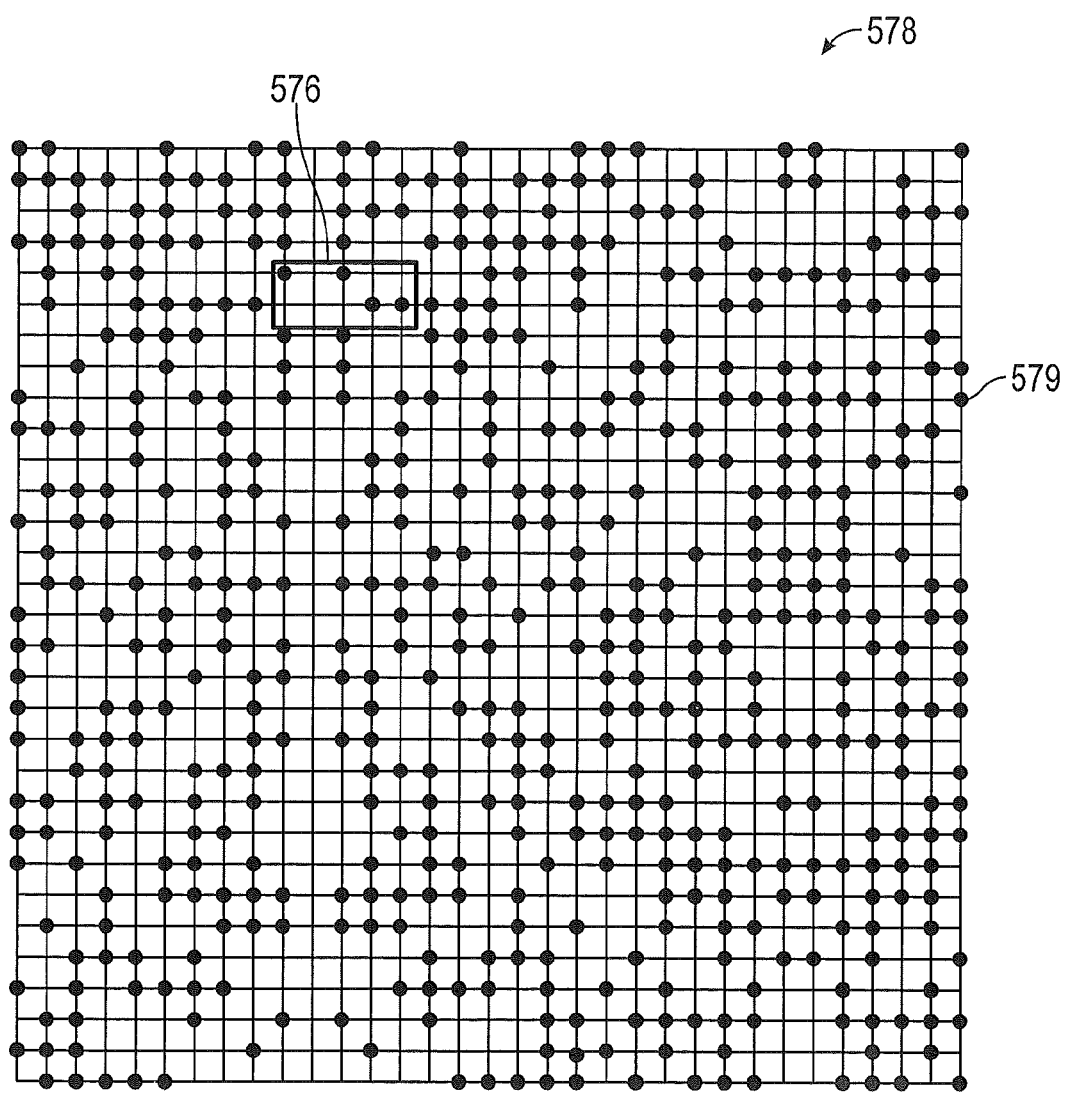
FIGS. 24-31 are two-dimensional grid patterns that may be emitted by the structured light device of FIG. 10 or FIG. 12, in accordance with an embodiment of the invention.
Figure 25A:
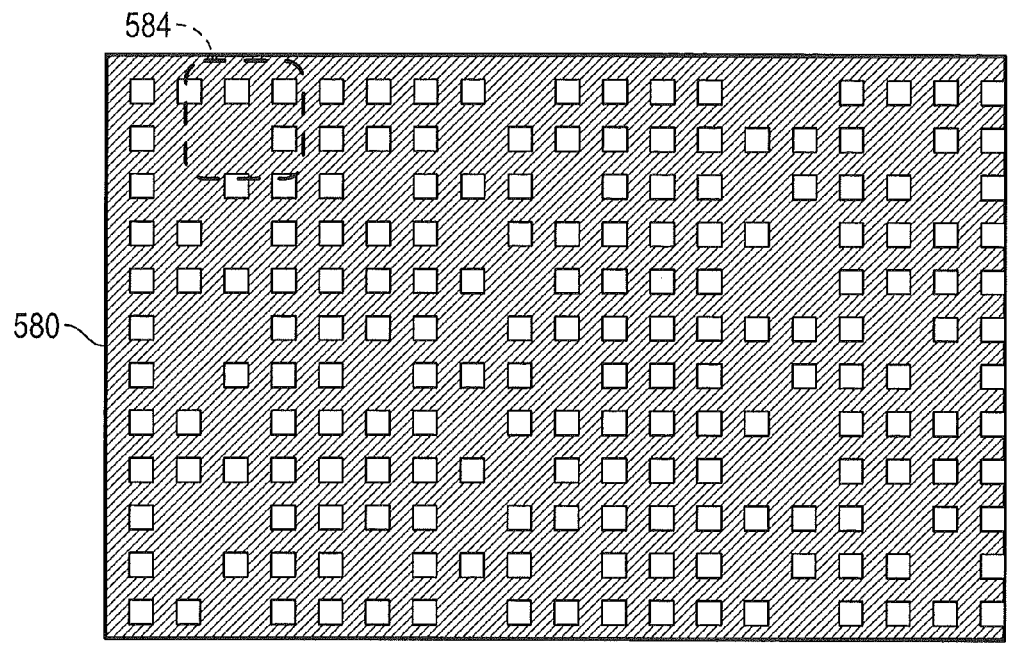
Figure 25B:
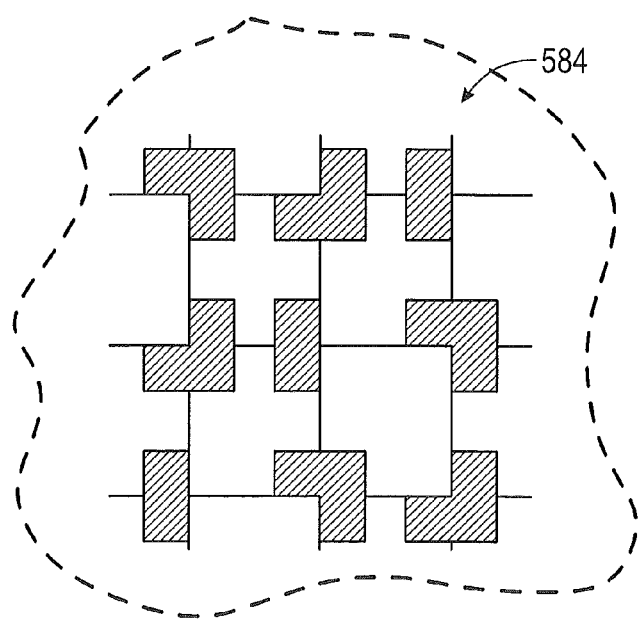
Figure 26:
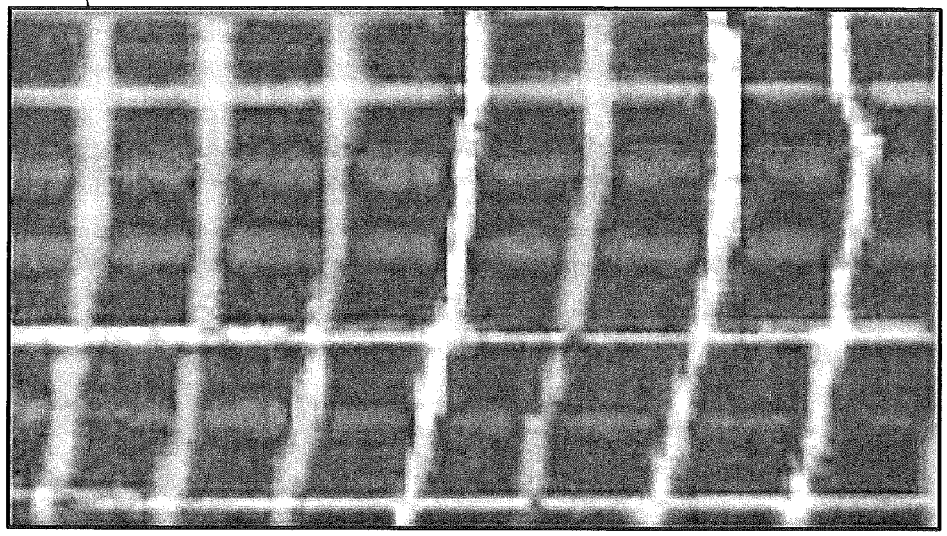
Figure 27:
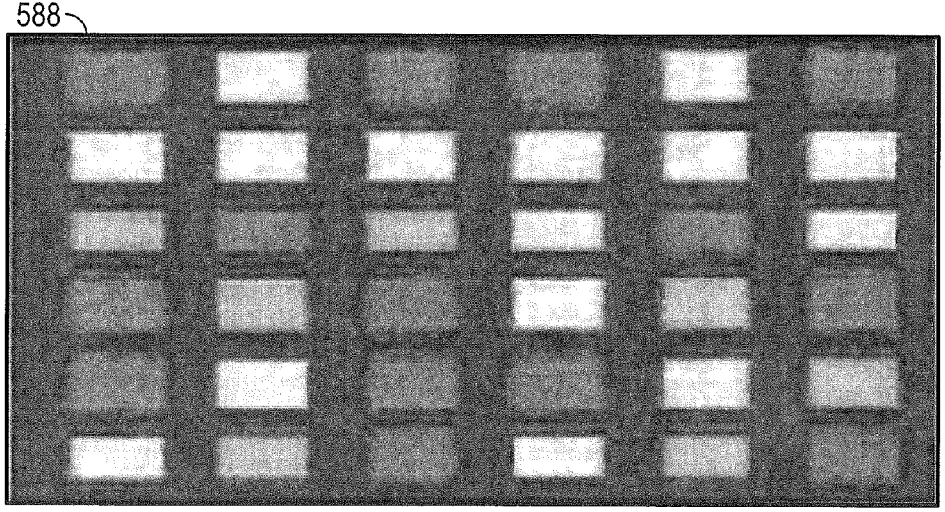

Referring now to FIGS. 24-27, coded structured light patterns are shown that use a two-dimensional spatial grid pattern technique. These types of patterns are arranged such that a sub window, such as window 576 on pattern 578 for example, is unique relative to other sub windows within the pattern. In the embodiment of FIG. 24, a pseudo random binary array pattern 578 is used. The pattern 578 uses a grid with elements, such as circles 579 for example, that form the coded pattern. It should be appreciated that elements having other geometric shapes may also be used, such as but not limited to squares, rectangles, and triangles for example. In the embodiment of FIG. 25, a pattern 580 is shown of a multi-valued pseudo random array wherein each of the numerical values has an assigned shape 582. These shapes 582 form a unique sub-window 584 that allows for correspondence between the emitted pattern and the imaged pattern to calculate the coordinates of the object 501. In the embodiment of FIG. 26, the grid 586 is color coded with stripes perpendicular to the projector plane. The pattern of FIG. 26 will not necessarily provide a pattern that can be decoded in a single shot, but the color information may help to simplify the analysis. In the embodiment of FIG. 27, an array 588 of colored shapes, such as squares or circles, for example, are used to form the pattern.

Figure 28A:
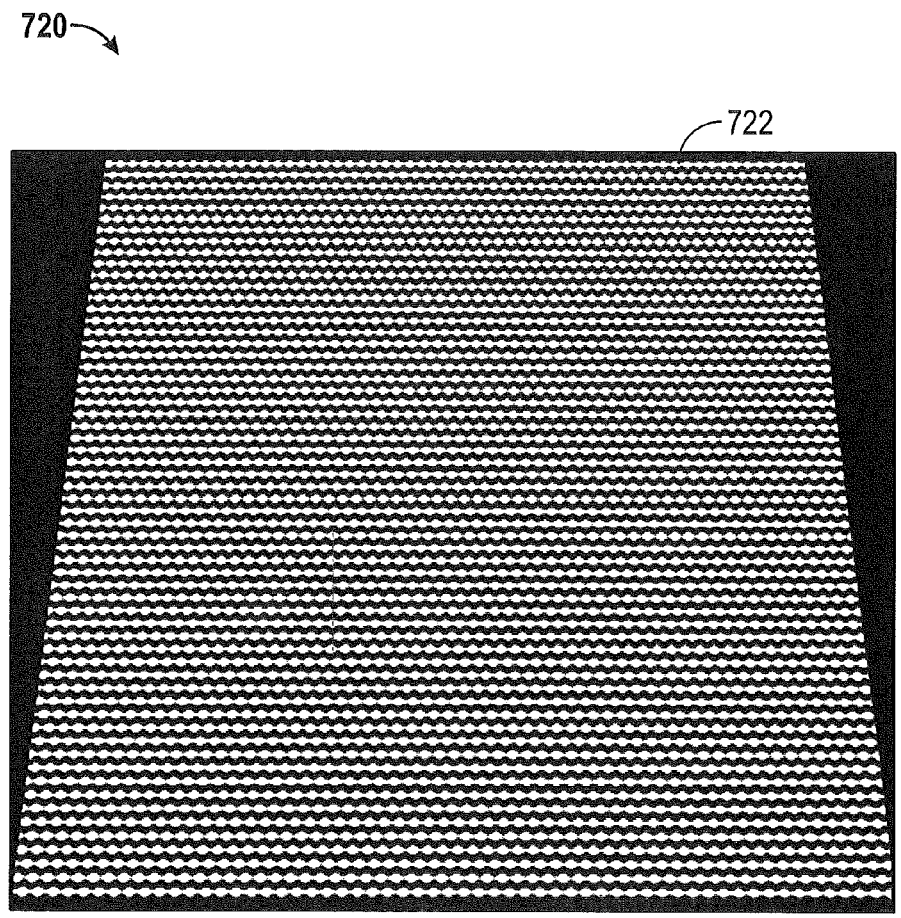
Figure 28B:
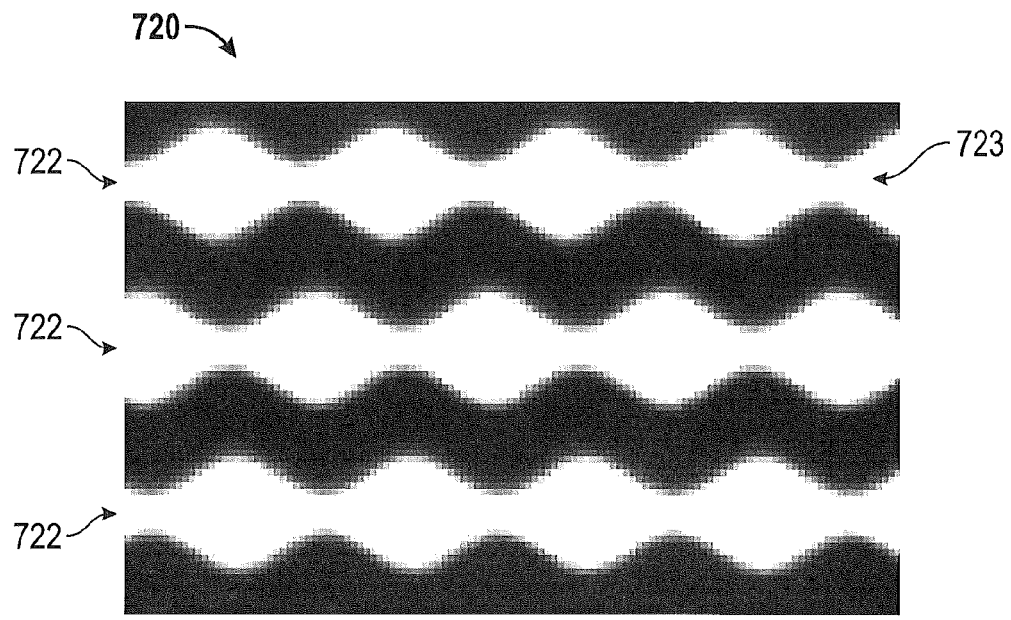

Referring now to FIGS. 28A-28B, an exemplary sinusoidal pattern 720 is shown. In an embodiment, the lines 734 are perpendicular to epipolar lines on the projector plane. The sinusoidal pattern 720 is made up of thirty lines 722 which are repeated once to give a total number of lines 722 of sixty. Each line 722 has a sinusoidal feature 723 that is approximately 180 degrees out of phase with the line above and the line below. This is to allow the lines 722 to be as close as possible and also allows a greater depth of field because the lines can blur on the projected surface or acquired image and still be recognized. Each single line 722 can be uniquely decoded using just the phase of that line where the line length must be at least one wavelength of the sinusoid.

Since the pattern 720 is repeated, it would generally cause ambiguities in the line identification. However this is problem is resolved in this system through the geometry of the camera's field of view and depth of field. For a single view of the camera, i.e. a row of pixels, within the depth of field in which the lines can be optically resolved, no two lines with the same phase can be imaged. For example, the first row of pixels on the camera can only receive reflected light from lines 1-30 of the pattern. Whereas further down the camera sensor, another row will only receive reflected light from lines 2-31 of the pattern, and so on. In FIG. 28B an enlarged portion of the pattern 720 is shown of three lines where the phase between consecutive lines 722 is approximately 180 degrees. It also shows how the phase of each single line is enough to uniquely decode the lines.

Figure 29A:
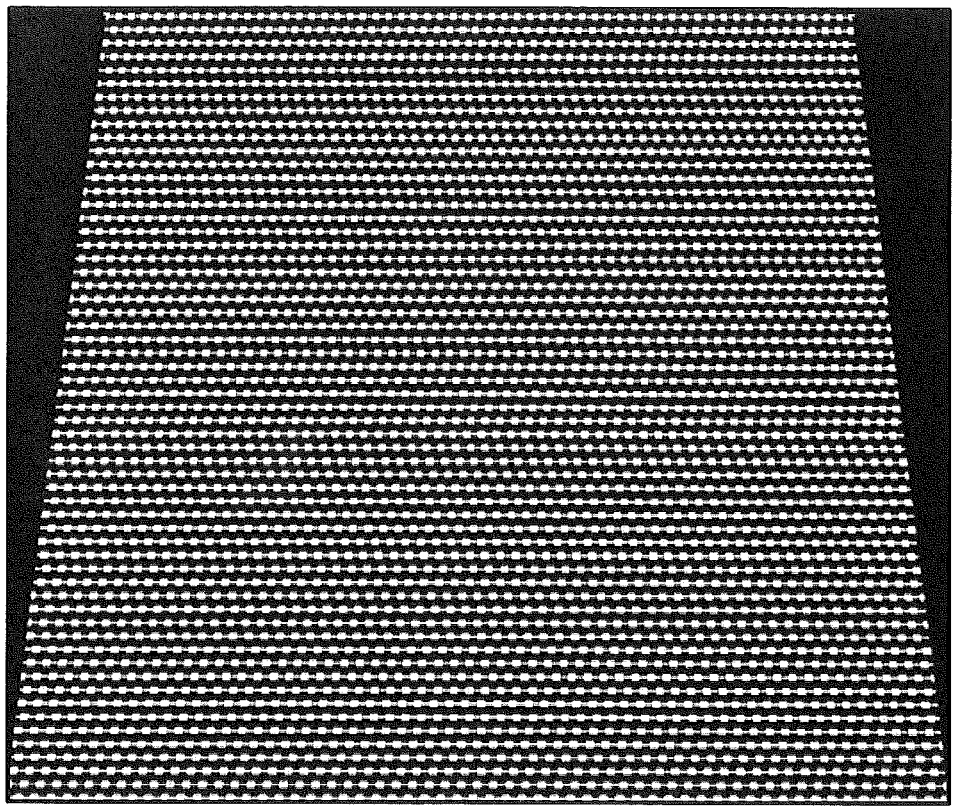
Figure 29B:
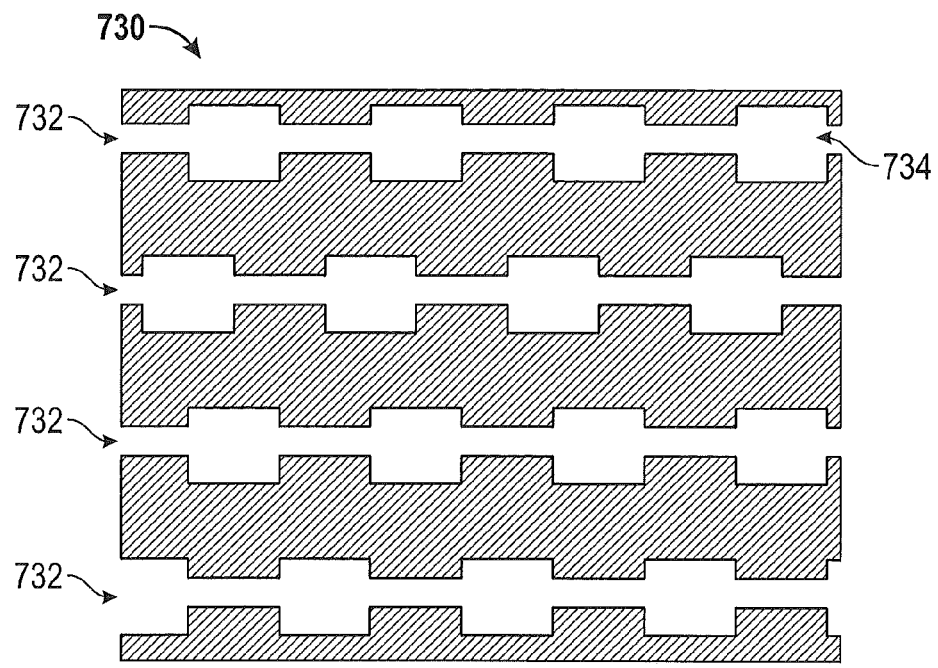

Referring now to FIGS. 29A-29B, another pattern 730 is shown having square pattern elements. In an embodiment, the lines 732 are perpendicular to epipolar lines on the projector plane. The square pattern 730 contains twenty seven lines 732 before the pattern 730 is repeated and has a total number of lines of 59. The code elements 734 of pattern 730 are distinguished by the phase of the square wave from left to right in FIG. 29B. The pattern 730 is encoded such that a group of sequential lines 732 are distinguished by the relative phases of its members. Within the image, sequential lines are found by scanning vertically for the lines. In an embodiment, scanning vertically means scanning along epipolar lines in the camera image plane. Sequential lines within a camera vertical pixel column are paired together and their relative phases are determined. Four sequential paired lines are required to decode the group of lines and locate them within the pattern 730. There is also an ambiguity in this pattern 730 due to the repeat but this is also solved in the same manner as discussed above with respect to sinusoidal pattern 720. FIG. 29B shows an enlarged view of four lines 732 of the square pattern. This embodiment shows that the phase of a single line 732 alone is not able to uniquely decode a line because the first and third lines have the same absolute phase.

This approach to code the relative phases versus the absolute phases provides advantages in that there is a higher tolerance for the positions of the phases. Minor errors in the construction of the projector which may cause the phases of the lines to shift throughout the depth of field of the camera, as well as errors due to the projector and camera lenses make an absolute phase much more difficult to determine. This can be overcome in the absolute phase method by increasing the period such that it is sufficiently large enough to overcome the error in determining the phase.

It should be appreciated that for the case of a two-dimensional pattern that projects a coded pattern of light, the three non-collinear pattern elements are recognizable because of their codes, and since they are projected in two dimensions, the at least three pattern elements are non-collinear. For the case of the periodic pattern, such as the sinusoidally repeating pattern, each sinusoidal period represents a plurality of pattern elements. Since there is a multiplicity of periodic patterns in two dimensions, the pattern elements are non-collinear. In contrast, for the case of the laser line scanner that emits a line of light, all of the pattern elements lie on a straight line. Although the line has width and the tail of the line cross section may have less optical power than the peak of the signal, these aspects of the line are not evaluated separately in finding surface coordinates of an object and therefore do not represent separate pattern elements. Although the line may contain multiple pattern elements, these pattern elements are collinear.

Figures 30, 31:
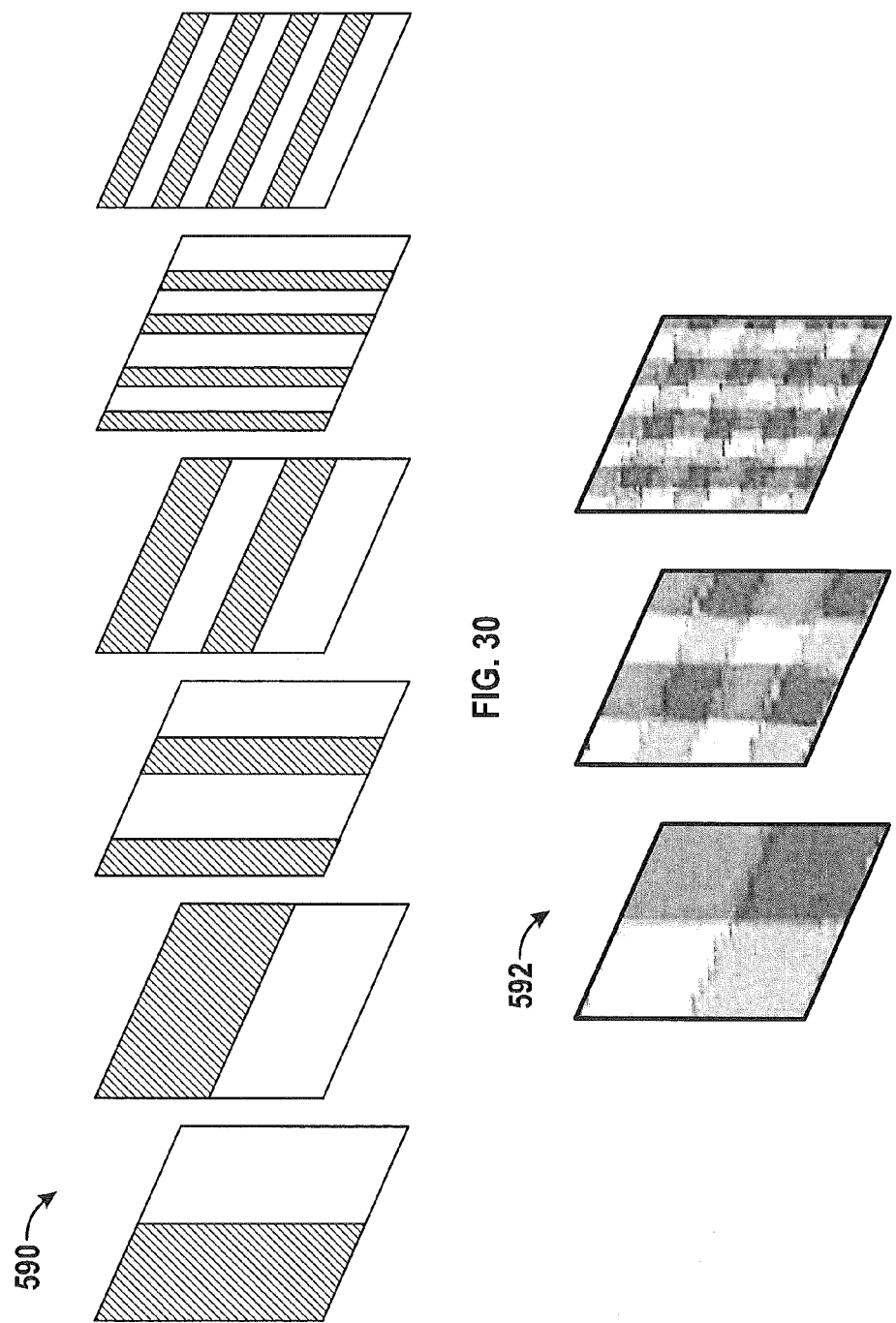
Figure 32:
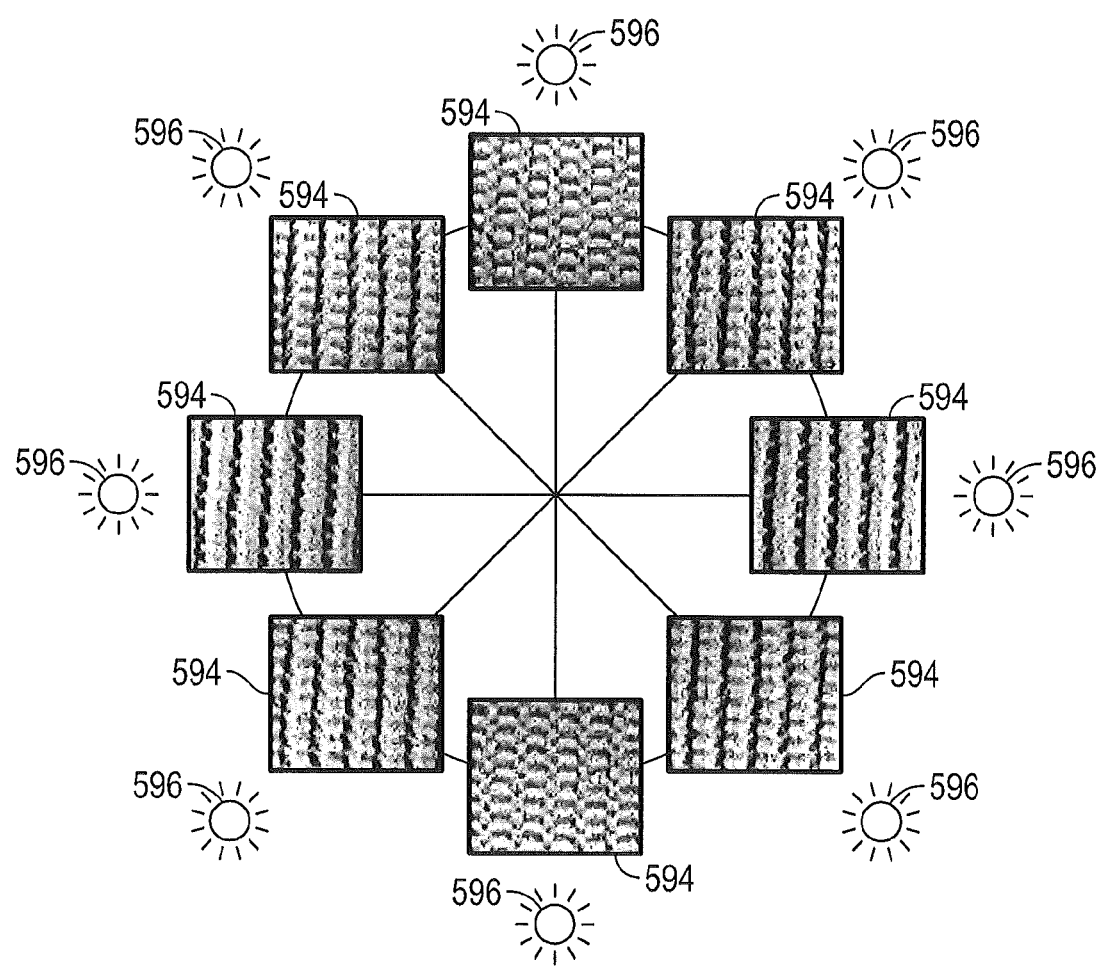
FIG. 32 is a schematic illustration of a photometric technique for acquiring patterns of structured light under a plurality of lighting conditions; and, FIG. 33 is an illustration of a structured light scanner device independently operable from an AACMM in accordance with another embodiment of the invention.

Further, the various pattern techniques may be combined as shown in FIGS. 30-31 to form either a binary (FIG. 30) checkerboard uncoded pattern 590 or a colored (FIG. 31) checkerboard uncoded pattern 592. In still another embodiment shown in FIG. 32, a photometric stereo technique may be used where a plurality of images 594 are taken on the object 501 where the light source 596 is moved to a plurality of locations.

Figure 33:
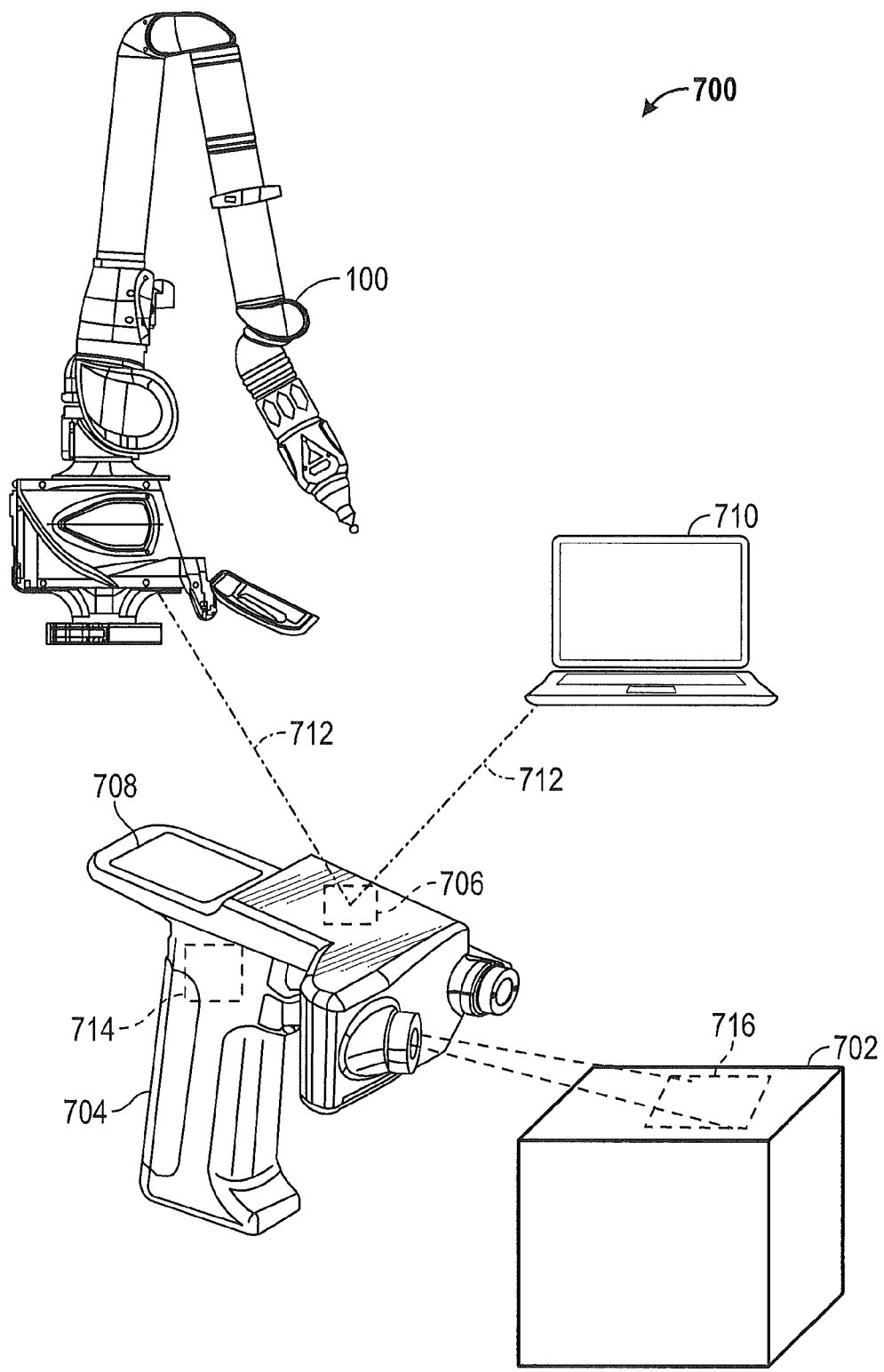

Referring now to FIG. 33, another embodiment is shown of a system 700 for acquiring three-dimensional coordinates of an object 702. In this embodiment, the device 704 is independently operable when detached from the AACMM 100. The device 704 includes a controller 706 and an optional display 708. The display 708 may be integrated in the housing of the device 704 or may be a separate component that is coupled to the device 704 when it is used independently from the AACMM 100. In embodiments where the display 708 is separable from the device 704, the display 708 may include a controller (not shown) that provides additional functionality to facilitate to independent operation of the device 704. In one embodiment, the controller 706 is disposed within the separable display.

The controller 706 includes a communications circuit configured to wirelessly transmit data, such as images or coordinate data via a communications link 712 to the AACMM 100, to a separate computing device 710 or a combination of both. The computing device 710 may be, but is not limited to a computer, a laptop, a tablet computer, a personal digital assistant (PDA), or a cell phone for example. The display 708 may allow the operator see the acquired images, or the point cloud of acquired coordinates of the object 702. In one embodiment, the controller 706 decodes the patterns in the acquired image to determine the three-dimensional coordinates of the object. In another embodiment, the images are acquired by the device 704 and transmitted to either the AACMM 100, the computing device 710 or a combination of both.

The device 704 may further include a location device assembly 714. The location device assembly may include one or more of inertial navigation sensors, such as a Global Positioning System (GPS) sensor, a gyroscopic sensor, an accelerometer sensor. Such sensors may be electrically coupled to the controller 706. Gyroscopic and accelerometer sensors may be single-axis or multiple-axis devices. The location device assembly 714 is configured to allow the controller 706 to measure or maintain the orientation of the device 704 when detached from the AACMM 100. A gyroscope within the location device assembly 714 may be a MEMS gyroscopic device, a solid-state ring-laser device, a fiber optic device gyroscope, or other type.

When the device 704 is removed from the articulated arm CMM 100, a method is used to combine images obtained from multiple scans. In an embodiment the images are each obtained by using coded patterns so that only a single image is needed to obtain three-dimensional coordinates associated with a particular position and orientation of the device 704. One way to combine multiple images captured by the device 704 is to provide at least some overlap between adjacent images so that point cloud features may be matched. This matching function may be assisted by the inertial navigation devices described above.

Another method that can be used to assist in accurate registration of images collected by the device 704 is the use of reference markers. In an embodiment, the reference markers are small markers having an adhesive or sticky backing, for example, circular markers that are placed on an object or objects being measured. Even a relatively small number of such markers can be useful in registering multiple images, especially if the object being measured has a relatively small number of features to use for registration. In an embodiment, the reference markers may be projected as spots of light onto the object or objects under inspection. For example, a small portable projector capable of emitting a plurality of small dots may be placed in front of the object or objects to be measured. An advantage of projected dots over sticky dots is that the dots do not have to be attached and later removed.

In one embodiment, the device projects the structured light over a contiguous and enclosed area 716 and can acquire an image over the area 716 at a range of 100 mm to 300 mm with an accuracy of 35 microns. In an embodiment, the perpendicular area 716 of projection is approximately 150 to 200 mm$^2$. The camera or cameras 510 may be a digital camera having a 1.2-5.0 megapixel CMOS or CCD sensor.

Referring to FIG. 28 and FIG. 29, the process of decoding a coded pattern will be described. The first step in decoding an image of the pattern is to extract the centers of gravity (cog) 724 (FIG. 28C) of the projected pattern 720 features in the Y direction. This is carried out by calculating a moving average of the pixel grayscale values and moving downwards in the Y direction processing a single column at a time. When a pixel value in an image falls above the moving average value then a starting point for a feature is found. After a starting point is found the width of the feature continues to increase until a pixel value falls below the moving average value. A weighted average is then calculated using the pixel values and their Y positions between the start and end points to give the cog 724 of the pattern feature 723 in the image. The distances between the start and end points are also recorded for later use.

Figure 28C:
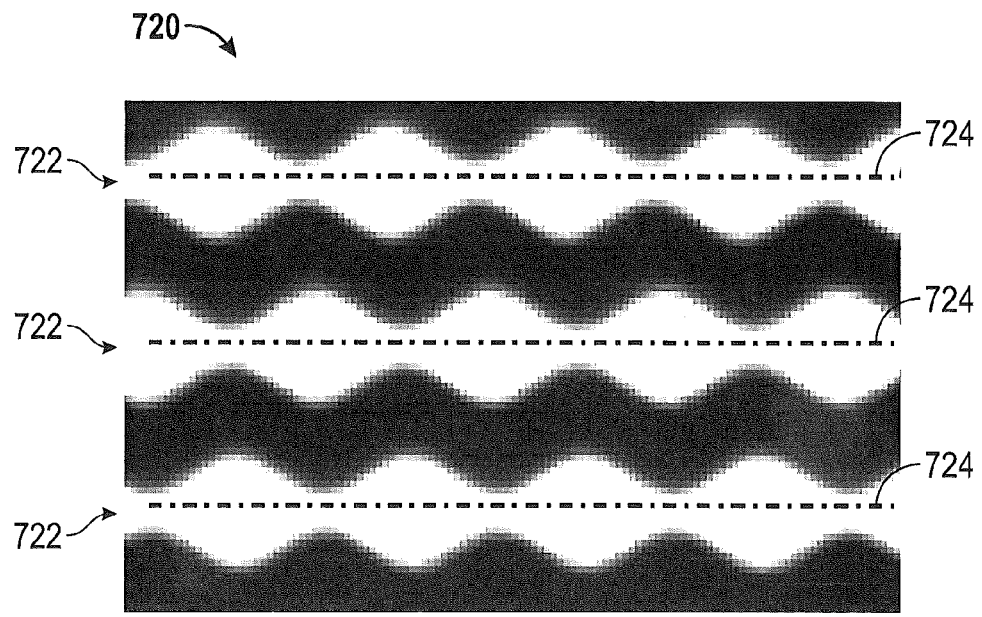
Figure 28D:
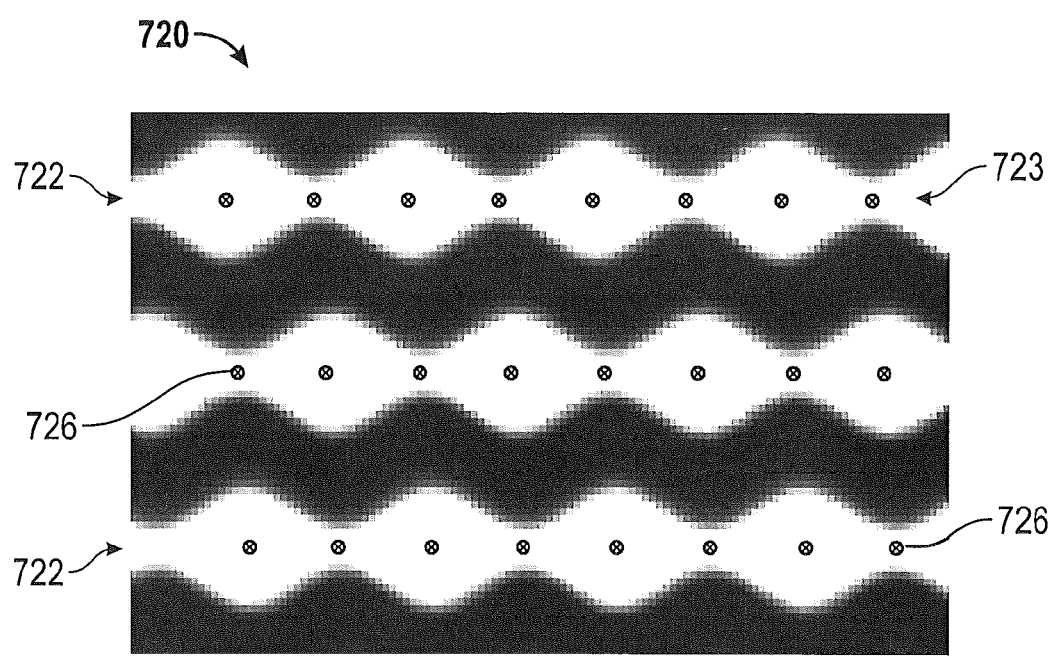

The resulting cogs 724 are used next to find the pattern lines 722. This is done by moving in a left to right direction (when viewed from the direction shown in the Figures) starting with the first column of the image. For each cog 724 in this column the neighboring column to the immediate right is searched for a cog 724 that is within a particular distance. If two matching cogs 724 are found then a potential line has been determined. As the process moves across the image more new lines are determined and other previously determined lines are extended in length as additional cogs 724 are detected within the tolerance. Once the entire image has been processed a filter is applied to the extracted lines to ensure only lines of a desired length, which is the wavelength of the pattern, are used in the remaining steps. FIG. 28C also shows the detected lines where they are all longer than a single wavelength of the pattern. In one embodiment there is no or a small delta between neighboring column's cogs.

The next step in the decoding process is to extract the projected pattern features along the lines in the X direction in the form of block centers. Each pattern contains both wide blocks and narrow blocks. In the sinusoidal pattern 720 this refers to the peaks and valleys of the wave and in the square pattern 730 this refers to the wide squares and the narrow squares. This process proceeds in a similar fashion to extracting the features in the Y direction, however the moving average is also calculated using the widths found in the first stage and the direction of movement is along the line. As described above, the features are extracted in the area where widths are above the moving average value but in this process, features are also extracted in the areas where the widths are below the moving average. The widths and X positions are used to calculate a weighted average to find the center of the block 726 in the X direction. The Y positions of the cogs 724 between moving average crossings are also used to calculate a center for the block 726 in the Y direction. This is carried out by taking the average of the Y coordinates of the cogs. The start and end points of each line are also modified based on the features extracted in this step to ensure that both points are where the crossing of the moving average occurs. In one embodiment, only complete blocks are used in later processing steps.

The lines and blocks are then processed further to ensure that the distance between the block centers 726 on each line are within a predetermined tolerance. This is accomplished by taking the delta between the X center positions between two neighboring blocks on a line and checking that the delta is below the tolerance. If the delta is above the tolerance then the line is broken up into smaller lines. If the break is required between the last two blocks on a line then the last block is removed and no additional line is created. If the break is required between the first and second or second and third blocks on a line then the blocks to the left of the break are also discarded and no additional line is created. For situations where the break occurs in any other place along the line the line is broken into two and a new line is created and the appropriate blocks are transferred to it. After this stage of processing the two patterns require different steps to finish decoding.

The sinusoidal pattern 720 may now be decoded with one additional step of processing using the block centers on the lines. The modulus of each block X center and the wavelength of the pattern 720 on a line 722 are calculated and the average of these values gives the phase of the line 722. The phase of the line 722 may then be used to decode the line in the pattern 720 which in turn allows for the determination of an X, Y, Z coordinate position for all cogs 724 on that line 722.

Before the square pattern 730 is decoded, first lines 732 be connected vertically before any decoding can take place. This allows a group of lines to be identified and not just a single line like the sinusoidal pattern. Connections 736 are found between lines 732 by using the blocks 734 and the cogs contained in the block calculated in the first stage of processing. The first cog in each block on a line 732 is tested to see if there is another cog directly below it in the same column. If there is no cog below then there is no connection with another line at this point so processing continues. If there is a cog below then the Y distance between the two cogs is determined and compared to a desired maximum spacing between lines. If the distance is less than this value the two lines are considered connected at that point and the connection 736 is stored and processing continues onto the next block. In one embodiment, a line connection 736 is unique such that no two lines will have more than one connection 736 between them.

Figure 29C:
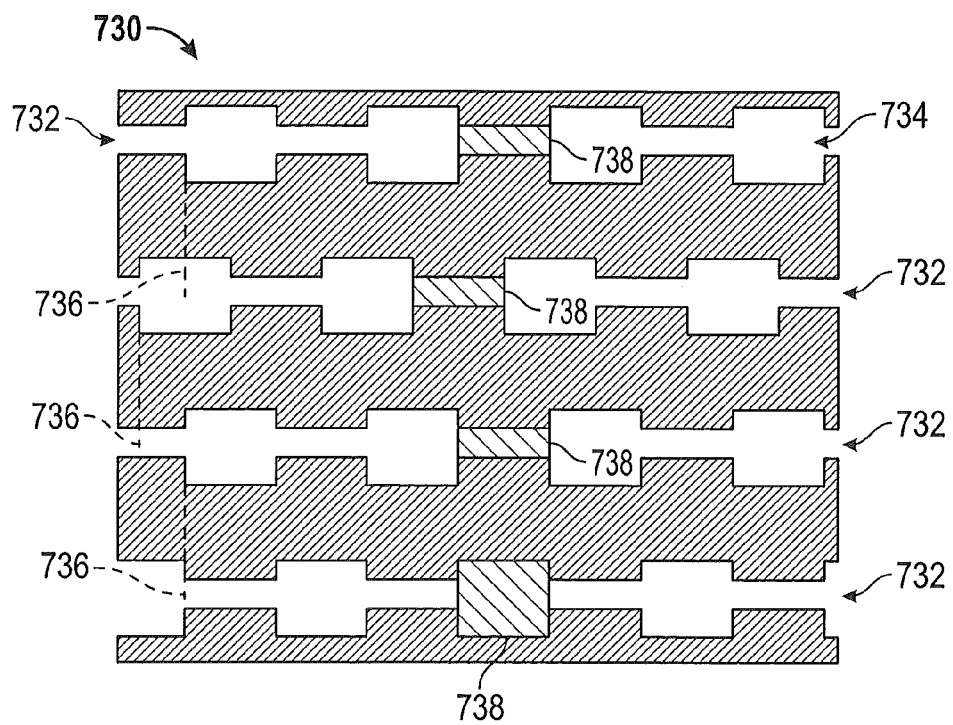

The next step of processing for the square pattern 730 is phase calculation between connected lines. Each pair of lines 732 is first processed to determine the length of overlap between them. In one embodiment there is at least one wavelength of overlap between the pair of lines to allow the calculation of the relative phase. If the lines have the desired overlap, then the cog at center of the area of overlap is found. The blocks 738 that contain the center cog and the cog directly below are determined and the relative phase between the block X centers is calculated for that line connection. This process is repeated for all connections between lines. In one embodiment, the process is repeated in only the downwards direction in the Y axis. This is because the code is based on connections below lines and not the other way round or both. FIG. 29C shows the blocks 738 that could be used for calculating the relative phase for this set of lines. The relative phases in embodiment of FIG. 29C are 3, 1 and 2 and these phases would be used in the final stage to decode the top line.

The next step in decoding the square pattern 730 is performing a look up using the relative phases calculated in the previous step. Each line 732 is processed by tracking down the line connections 736 until a connection depth of four is reached. This depth is used because this is the number of phases to decode the line. At each level of the connection a hash is determined using the relative phase between the lines 732. When the required connection depth is reached the hash is used to look up the line code. If the hash returns a valid code then this is recorded and stored in a voting system. Every line 732 is processed in this way and all connections that are of the desired depth are used to generate a vote if they are a valid phase combination. The final step is then to find out which code received the most votes on each line 732 and assigned the code of the line 732 to this value. If there is not a unique code that received the most votes then the line is not assigned a code. The lines 732 are identified once a code has been assigned and the X, Y, Z coordinate position for all cogs on that line 732 may now be found.

It should be noted that although the descriptions given above distinguish between line scanners and area (structured light) scanners based on whether three or more pattern elements are collinear, it should be noted that the intent of this criterion is to distinguish patterns projected as areas and as lines. Consequently patterns projected in a linear fashion having information only along a single path are still line patterns even though the one-dimensional pattern may be curved.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A portable articulated arm coordinate measuring machine (AACMM) for measuring three-dimensional coordinates of an object in space, comprising:
 a base;
 a manually positionable arm portion having an opposed first end and second end, the arm portion being rotationally coupled to the base, the arm portion including a plurality of connected arm segments, each arm segment including at least one position transducer for producing a position signal;
 an electronic circuit which receives the position signal from the at least one position transducer in each arm segment;
 a probe end coupled to the first end;
 a noncontact three-dimensional measuring device coupled to the probe end, the noncontact three-dimensional measuring device having a projector and an image sensor, the projector having a source plane, the projector configured to emit a structured light onto the object, the structured light emitted from the source plane and including at least three non-collinear pattern elements, the image sensor arranged to receive the structured light reflected from the object; and
 a processor electrically coupled to the electronic circuit, the processor configured to determine the three-dimensional coordinates of a point on the object in response to receiving the position signals from the position transducers and in response to receiving the structured light by the image sensor.

2. The AACMM of claim 1 wherein the noncontact three-dimensional measuring device is removably coupled to the probe end.

3. The AACMM of claim 1 wherein the structured light is a coded structured light pattern.

4. The AACMM of claim 3 wherein the noncontact three-dimensional measuring device is independently operable when detached from the probe end.

5. The AACMM of claim 3 wherein the coded structured light pattern comprises graphical elements that include at least one of a square, rectangle and triangle.

6. The AACMM of claim 5 wherein the coded light pattern is a sinusoidal pattern that includes 30 lines and each line is 180 degrees out of phase with respect to adjacent lines.

7. The AACMM of claim 5 wherein the coded structured light pattern includes 27 lines and the graphical elements are squares.

8. The AACMM of claim 3 wherein the coded structured light includes a pattern having a plurality of wavelengths, wherein at least one wavelength has a different spatial arrangement than the other wavelengths.

9. The AACMM of claim 3 wherein the coded structured light includes a pattern having a plurality of distinct colors.

10. The AACMM of claim 3 wherein the coded structured light includes a segmented line pattern.

11. The AACMM of claim 3 wherein the coded structured light includes a two-dimensional spatial grid pattern.

12. The AACMM of claim 11 wherein the two-dimensional spatial grid pattern includes a pseudo-random binary array.

13. The AACMM of claim 11 wherein the two-dimensional spatial grid pattern includes a color coded grid.

14. The AACMM of claim 11 wherein the two-dimensional spatial grid pattern includes a multi-valued pseudo random array.

15. The AACMM of claim 11 wherein the two-dimensional spatial grid pattern includes a two-dimensional array of color-coded geometric shapes.

16. The AACMM of claim 1 wherein the structured light pattern is an uncoded structured light pattern.

17. The AACMM of claim 16 wherein the uncoded structured light pattern includes sequential projection images.

18. The AACMM of claim 17 wherein the sequential projection images are a set of binary patterns.

19. The AACMM of claim 17 wherein the sequential projection images are a set of patterns including stripes having at least two levels of intensity.

20. The AACMM of claim 17 wherein the sequential projection images are a set of at least three sinusoidal patterns.

21. The AACMM of claim 17 wherein the sequential projection images are a set of patterns including stripes having at least two levels of intensity which include at least three sinusoidal patterns.

22. The AACMM of claim 16 wherein the uncoded structured light pattern projects a sequence of different illuminated patterns, each of the sequence of different illuminated patterns being projected from different locations relative to the object.

23. The AACMM of claim 16 wherein the uncoded structured light pattern includes a repeated grey scale pattern.

24. The AACMM of claim 1 further comprising a contact measurement device coupled to the probe end.

25. The AACMM of claim 1 wherein the processor is located within the noncontact three-dimensional measuring device.

26. A method of operating a portable articulated arm coordinate measuring machine for measuring the coordinates of an object in space, comprising:
   providing a manually positionable arm portion having an opposed first end and second end, the arm portion including a plurality of connected arm segments, each arm segment including at least one position transducer for producing a position signal;
   providing a probe end for measuring the object, the probe end being coupled to the first end;
   receiving at an electronic circuit the position signals from the transducers;
   providing a three-dimensional noncontact measurement device having a controller, the three-dimensional noncontact measurement device having a sensor and a projector, the projector configured to emit a structured light onto the object, the projector having a source plane, the structured light emitted from the source plane and including at least three non-collinear pattern elements; and
   projecting a structured light from the three-dimensional measurement device onto the object.

27. The method of claim 26 further comprising receiving a reflection of the structured light from the object with the three-dimensional measurement device.

28. The method of claim 27 further comprising determining three-dimensional coordinates of a point on the object from the reflected structured light.

29. The method of claim 28 wherein the structured light is a coded structured light.

30. The method of claim 29 wherein the coded structured light pattern projected onto the object comprises graphical elements that include at least one of a square, rectangle and triangle.

31. The method of claim 29 wherein the coded light pattern is a sinusoidal pattern that includes 30 lines and each line is 180 degrees out of phase with respect to adjacent lines.

32. The method of claim 29 wherein the coded structured light pattern includes 27 lines and the graphical elements are squares.

33. The method of claim 29 wherein the coded structured light includes a pattern having a plurality of wavelengths, wherein at least one wavelength has a different spatial arrangement than the other wavelengths.

34. The method of claim 33 wherein the pattern having a plurality of wavelengths is arranged into lines oriented substantially perpendicular to the source plane.

35. The method of claim 29 wherein the coded structured light includes a single pattern having a plurality of distinct colors.

36. The method of claim 29 wherein the coded structured light includes a segmented line pattern.

37. The method of claim 29 wherein the coded structured light includes a two-dimensional spatial grid pattern.

38. The method of claim 37 wherein the two-dimensional spatial grid pattern includes a pseudo-random binary array.

39. The method of claim 37 wherein the two-dimensional spatial grid pattern includes a color coded grid.

40. The method of claim 37 wherein the two-dimensional spatial grid pattern includes a multi-valued pseudo random array.

41. The method of claim 37 wherein the two-dimensional spatial grid pattern includes a two-dimensional array of color-coded geometric shapes.

42. The method of claim 29 further comprising changing the coded structured light from a first pattern to a second pattern with the electronic circuit.

43. The method of claim 42 wherein the coded structured light is changed in response to an operator input.

44. The method of claim 42 wherein the coded structured light is changed automatically by the electronic circuit in response to a change in conditions on the object.

45. The AACMM of claim 28 further comprising:
   separating the three-dimensional measurement device from the probe end; and
   operating the three-dimensional measurement device separately from the probe end.

46. The AACMM of claim 45 further comprising transmitting data from the three-dimensional measurement device operating separately from the probe end.

* * * * *